United States Patent
Nakamura

[11] Patent Number: 6,052,627
[45] Date of Patent: Apr. 18, 2000

[54] METHOD AND APPARATUS FOR DETECTING PALLET FULL LOAD STATE IN SHEET METAL MACHINING LINE AND METHOD AND APPARATUS FOR CONTROLLING SHEET METAL MACHINING LINE AND WORK IDENTIFYING APPARATUS

[76] Inventor: Kaoru Nakamura, 2-18-13, Takamori, Isehara-shi, Kanagawa, 259-11, Japan

[21] Appl. No.: 09/150,903

[22] Filed: Sep. 10, 1998

Related U.S. Application Data

[62] Division of application No. 08/779,750, Jan. 10, 1997, Pat. No. 5,920,480.

[51] Int. Cl.$^7$ .................................................. G06F 19/00
[52] U.S. Cl. ............................................. 700/182; 702/97
[58] Field of Search ..................... 700/154, 155, 700/182, 194, 97, 170

[56] References Cited

U.S. PATENT DOCUMENTS

| | | | |
|---|---|---|---|
| 4,641,271 | 2/1987 | Konishi et al. | 700/217 |
| 4,692,876 | 9/1987 | Tenma et al. | 700/249 |
| 5,148,372 | 9/1992 | Maiocco et al. | 700/182 |
| 5,156,700 | 10/1992 | Berman et al. | 156/155 |
| 5,208,763 | 5/1993 | Hong et al. | 702/95 |
| 5,311,784 | 5/1994 | Girard et al. | 73/865.8 |
| 5,485,082 | 1/1996 | Visspeintner et al. | 324/202 |
| 5,501,571 | 3/1996 | Van Durrett et al. | 414/801 |
| 5,656,005 | 8/1997 | Cummings et al. | 493/3 |
| 5,661,250 | 8/1997 | Katahira et al. | 73/865.8 |
| 5,699,161 | 12/1997 | Woodward | 356/379 |
| 5,748,318 | 5/1998 | Maris et al. | 356/381 |
| 5,757,648 | 5/1998 | Nakamura | 700/169 |
| 5,768,154 | 6/1998 | Zelt et al. | 702/97 |
| 5,796,618 | 8/1998 | Maeda et al. | 700/182 |
| 5,850,342 | 12/1998 | Nakamura | 700/114 |
| 5,850,343 | 12/1998 | Nakamura | 700/174 |

*Primary Examiner*—William Grant
*Assistant Examiner*—Chad Rapp
*Attorney, Agent, or Firm*—Greenblum & Bernstein P.L.C.

[57] ABSTRACT

An apparatus for detecting a pallet full load state determines a pallet full load state while switching the upper limit value of the mounting height of workpieces according to workpiece size. The cell controller of an apparatus for controlling a sheet metal machining line estimates an occurrence or non-occurrence of a pallet full load state defined as a function of the overall height or the total weight of the workpieces loaded on the carrier pallet by analyzing the machining schedule when a machined workpiece is loaded on the carrier pallet and has a replacing carrier pallet good for the next workpiece to be loaded stand-by whenever appropriate. A workpiece identifying apparatus determines the XY dimensions of a batch of workpieces on a pallet by arranging a number of absolute reference points arranged on the pallet and a number of relative reference points arranged on the workpieces and calculating the differentials between the absolute reference points and the corresponding relative reference points and the XY dimensions of a square defined on the pallet. The workpiece identifying apparatus additionally determines the material of the workpieces from the surface images of the workpieces taken by the cameras it carries by sequentially referring to the surface image data stored in a surface image data storage master. The workpiece identifying apparatus further determines the thickness of each of the workpieces and the number of workpieces on the pallet by determining the height of the accumulated workpieces and the gaps between any adjacently arranged workpieces.

4 Claims, 32 Drawing Sheets

G CODE DATA

G92X_Y_ a ← G90X_Y_ T306  30 $\phi$ CIRCLE ≒ 706mm²

G90X_Y_ b ← G90X_Y_ T205  50☐ SQUARE ≒ 2,500mm²

G72X_Y_ c ← G66 I$\underline{i}$ J$\underline{j}$ P Q$\underline{q}$ T201 RECTANGLE110×10
  ≒ i×qmm²

G72X_Y_ d ← G68 I$\underline{i}$ J$\underline{j}$ K$\underline{k}$ Q$\underline{q}$ T303  10 $\phi$ CIRCLE $$\fallingdotseq \{i^2-(i-q)^2\} \cdot \pi \times \frac{k}{360}$$

|
|
|

G50

MACHINING SCHEDULE DATA (*UNSPECIFIED)

| SCHEDULE No. | MANUFACTURING LOT | NUMBER OF WORKPIECES TO BE MACHINED | CARRIER PALLET | LOADING AREA |
|---|---|---|---|---|
| 10 | LOT1 | 15 | P102 | * |
| 20 | LOT2 | 5 | * | B |
| ⋮ | ⋮ | ⋮ | ⋮ | ⋮ |

AUTOMATIC WAREHOUSE 61

AREA A  AREA B  AREA C

FIG.20

SKID DATA

| SKID TYPE | X DIMENSION | Y DIMENSION | WEIGHT | HEIGHT |
|---|---|---|---|---|
| 1 | 2428.00 | 1219.00 | 750 | 150 |
| 2 | 3048.00 | 1525.00 | 900 | 150 |
| ⋮ | ⋮ | ⋮ | ⋮ | ⋮ |

FIG.21

PALLET DATA

| PALLET No. | LOAD STATUS | CURRENT HEIGHT | CURRENT WEIGHT | PALLET TYPE | SKID TYPE |
|---|---|---|---|---|---|
| P101 |  | 500 | 5250 | 1 | 1 |
| P102 | EMPTY | 350 | 2750 | 1 | 1 |
| P103 | EMPTY | 350 | 3400 | 1 | 1 |
| P201 |  | 600 | 7400 | 2 | 2 |
| ⋮ | ⋮ | ⋮ | ⋮ | ⋮ | ⋮ |

FIG.22

PALLET SPECIFICATION DATA

| PALLET TYPE | X DIMENSION | Y DIMENSION | WEIGHT | HEIGHT |
|---|---|---|---|---|
| 1 | 2438.00 | 1219.00 | 2000 | 200 |
| 2 | 3048.00 | 1525.00 | 2000 | 200 |
| ⋮ | ⋮ | ⋮ | ⋮ | ⋮ |

FIG.23

INVENTORY MASTER FILE DATA

| PALLET No. | LOAD STATUS | MATERIAL/SEMI-PRODUCT NAME | NUMBER OF SHEETS IN STORAGE |
|---|---|---|---|
| P101 |  | SPCC1.0 | 30 |
| P102 | EMPTY |  | 0 |
| P103 | EMPTY |  | 0 |
| P201 |  | SEMIPRODUCT A | 15 |
| ⋮ | ⋮ | ⋮ | ⋮ |

FIG.24

MATERIAL MASTER FILE DATA

| MATERIAL No. | MATERIAL | SHEET THICKNESS | SIZE | ・・・ |
|---|---|---|---|---|
| 1 | SPCC | 1.0 | 4'×8' | ・・・ |
| 2 | SPCC | 1.0 | 3'×6' | ・・・ |
| ⋮ | ⋮ | ⋮ | ⋮ | |

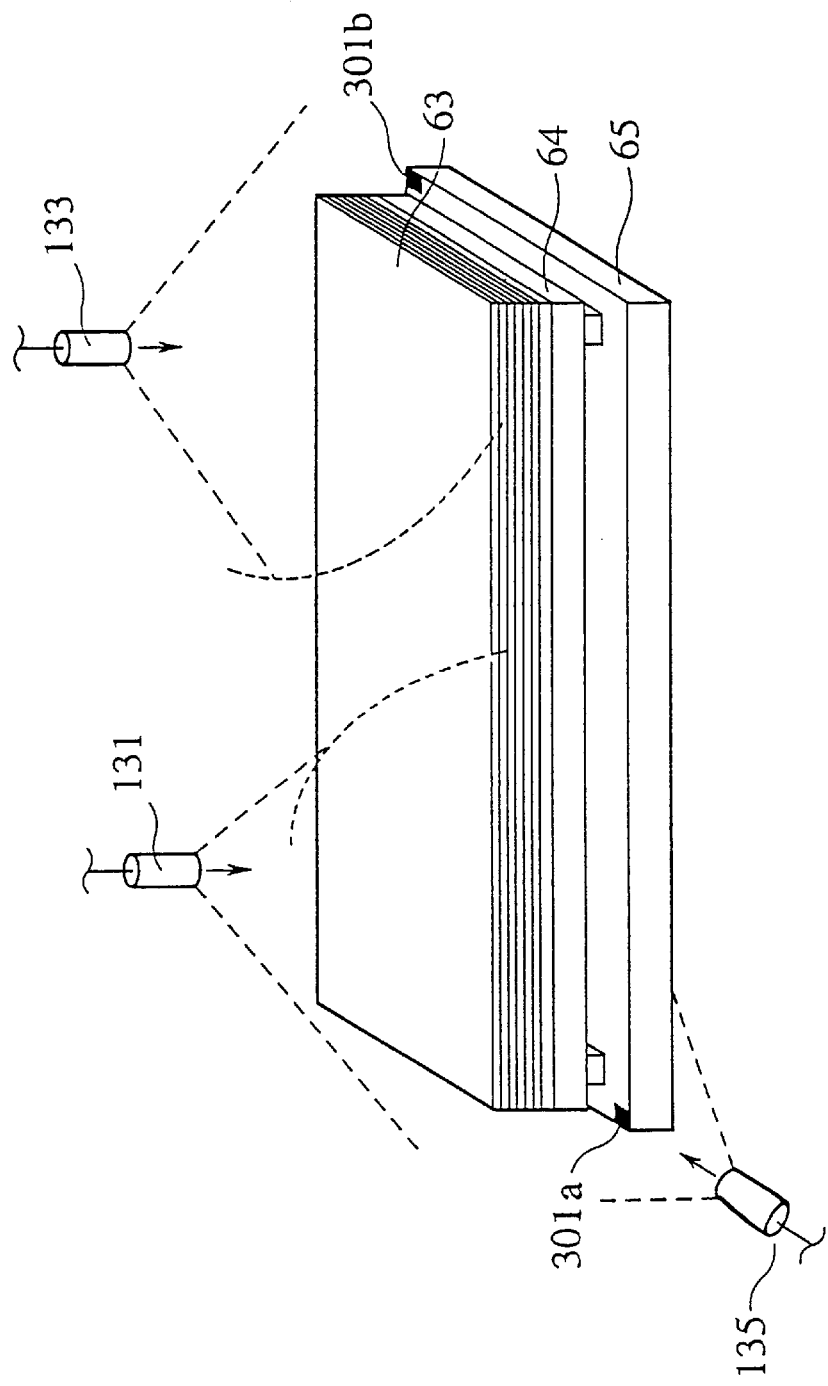

IMAGE EXTRACTION

RANGE OF EXTRACTION 1
RANGE OF EXTRACTION 2
RANGE OF EXTRACTION 3

FIG.36

ROW METAL PLATE CODE MASTER

| ROW METAL PLATE | ROW METAL PLATE SPECIFICATION | | | | |
|---|---|---|---|---|---|
| | X DIMENSION | Y DIMENSION | ALLOWANCE | PLATE THICKNESS | MATERIAL |
| A | 2000 | 1000 | 0.5 | 1.0 | SUS306 |
| B | 2438 | 1219 | 0.5 | 0.8 | SPH |
| C | 2438 | 1219 | 0.5 | 1.2 | SPCC |
| D | 1830 | 915 | 0.5 | 1.6 | SPCC |

FIG.37

MATERIAL CODE MASTER

| MATERIAL CODE | SPECIFIC GRAVITY | TENSION RESISTIVITY | TITLE OF SURFACE IMAGE DATA |
|---|---|---|---|
| SUS306 | 8.2 | | GHPSUS306 |
| SPH | 7.6 | | GHPSPH |
| SPCC | 7.6 | | GHPSPCC |
| SPG | 7.6 | | GHPSPG |
| Ar | 3.0 | | GHPAr |

METHOD AND APPARATUS FOR DETECTING PALLET FULL LOAD STATE IN SHEET METAL MACHINING LINE AND METHOD AND APPARATUS FOR CONTROLLING SHEET METAL MACHINING LINE AND WORK IDENTIFYING APPARATUS

This application is a division, of U.S. application Ser. No. 08/779,750, filed Jan. 10, 1997, now U.S. Pat. No. 5,920,480, the contents of which are expressly herein incorporated by reference in its entirety.

BACKGROUND OF THE INVENTION

1. Field of the Invention

This invention generally relates to a method and an apparatus for detecting a full load state of a carrier pallet carrying a pile of machined workpieces in a sheet metal machining line for producing desired products by cutting, drilling, bending and/or otherwise machining flat workpieces according to a machining schedule prepared on the basis of a given production plan and, more particularly, it relates to a method and an apparatus for detecting a full load state of a carrier pallet carrying a pile of machined workpieces with a predetermined accuracy regardless of the size of each workpiece on the carrier pallet.

This invention also relates to a sheet metal machining line for producing desired products and/or semiproducts by cutting, drilling, bending and/or otherwise machining flat workpieces according to a machining schedule prepared on the basis of a given production plan and, more particularly, it relates to a method and an apparatus for controlling a sheet metal machining line in such a way that the time required for an entire machining cycle is minimized to maximize the efficiency of the line by analyzing the machining schedule, estimating the possibility of occurrence of a full load state as a function of the heights and the weights of the workpieces to be carried by the carrier pallet, arranging a carrier pallet in a stand-by state for the next loading cycle on a just-in-time basis by referring to the estimate and thereby minimizing time required for procuring a carrier pallet.

This invention also relates to a workpiece identifying apparatus adapted to automatically identifying workpieces to be machined in terms of material, size and number without requiring human aid.

2. Prior Art

Automated power saving manufacturing systems such as flexible manufacturing system (FMS) have been known and in popular use in sheet metal machining lines for cutting, drilling, bending and otherwise treating sheet metals into intended products.

An apparatus for controlling a sheet metal machining line utilizing an FMS system will be summarily described.

Firstly, a sheet metal machining line typically comprises an NC machining center including one or more than one punch presses adapted to selectively using a plurality of metal molds and tools, a CNC control apparatus for controlling the operation of the NC machining center according to a machining program, a workpiece holding/releasing unit for holding one or more than one workpieces to be machined in position relative to the NC and releasing them for delivery, an automatic warehouse for sorting a large number of workpieces into groups of same materials and sizes and storing them for future machining, peripheral equipment including one or more than one cranes and other devices for feeding workpieces to the workpiece holding/releasing unit from the automatic warehouse and a line control board connected to the NC machining center, the CNC control apparatus and the peripheral equipment for controlling the sequence of operations of the sheet metal machining line.

The sheet metal machining line is additionally connected to a cell controller for transferring machining programs to the CNC control apparatus and also transferring ladder-sequence programs to the line control board in order to control the entire operation of the sheet metal machining line in a coordinated manner.

The cell controller is connected to a hard disc memory device having a predetermined capacity typically for storing machining schedules prepared according to a given production plan describing the operating procedures of the NC machining center and the peripheral equipment for sequentially producing products according to the production plan.

The cell controller sequentially issues commands for operation according to the machining schedule and the issued operational commands are then sent to the CNC control apparatus and the line control board.

Upon receiving the commands, the sheet metal machining line sequentially carries out the specified machining operations including cutting, drilling and bending on the delivered flat workpieces.

A machining schedule typically comprises more than one unit machining schedules designed for each specific product item and arranged in the order of the machining operations to be carried out.

The unit machining schedule describes data items such as the identification numbers of the machining programs involved, the use or non-use of such identification numbers, the number of workpieces to be machined the presence or absence of the predetermined procedures for exchanging metal molds and completion codes for indicating the completion of the operations specified in the unit machining schedule.

The cell controller causes the predetermined machining operations to be carried out in the order defined by the machining schedule by referring to the machining schedule whenever necessary so that products and/or semiproducts may be produced according to the machining schedule.

With a sheet metal machining line as described above, the workpieces machined by the NC machining center of the line are sequentially loaded on carrier pallets arranged in a loading site, which operates as part of the line.

Thus, the number of workpieces loaded on carrier pallets increases with time, although the capacity of each carrier pallet is limited in terms of either the height or the weight of the load it carries as a function of the height and strength of the shelf of the automatic warehouse that receives the pallet and the strength of the crane car as well as other factors.

Thus, the workpiece loading site is typically provided with an apparatus for detecting a full load state for each pallet loaded with workpieces there.

A known apparatus for detecting a pallet full load state will be described by referring to FIG. 1 of the accompanying drawings, illustrating a loading station.

Referring to FIG. 1, the loading station 201 has in the inside a lifter 203 for supporting from under a carrier pallet 206 carrying workpieces 207 thereon with a skid 205 interposed therebetween.

The lifter 206 is provided with a support mechanism (not shown) such as a hydraulic cylinder and designed to support from under the carrier pallet 206 that carries workpieces

207, slightly and correspondingly moving downward as a function of the total weight of the workpieces 207 loaded on the carrier pallet 206.

A pair of top sensors 209a, 209b are arranged at opposite positions in an upper area of the inner wall of the loading station.

With the known apparatus for detecting a pallet full load state having a configuration as described above, the top of the workpieces 207 loaded on a carrier pallet 206 is detected by the top sensor when the total weight or the overall height of the workpieces 207 on the carrier pallet 206 exceeds a predetermined corresponding limit.

More specifically, if the carrier pallet 206 carries workpieces 207 whose total weight exceeds a predetermined limit, the overall height of the workpieces 207 consequently exceeds a corresponding limit so that the top sensors 209 detect a full load state of the carrier pallet where the load of the carrier pallet exceeds the limit by reducing the weight of the load to the height thereof.

If, on the other hand, the carrier pallet 206 carries workpieces 207 whose overall height exceeds a predetermined limit, the full load state of the carrier pallet 206 is detected by the top sensors 209.

The above described known apparatus for detecting a pallet full load state is, however, accompanied by a difficulty of maintaining a constant detection accuracy due to the fact that the total weight of the load is reduced to the overall height of the load to detect a full load state of the carrier pallet particularly when the carrier pallet carries workpieces with different sizes.

This problem will be described below in greater detail by referring to FIG. 2 of the accompanying drawings, illustrating the difference in the overall height when workpieces with different sizes are loaded to a total weight of 2 tons.

As shown, the overall height of 3'×6' workpieces is about 153 mm and that of 4'×8' workpieces is about 87 mm, whereas the overall height of 5'×10' workpieces is about 55 mm.

Thus, the difference in the overall height is significant for the three groups of workpieces with different sizes if the total weight is same.

Therefore, if upper limit is set to be equal to 2 tons for the total weight of the workpieces carried by a carrier pallet, the corresponding upper limit for the overall height of the workpieces will have to be equal to 55 mm which is the overall height of the 5'×10' workpieces weighing 2 tons.

Apparently, this upper limit for the overall height is inappropriate for 3'×6' or 4'×8' workpieces because the total weight of the workpieces of either category loaded to this upper limit height will be far below 2 tons.

In other words, the above described known apparatus for detecting a pallet full load state cannot show a constant level of detection accuracy and greatly reduce the efficiency of loading carrier pallets with workpieces.

Under these circumstances, there is a strong demand for technological development that provides a method and an apparatus for detecting a full load state that ensures a constant level of detection accuracy if workpieces with different sizes are loaded on the carrier pallet.

On the other hand, in the operation of loading carrier pallets with machined workpieces in the above described known sheet metal machining line, an additional carrier pallet is fed to the loading station only when a full load state is detected for the current carrier pallet to prolong the overall time period of a processing cycle and reduce the efficiency of the operation of the machining line.

This problem will be described in greater detail below.

The upper limit of the load of machined workpieces is determined for a carrier pallet in terms of either the total weight or the overall height of the load as a function of the height and strength of the shelf of the automatic warehouse that receives the pallet and the strength of the crane car as well as other factors including the strength of the truck for transferring the carrier pallet.

The current carrier pallet has to be replaced by an empty pallet whenever it becomes full of load.

The control apparatus of the known sheet metal machining line feeds the loading station with a replacing carrier pallet good for the machined workpieces to be loaded there only when it detects a full load state on the current carrier pallet to entail the above identified problem.

Known attempts for bypassing this problem include the arrangement of a stand-by station located adjacent to the loading station for keeping an empty carrier pallet adapted to the next unit machining schedule.

However, such an arrangement cannot cope with the situation where a full load state occurs during the ongoing current unit machining schedule and the empty carrier pallet in the stand-by station for the next unit machining schedule is not good for the current unit machining schedule.

If such is the case, the empty carrier pallet in the stand-by station has to be replaced by another empty carrier pallet that is good for the current unit machining schedules to consequently consume additional time for obtaining the empty carrier pallet.

In view of these and other circumstances, therefore, there is a strong demand for technological development that provides a method and an apparatus for anticipating a full load state for a carrier pallet and keeping an empty carrier pallet good for the machined workpieces to be loaded immediately in a stand-by station.

On the other hand, in a sheet metal machining line having a configuration as described above, the automatic warehouse plays an important role for feeding the NC machining center with necessary workpieces on a just in-time basis. The automatic warehouse typically comprises multi-column multi-level racks for temporarily storing workpieces including rough workpieces, half-finished products and finished products, a stacker-crane for moving workpieces into and out of the racks and a control apparatus for controlling the operation of the stacker-crane and other pieces of equipment in a coordinated manner. The control apparatus issues commands to the stacker-crane for moving workpieces of specified groups into and out of the automatic warehouse and centrally controls the inventory of workpieces in terms of number and column and level of rack. Therefore, when the number of workpieces of a specific group falls under a predetermined level, it notifies the operator of the current status and have the operator supply additional workpieces of the group to the automatic warehouse.

For storing newly supplied workpieces in such an automatic warehouse, the operator in charge of workpiece supply conventionally checks the invoice to find out the material, the dimensions and the weight of each piece as well as the number of pieces for each group or category of workpieces and then manually enters these data into the control apparatus typically by way of a keyboard to update the inventory data of the workpieces stored in the automatic warehouse. The updated inventory data are important for the operation of the sheet metal machining line that is being run according to a predetermined schedule because uninterrupted supply of right workpieces is vital for the performance of the line particularly in terms of the number of workpieces of each group to be fed to the line and the material, the dimensions and the weight of each workpiece of the group.

However, such conventional inventory updating operation for newly supplied workpieces typically carried out manually by the operator in charge of workpiece supply is cumbersome and hence he or she is mostly occupied by the operation for the day, although the operation is often accompanied by keying-in errors that can reduce the inventory data stored in the control apparatus to inaccurate and unreliable.

In view of the above circumstances, it has been desired to fully automate the operation of updating workpiece inventory data by providing a technological development that can realize such automated operation.

SUMMARY OF THE INVENTION

Under the above identified circumstances, therefore, it is an object of the present invention to provide a method and an apparatus for detecting a full load state of a carrier pallet carrying a pile of machined workpieces in a sheet metal machining line with a given accuracy level regardless of the size of the workpieces.

It is another object of the present invention to provide a method and an apparatus for detecting a full load state of a carrier pallet carrying a pile of machined workpieces having different sizes with a given accuracy level.

It is still another object of the present invention to provide a method and an apparatus for detecting a full load state of a carrier pallet with a remarkably improved accuracy.

It is a further object of the present invention to provide a method and an apparatus for controlling a sheet metal machining line in such a way that the time required for an entire machining cycle is minimized to maximize the efficiency of the line by analyzing the machining schedule, estimating the possibility of occurrence of a full load state as a function of the heights and the weights of the workpieces to be carried by the carrier pallet, arranging a carrier pallet in a stand-by state for the next loading cycle on a just-in-time basis by referring to the estimate and thereby minimizing time required for procuring a carrier pallet.

It is a still further object of the present invention to provide a workpiece identifying apparatus adapted to automatically identifying workpieces to be machined in terms of material, size and number without requiring human aid by shooting them with an image pickup device and processing the obtained images particularly when they are brought into an automatic warehouse.

According to an aspect of the invention, the above objects are achieved by providing a method for detecting a full load state of a carrier pallet loaded with machined workpieces in a sheet metal machining line provided with a machining schedule to be referred to for producing one or more than one different machined products and also for determining a full load state, said machining schedule being formed by sequentially arranging unit machining schedules including a data item for the size of the flat workpieces to be machined, and a plurality of workpiece top level sensing means arranged vertically at a machined workpiece loading site to fined out if the top level of the workpieces loaded on a carrier pallet reaches a predetermined level or not, characterized in that it comprises steps of assigning a unit machining schedule fitting a predetermined order out of said unit machining schedules by referring to said machining schedule, determining the size of said workpieces to be machined on the basis of the data of said data item belonging to the assigned unit machining schedule and determining an occurrence or non-occurrence of a full load state of the carrier pallet loaded with machined workpieces on the basis of the output of the workpiece top level sensing means arranged at a position corresponding to the size of the workpieces to be machined.

With a method according to the invention and defined as above, a unit machining schedule fitting a predetermined order is assigned out of said unit machining schedules by referring to said machining schedule.

Then, the size of said workpieces to be machined is determined on the basis of the data of said data item belonging to the assigned unit machining schedule.

Thereafter, an occurrence or non-occurrence of a full load state of the carrier pallet loaded with machined workpieces is determined on the basis of the output of the workpiece top level sensing means arranged at a position corresponding to the size of the workpieces to be machined.

Thus, an occurrence or non-occurrence of a full load state is determined by selecting an appropriate limit value for the top level of the loaded workpieces on the basis of the size of the workpieces so that the accuracy of detecting a full load state can be held to a constant level regardless of the size of the workpieces loaded on a carrier pallet.

According to another aspect of the invention, the above objects are achieved by providing a method for detecting a full load state of a carrier pallet loaded with machined workpieces in a sheet metal machining line provided with a machining schedule to be referred to for producing one or more than one different machined products and also for determining a full load state, said machining schedule being formed by sequentially arranging unit machining schedules including data items for the size of the flat workpieces to be machined and the weight per workpiece of the workpieces, characterized in that it comprises steps of assigning a unit machining schedule fitting a predetermined order out of said unit machining schedules by referring to said machining schedule, monitoring the progress of machining each of said workpieces according to said assigned unit machining schedule, determining the completion of the current operation of machining a workpiece on the basis of the output of the monitoring step, reading out the height and the weight of the workpiece before being machined from said unit machining schedule and adding them respectively to those of the workpieces loaded on the carrier pallet upon completion of the current machining operation determined in the determining step, comparing the summed height and the summed weight respectively with a predetermined limit height and a predetermined limit weight and determining an occurrence or non-occurrence of a full load state of the carrier pallet from result of the comparison.

With a method according to the invention and defined as above, firstly a unit machining schedule fitting a predetermined order is assigned out of said unit machining schedules by referring to said machining schedule.

Then, the progress of machining each of said workpieces according to said assigned unit machining schedule is monitored and the completion of the current operation of machining a workpiece is determined on the basis of the output of the monitoring step.

Thereafter, if it is determined that the current operation of machining the workpiece is completed, the height and the weight of the workpiece before being machined are read out from said unit machining schedule and added respectively to those of the workpieces loaded on the carrier pallet.

The summed height and the summed weight are respectively compared with a predetermined limit height and a predetermined limit weight and then an occurrence or non-occurrence of a full load state of the carrier pallet is determined from result of the comparison.

Thus, each time the operation of machining a workpiece, the height and the weight of the workpiece are read out and added respectively to those of the workpieces already loaded on the carrier pallet so that the summed height and the summed weight may respectively be compared with a predetermined limit height and a predetermined limit weight and therefore an occurrence or non-occurrence of a full load state of the carrier pallet may be determined from result of the comparison.

Therefore, a full load state of a carrier pallet can be detected with a constant level of accuracy regardless of the size of the workpieces loaded on the carrier pallet and even if workpieces with different sizes are loaded on the carrier pallet.

According to another aspect of the invention, the above objects are achieved by providing a method for detecting a full load state of a carrier pallet loaded with machined workpieces in a sheet metal machining line provided with a machining schedule to be referred to for producing one or more than one different machined products and also for determining a full load state, said machining schedule being formed by sequentially arranging unit machining schedules including data items for the size of the flat workpieces to be machined, the weight per workpiece of the workpieces, the specific gravity of the workpieces and the machining program describing G-code data, characterized in that it comprises steps of assigning a unit machining schedule fitting a predetermined order out of said unit machining schedules by referring to said machining schedule, monitoring the progress of machining each of said workpieces according to said assigned unit machining schedule, determining the completion of the current operation of machining a workpiece on the basis of the output of the monitoring step, reading out the height, the weight and the specific gravity of the workpiece before being machined and the machining program for the workpiece from said unit machining schedule upon completion of the current machining operation determined in the determining step, analyzing the G-code data from the read out machining program, extracting one or more than one parameters from the result of the analysis for providing a basis for determining the areas of the geometric figures to be cut by machining, calculating the areas of the geometric figures to be cut by machining from the extracted parameters, adding the calculated values of the areas, multiplying the added sum of the areas by the read out height of the workpiece, multiplying the product of the multiplication by the read out specific gravity of the workpiece, subtracting the product of the multiplication from the weight of the workpiece before being machined to determine the weight of the machined workpiece, adding the determined weight of the machined workpiece and the read out height of the workpiece respectively to the weight and the height of the workpieces loaded on the carrier pallet, comparing the summed height and the summed weight respectively with a predetermined limit height and a predetermined limit weight and determining an occurrence or non-occurrence of a full load state of the carrier pallet from result of the comparison.

With a method according to the invention and defined as above, firstly a unit machining schedule fitting a predetermined order is assigned out of said unit machining schedules by referring to said machining schedule.

Then, the progress of machining each of said workpieces according to said assigned unit machining schedule is monitored and the completion of the current operation of machining a workpiece is determined on the basis of the output of the monitoring step.

Thereafter, if it is determined that the current operation of machining the workpiece is completed, the height, the weight and the specific gravity of the workpiece before being machined and the machining program for the workpiece are read out from said unit machining schedule upon completion of the current machining operation determined in the determining step and the G-code data of the read out machining program are analyzed.

Then, one or more than one parameters are extracted from the result of the analysis for providing a basis for determining the areas of the geometric figures to be cut by machining and the areas of the geometric figures to be cut by machining are calculated from the extracted parameters.

The calculated values of the areas are added, the added sum of the areas are multiplied by the read out height of the workpiece and the product of the multiplication is further multiplied by the read out specific gravity of the workpiece.

The product of the multiplication is subtracted from the weight of the workpiece before being machined to determine the weight of the machined workpiece and the determined weight of the machined workpiece and the read out height of the workpiece are respectively added to the weight and the height of the workpieces loaded on the carrier pallet.

The summed height and the summed weight are respectively compared with a predetermined limit height and a predetermined limit weight to finally determine an occurrence or non-occurrence of a full load state of the carrier pallet from result of the comparison.

Therefore, a full load state of a carrier pallet can be detected with a constant and remarkably improved level of accuracy because the weight of each machined workpiece is accurately determined by referring to G-code data described in the machining program for the workpiece.

According to still another aspect of the invention, the above objects are achieved by providing a method for detecting a full load state of a carrier pallet loaded with machined workpieces in a sheet metal machining line provided with a machining schedule to be referred to for producing one or more than one different machined products and also for determining a full load state, said machining schedule being formed by sequentially arranging unit machining schedules including data items for the size of the flat workpieces to be machined, the weight per workpiece of the workpieces, the specific gravity of the workpieces, the machining program describing G-code data and the number of workpieces to be machined, characterized in that it comprises steps of assigning a unit machining schedule fitting a predetermined order out of said unit machining schedules by referring to said machining schedule, reading out the height, the weight and the specific gravity of the workpiece before being machined, the machining program for the workpiece and the number of workpieces to be machined from said unit machining schedule, analyzing the G-code data from the read out machining program, extracting one or more than one parameters from the result of the analysis for providing a basis for determining the areas of the geometric figures to be cut by machining, calculating the areas of the geometric figures to be cut by machining from the extracted parameters, adding the calculated values of the areas, multiplying the added sum of the areas by the read out height of the workpiece, multiplying the product of the multiplication by the read out specific gravity of the workpiece, subtracting the product of the multiplication from the weight of the workpiece before being machined to determine the weight of the machined workpiece, multiplying the determined weight of the machined workpiece and the read out height of the workpiece respectively by the number of workpieces to be machined, comparing the height and the weight obtained by the multiplications respectively with a predetermined limit height and a predetermined limit weight and determining an occurrence or non-occurrence of a full load state of the carrier pallet from result of the comparison.

With a method according to the invention and defined as above, firstly a unit machining schedule fitting a predetermined order is assigned out of said unit machining schedules by referring to said machining schedule.

Then, the height, the weight and the specific gravity of the workpiece before being machined, the machining program for the workpiece and the number of workpieces to be machined are read out from said unit machining schedule upon completion of the current machining operation determined in the determining step and the G-code data of the read out machining program are analyzed.

Then, one or more than one parameters are extracted from the result of the analysis for providing a basis for determining the areas of the geometric figures to be cut by machining and the areas of the geometric figures to be cut by machining are calculated from the extracted parameters.

The calculated values of the areas are added, the added sum of the areas are multiplied by the read out height of the workpiece and the product of the multiplication is further multiplied by the read out specific gravity of the workpiece.

The product of the multiplication is subtracted from the weight of the workpiece before being machined to determine the weight of the machined workpiece and the determined weight of the machined workpiece and the read out height of the workpiece are respectively multiplied by the number of workpiece to be machined.

The height and the weight obtained by the multiplications are respectively compared with a predetermined limit height and a predetermined limit weight to finally determine an occurrence or non-occurrence of a full load state of the carrier pallet from result of the comparison.

Therefore, a full load state of a carrier pallet can be detected with a constant and remarkably improved-level of accuracy because the weight of each machined workpiece is accurately determined by referring to G-code data described in the machining program for the workpiece.

According to still another aspect of the invention, the above objects are achieved by providing an apparatus for detecting a full load state of a carrier pallet loaded with machined workpieces in a sheet metal machining line provided with a machining schedule to be referred to for producing one or more than one different machined products and also for determining a full load state, said machining schedule being formed by sequentially arranging unit machining schedules including a data item for the size of the flat workpieces to be machined, and a plurality of workpiece top level sensing means arranged vertically at a machined workpiece loading site to fined out if the top level of the workpieces loaded on a carrier pallet reaches a predetermined level or not, characterized in that it comprises a machining schedule assigning means for assigning a unit machining schedule fitting a predetermined order out of said unit machining schedules by referring to said machining schedule, a workpiece size determining means for determining the size of said workpieces to be machined on the basis of the data of said data item belonging to the assigned unit machining schedule and a full load state occurrence determining means for determining an occurrence or non-occurrence of a full load state of the carrier pallet loaded with machined workpieces on the basis of the output of the workpiece top level sensing means arranged at a position corresponding to the size of the workpieces to be machined.

With an apparatus according to the invention and defined as above, firstly, the machining schedule assigning means assigns a unit machining schedule fitting a predetermined order out of said unit machining schedules by referring to said machining schedule.

Then, the workpiece size determining means determines the size of said workpieces to be machined on the basis of the data of said data item belonging to the assigned unit machining schedule.

The full load state occurrence determining means determines an occurrence or non-occurrence of a full load state of the carrier pallet loaded with machined workpieces on the basis of the output of the workpiece top level sensing means arranged at a position corresponding to the size of the workpieces to be machined.

Thus, an occurrence or non-occurrence of a full load state is determined by selecting an appropriate limit value for the top level of the loaded workpieces on the basis of the size of the workpieces so that the accuracy of detecting a full load state can be held to a constant level regardless of the size of the workpieces loaded on a carrier pallet.

According to still another aspect of the invention, the above objects are achieved by providing an apparatus for detecting a full load state of a carrier pallet loaded with machined workpieces in a sheet metal machining line provided with a machining schedule to be referred to for producing one or more than one different machined products and also for determining a full load state, said machining schedule being formed by sequentially arranging unit machining schedules including data items for the size of the flat workpieces to be machined and the weight per workpiece of the workpieces, characterized in that it comprises a unit machining schedule assigning means for assigning a unit machining schedule fitting a predetermined order out of said unit machining schedules by referring to said machining schedule, a machining operation completion determining means for monitoring the progress of machining each of said workpieces according to said assigned unit machining schedule and determining the completion of the current operation of machining a workpiece on the basis of the output of the monitoring operation, a loaded workpiece height/weight calculating means for reading out the height and the weight of the workpiece before being machined from said unit machining schedule and adding them respectively to those of the workpieces loaded on the carrier pallet upon completion of the current machining operation determined in the determining operation and a full load state occurrence determining means for comparing the summed height and the summed weight respectively with a predetermined limit height and a predetermined limit weight and determining an occurrence or non-occurrence of a full load state of the carrier pallet from result of the comparison.

With an apparatus according to the invention and defined as above, the unit machining schedule assigning means assigns a unit machining schedule fitting a predetermined order out of said unit machining schedules by referring to said machining schedule.

The machining operation completion determining means monitors the progress of machining each of said workpieces according to said assigned unit machining schedule and determines the completion of the current operation of machining a workpiece on the basis of the output of the monitoring operation.

Upon completion of the current machining operation determined in the determining operation, the loaded workpiece height/weight calculating means reads out the height and the weight of the workpiece before being machined from said unit machining schedule and adds them respectively to those of the workpieces loaded on the carrier pallet.

The full load state occurrence determining means compares the summed height and the summed weight respectively with a predetermined limit height and a predetermined limit weight and determines an occurrence or non-occurrence of a full load state of the carrier pallet from result of the comparison.

Thus, each time the operation of machining a workpiece, the height and the weight of the workpiece are read out and added respectively to those of the workpieces already loaded on the carrier pallet so that the summed height and the summed weight may respectively be compared with a predetermined limit height and a predetermined limit weight and therefore an occurrence or non-occurrence of a full load state of the carrier pallet may be determined from result of the comparison.

Therefore, a full load state of a carrier pallet can be detected with a constant level of accuracy regardless of the size of the workpieces loaded on the carrier pallet and even if workpieces with different sizes are loaded on the carrier pallet.

According to still another aspect of the invention, the above objects are achieved by providing an apparatus for detecting a full load state of a carrier pallet loaded with machined workpieces in a sheet metal machining line provided with a machining schedule to be referred to for producing one or more than one different machined products and also for determining a full load state, said machining schedule being formed by sequentially arranging unit machining schedules including data items for the size of the flat workpieces to be machined, the weight per workpiece of the workpieces, the specific gravity of the workpieces and the machining program describing G-code data, characterized in that it comprises a unit machining schedule assigning means for assigning a unit machining schedule fitting a predetermined order out of said unit machining schedules by referring to said machining schedule, a machining operation completion determining means for monitoring the progress of machining each of said workpieces according to said assigned unit machining schedule and determining the completion of the current operation of machining a workpiece on the basis of the output of the monitoring operation, a loaded workpiece height/weight calculating means for reading out the height, the weight and the specific gravity of the workpiece before being machined and the machining program for the workpiece from said unit machining schedule upon completion of the current machining operation determined in the determining operation, analyzing the G-code data from the read out machining program, extracting one or more than one parameters from the result of the analysis for providing a basis for determining the areas of the geometric figures to be cut by machining, calculating the areas of the geometric figures to be cut by machining from the extracted parameters, adding the calculated values of the areas, multiplying the added sum of the areas by the read out height of the workpiece, multiplying the product of the multiplication by the read out specific gravity of the workpiece, subtracting the product of the multiplication from the weight of the workpiece before being machined to determine the weight of the machined workpiece and adding the determined weight of the machined workpiece and the read out height of the workpiece respectively to the weight and the height of the workpieces loaded on the carrier pallet and a full load state occurrence determining means for comparing the summed height and the summed weight respectively with a predetermined limit height and a predetermined limit weight and determining an occurrence or non-occurrence of a full load state of the carrier pallet from result of the comparison.

With an apparatus according to the invention and defined as above, firstly, the unit machining schedule assigning means assigns a unit machining schedule fitting a predetermined order out of said unit machining schedules by referring to said machining schedule.

Then, the machining operation completion determining means monitors the progress of machining each of said workpieces according to said assigned unit machining schedule and determines the completion of the current operation of machining a workpiece on the basis of the output of the monitoring operation.

Thereafter, the loaded workpiece height/weight calculating means reads out the height, the weight and the specific gravity of the workpiece before being machined and the machining program for the workpiece from said unit machining schedule upon completion of the current machining operation determined in the determining operation, analyzes the G-code data from the read out machining program, extracts one or more than one parameters from the result of the analysis for providing a basis for determining the areas of the geometric figures to be cut by machining, calculates the areas of the geometric figures to be cut by machining from the extracted parameters, adds the calculated values of the areas, multiplies the added sum of the areas by the read out height of the workpiece, multiplies the product of the multiplication by the read out specific gravity of the workpiece, subtracts the product of the multiplication from the weight of the workpiece before being machined to determine the weight of the machined workpiece and adds the determined weight of the machined workpiece and the read out height of the workpiece respectively to the weight and the height of the workpieces loaded on the carrier pallet.

Finally, the full load state occurrence determining means compares the summed height and the summed weight respectively with a predetermined limit height and a predetermined limit weight and determining an occurrence or non-occurrence of a full load state of the carrier pallet from result of the comparison.

Therefore, a full load state of a carrier pallet can be detected with a constant and remarkably improved level of accuracy because the weight of each machined workpiece is accurately determined by referring to G-code data described in the machining program for the workpiece.

According to still another aspect of the invention, the above objects are achieved by providing an apparatus for detecting a full load state of a carrier pallet loaded with machined workpieces in a sheet metal machining line provided with a machining schedule to be referred to for producing one or more than one different machined products and also for determining a full load state, said machining schedule being formed by sequentially arranging unit machining schedules including data items for the size of the flat workpieces to be machined, the weight per workpiece of the workpieces, the specific gravity of the workpieces, the machining program describing G-code data and the number of workpieces to be machined, characterized in that it comprises a unit machining schedule assigning means for assigning a unit machining schedule fitting a predetermined order out of said unit machining schedules by referring to said machining schedule, a loaded workpiece height/weight calculating means for reading out the height, the weight and the specific gravity of the workpiece before being machined, the machining program for the workpiece and the number of workpieces to be machined from said unit machining schedule, analyzing the G-code data from the read out machining program, extracting one or more than one parameters from the result of the analysis for providing a basis for determining the areas of the geometric figures to be cut by machining, calculating the areas of the geometric figures to be cut by machining from the extracted parameters, adding the calculated values of the areas, multiplying the added sum of the areas by the read out height of the workpiece, multiplying the product of the multiplication by the read out specific gravity of the workpiece, subtracting the product of the multiplication from the weight of the workpiece before being machined to determine the weight of the machined workpiece and multiplying the determined weight of the machined workpiece and the read out height of the workpiece respectively by the number of workpieces to be machined, a full load state occurrence determining means for comparing the height and the weight obtained by the multiplications respectively with a predetermined limit height and a predetermined limit weight and determining an occurrence or non-occurrence of a full load state of the carrier pallet from result of the comparison.

With an apparatus according to the invention and defined as above, firstly, the unit machining schedule assigning means assigns a unit machining schedule fitting a predetermined order out of said unit machining schedules by referring to said machining schedule.

Then, the loaded workpiece height/weight calculating means reads out the height, the weight and the specific gravity of the workpiece before being machined, the machining program for the workpiece and the number of workpieces to be machined from said unit machining schedule, analyzes the G-code data from the read out machining program, extracts one or more than one parameters from the result of the analysis for providing a basis for determining the areas of the geometric figures to be cut by machining, calculates the areas of the geometric figures to be cut by machining from the extracted parameters, adds the calculated values of the areas, multiplies the added sum of the areas by the read out height of the workpiece, multiplies the product of the multiplication by the read out specific gravity of the workpiece, subtracts the product of the multiplication from the weight of the workpiece before being machined to determine the weight of the machined workpiece and multiplies the determined weight of the machined workpiece and the read out height of the workpiece respectively by the number of workpieces to be machined.

Finally, the full load state occurrence determining means compares the height and the weight obtained by the multiplications respectively with a predetermined limit height and a predetermined limit weight and determines an occurrence or non-occurrence of a full load state of the carrier pallet from result of the comparison.

Therefore, a full load state of a carrier pallet can be detected with a constant and remarkably improved level of accuracy because the weight of each machined workpiece is accurately determined by referring to G-code data described in the machining program for the workpiece.

According to a still another aspect of the invention, the above objects are achieved by providing a method for controlling a sheet metal machining line provided with a machining schedule to be referred to for producing one or more than one different machined products, said machining schedule being formed by sequentially arranging unit machining schedules including data items for the number of products to be produced by machining, the size of the flat workpieces to be machined and the weight per workpiece of the workpieces, and designed to carry out a sequence of machining operations on said workpieces, characterized in that it comprises steps of assigning a unit machining schedule fitting a predetermined order out of said unit machining schedules by referring to said machining schedule, analyzing said data items belonging to said assigned unit machining schedule, determining an occurrence or non-occurrence of a full load state of the carrier pallet loaded with machined workpieces on the basis of the analysis and, upon determining an occurrence of a full load state of the carrier pallet in the preceding determining step, transferring a replacing carrier pallet good for the machined workpieces from an automatic warehouse to a stand-by station.

With a method according to the invention and defined as above, firstly, a unit machining schedule fitting a predetermined order is assigned out of said unit machining schedules by referring to said machining schedule.

Then, said data items belonging to said assigned unit machining schedule are analyzed and an occurrence or non-occurrence of a full load state of the carrier pallet loaded with machined workpieces is determined on the basis of the analysis.

Finally, if an occurrence of a full load state of the carrier pallet is determined in the preceding determining step, a replacing carrier pallet good for the machined workpieces is transferred from an automatic warehouse to a stand-by station.

Thus, an occurrence or non-occurrence of a full load state of a carrier pallet loaded with machined workpieces is determined by analyzing the corresponding machining schedule when machined workpieces are loaded on the carrier pallet and a replacing carrier pallet good for the workpiece to be loaded the next time is made to stand-by by referring to the determination so that the time required for procuring a carrier pallet is minimized to consequently reduce the overall period of a machining cycle.

According to a still another aspect of the invention, the above objects are achieved by providing a method for controlling a sheet metal machining line provided with a machining schedule to be referred to for producing one or more than one different machined products, said machining schedule being formed by sequentially arranging unit machining schedules including data items for the number of products to be produced by machining, the size of the flat workpieces to be machined and the weight per workpiece of the workpieces, and designed to carry out a sequence of machining operations on said workpieces, characterized in that it comprises steps of assigning a unit machining schedule fitting a predetermined order out of said unit machining schedules by referring to said machining schedule, calculating the number of workpieces left to be machined for the unit machining schedule by referring to said data items belonging to the assigned unit machining schedule and the number of machined workpieces, determining if the number of workpieces left to be machined as calculated in the preceding calculating step exceeds a predetermined value or not, upon determining that the number of workpiece to be machined exceeds a predetermined value, analyzing the unit machining schedule, determining an occurrence or non-occurrence of a full load state of the carrier pallet loaded with machined workpieces on the basis of the analysis and, upon determining an occurrence of a full load state of the carrier pallet in the preceding determining step, transferring a replacing carrier pallet good for the machined workpieces from an automatic warehouse to a stand-by station.

With a method according to the invention and defined as above, firstly, a unit machining schedule fitting a predetermined order is assigned out of said unit machining schedules by referring to said machining schedule.

Then, the number of workpieces left to be machined for the unit machining schedule is calculated by referring to said data items belonging to the assigned unit machining schedule and the number of machined workpieces and it is also determined if the number of workpieces left to be machined as calculated in the preceding calculating step exceeds a predetermined value or not.

Upon determining that the number of workpiece to be machined exceeds a predetermined value, the unit machining schedule is analyzed and an occurrence or non-occurrence of a full load state of the carrier pallet loaded with machined workpieces is determined on the basis of the analysis.

Finally, upon determining an occurrence of a full load state of the carrier pallet in the preceding determining step, a replacing carrier pallet good for the machined workpieces is transferred from an automatic warehouse to a stand-by station.

Thus, an occurrence or non-occurrence of a full load state of a carrier pallet loaded with machined workpieces that is defined as a function of the overall height or the total weight of the workpieces loaded on the carrier pallet is determined by analyzing the corresponding machining schedule when machined workpieces are being loaded on the carrier pallet, provided that the number of workpieces left to be machined exceeds a predetermined value, and, at the same time, a replacing carrier pallet good for the workpiece to be loaded the next time is made to stand-by by referring to the Ad determination so that the time required for procuring a carrier pallet is minimized to consequently reducing the overall period of a machining cycle.

Therefore, if a small number is selected for the predetermined value, the operation of procuring a replacing carrier pallet and having it in a stand-by station is carried out immediately before the machining operation according to the unit machining schedule is over so that, if there is a request for an interrupt of an urgent schedule, the carrier pallet currently being located in the loading station may not have to be moved temporarily back to the automatic warehouse to the cumbersome operation of procuring another carrier pallet after the end of the urgent schedule may be avoided.

Thus, the time required for procuring a carrier pallet is minimized to consequently reduce the overall period of a machining cycle.

According to a still another aspect of the invention, the above objects are achieved by providing a method for controlling a sheet metal machining line provided with a machining schedule to be referred to for producing one or more than one different machined products, said machining schedule being formed by sequentially arranging unit machining schedules including data items for the number of products to be produced by machining, the size of the flat workpieces to be machined and the weight per workpiece of the workpieces, and designed to carry out a sequence of machining operations on said workpieces, characterized in that it comprises steps of assigning a unit machining schedule fitting a predetermined order out of said unit machining schedules by referring to said machining schedule, calculating the number of workpieces left to be machined for the unit machining schedule by referring to said data items belonging to the assigned unit machining schedule and the number of machined workpieces, determining if the number of workpieces left to be machined as calculated in the preceding calculating step exceeds a predetermined value or not, upon determining that the number of workpiece to be machined exceeds a predetermined value, analyzing the unit machining schedule, determining an occurrence or non-occurrence of a full load state of the carrier pallet loaded with machined workpieces on the basis of the analysis, upon determining an occurrence of a full load state of the carrier pallet in the preceding determining step, selecting a replacing carrier pallet good for the machined workpieces, determining if the selected carrier pallet is usable for loading said machined workpieces, and, upon determining that the selected carrier pallet is usable, transferring the carrier pallet from an automatic warehouse to a stand-by station.

With a method according to the invention and defined as above, firstly, a unit machining schedule fitting a predetermined order is assigned out of said unit machining schedules by referring to said machining schedule.

Then, the number of workpieces left to be machined for the unit machining schedule is calculated by referring to said data items belonging to the assigned unit machining schedule and the number of machined workpieces and it is also determined if the number of workpieces left to be machined as calculated in the preceding calculating step exceeds a predetermined value or not.

Upon determining that the number of workpiece to be machined exceeds a predetermined value, the unit machining schedule is analyzed and an occurrence or non-occurrence of a full load state of the carrier pallet loaded with machined workpieces is determined on the basis of the analysis.

Upon determining an occurrence of a full load state of the carrier pallet in the preceding determining step, a replacing carrier pallet good for the machined workpieces is selected and if the selected carrier pallet is usable for loading said machined workpieces is determined.

Finally, upon determining that the selected carrier pallet is usable, it is transferred from an automatic warehouse to a stand-by station.

Thus, an occurrence or non-occurrence of a full load state of a carrier pallet loaded with machined workpieces that is defined as a function of the overall height or the total weight of the workpieces loaded on the carrier pallet is determined by analyzing the corresponding machining schedule when machined workpieces are being loaded on the carrier pallet, provided that the number of workpieces left to be machined exceeds a predetermined value, and, at the same time, a replacing carrier pallet good for the workpiece to be loaded the next time is transferred to a stand-by station if the carrier pallet is usable by referring to the determination so that a usable replacing carrier pallet is transferred to the stand-by station for certain to minimize the time required for procuring a carrier pallet and consequently reduce the overall period of a machining cycle.

Therefore, a situation where an unusable carrier pallet is transferred to the stand-by station and another carrier pallet has to be procured can be effectively avoided and the time required for procuring a carrier pallet is minimized to consequently reduce the overall period of a machining cycle.

According to a still another aspect of the invention, the above objects are achieved by providing a method for controlling a sheet metal machining line provided with a machining schedule to be referred to for producing one or more than one different machined products, said machining schedule being formed by sequentially arranging unit machining schedules including data items for the number of products to be produced by machining, the size of the flat workpieces to be machined and the weight per workpiece of the workpieces, and designed to carry out a sequence of machining operations on said workpieces, characterized in that it comprises steps of assigning a unit machining schedule fitting a predetermined order out of said unit machining schedules by referring to said machining schedule, calculating the number of workpieces left to be machined for the unit machining schedule by referring to said data items belonging to the assigned unit machining schedule and the number of machined workpieces, determining if the number of workpieces left to be machined as calculated in the preceding calculating step exceeds a predetermined value or not, upon determining that the number of workpiece to be machined exceeds a predetermined value, analyzing the unit machining schedule, determining an occurrence or non-occurrence of a full load state of the carrier pallet loaded with machined workpieces on the basis of the analysis, upon determining an occurrence of a full load state of the carrier pallet in the preceding determining step, selecting a replacing carrier pallet good for the machined workpieces, determining if the selected carrier pallet is usable for loading said machined workpieces, upon determining that the selected carrier pallet is usable, determining if the carrier pallet stand-by station is available for the carrier pallet or not, and, upon determining that the carrier pallet stand-by station is available, transferring the carrier pallet from an automatic warehouse to a stand-by station.

With a method according to the invention and defined as above, firstly, a unit machining schedule fitting a predetermined order is assigned out of said unit machining schedules by referring to said machining schedule.

Then, the number of workpieces left to be machined for the unit machining schedule is calculated by referring to said data items belonging to the assigned unit machining schedule and the number of machined workpieces and it is also determined if the number of workpieces left to be machined as calculated in the preceding calculating step exceeds a predetermined value or not.

Upon determining that the number of workpiece to be machined exceeds a predetermined value, the unit machining schedule is analyzed and an occurrence or non-occurrence of a full load state of the carrier pallet loaded with machined workpieces is determined on the basis of the analysis.

Upon determining an occurrence of a full load state of the carrier pallet in the preceding determining step, a replacing carrier pallet good for the machined workpieces is selected and if the selected carrier pallet is usable for loading said machined workpieces is determined.

Upon determining that the selected carrier pallet is usable, if the carrier pallet stand-by station is available for it or not is determined.

Finally, upon determining that the stand-by station is available for the carrier pallet, it is transferred from an automatic warehouse to a stand-by station.

Thus, an occurrence or non-occurrence of a full load state of a carrier pallet loaded with machined workpieces that is defined as a function of the overall height or the total weight of the workpieces loaded on the carrier pallet is determined by analyzing the corresponding machining schedule when machined workpieces are being loaded on the carrier pallet, provided that the number of workpieces left to be machined exceeds a predetermined value, and, at the same time, a replacing carrier pallet good for the workpiece to be loaded the next time is transferred to a stand-by station if the carrier pallet is usable and the carrier pallet stand-by station is available by referring to the determination so that a usable replacing carrier pallet is transferred to the stand-by station for certain to minimize the time required for procuring a carrier pallet and consequently reduce the overall period of a machining cycle.

Therefore, a situation where the stand-by station is overcrowded and the procured carrier pallet is reduced to be unusable and another carrier pallet has to be procured can be effectively avoided and the time required for procuring a carrier pallet is minimized to consequently reduce the overall period of a machining cycle.

According to a still another aspect of the invention, the above objects are achieved by providing an apparatus for controlling a sheet metal machining line provided with a machining schedule to be referred to for producing one or more than one different machined products, said machining schedule being formed by sequentially arranging unit machining schedules including data items for the number of products to be produced by machining, the size of the flat workpieces to be machined and the weight per workpiece of the workpieces, and designed to carry out a sequence of machining operations on said workpieces, characterized in that it comprises a machining schedule assigning means for assigning a unit machining schedule fitting a predetermined order out of said unit machining schedules by referring to said machining schedule, a full load state occurrence determining means for analyzing said data items belonging to said assigned unit machining schedule and determining an occurrence or non-occurrence of a full load state of the carrier pallet loaded with machined workpieces on the basis of the analysis and a pallet transferring means for, upon determining an occurrence of a full load state of the carrier pallet in the preceding determining step, transferring a replacing carrier pallet good for the machined workpieces from an automatic warehouse to a stand-by station.

With an apparatus according to the invention and defined as above, firstly, the machining schedule assigning means assigns a unit machining schedule fitting a predetermined order out of said unit machining schedules by referring to said machining schedule.

Then, the full load state occurrence determining means analyzes said data items belonging to said assigned unit machining schedule and determines an occurrence or non-occurrence of a full load state of the carrier pallet loaded with machined workpieces on the basis of the analysis.

Finally, if an occurrence of a full load state of the carrier pallet is determined by the determining means, the pallet transferring means transfers a replacing carrier pallet good for the machined workpieces from an automatic warehouse to a stand-by station.

Thus, an occurrence or non-occurrence of a full load state of a carrier pallet loaded with machined workpieces is determined by analyzing the corresponding machining schedule when machined workpieces are loaded on the carrier pallet and a replacing carrier pallet good for the workpiece to be loaded the next time is made to stand-by by referring to the determination so that the time required for procuring a carrier pallet is minimized to consequently reduce the overall period of a machining cycle.

According to a still another aspect of the invention, the above objects are achieved by providing an apparatus for controlling a sheet metal machining line provided with a machining schedule to be referred to for producing one or more than one different machined products, said machining schedule being formed by sequentially arranging unit machining schedules including data items for the number of products to be produced by machining, the size of the flat workpieces to be machined and the weight per workpiece of the workpieces, and designed to carry out a sequence of machining operations on said workpieces, characterized in that it comprises a machining schedule assigning means for assigning a unit machining schedule fitting a predetermined order out of said unit machining schedules by referring to said machining schedule, a number of unmachined workpieces calculating means for calculating the number of workpieces left to be machined for the unit machining schedule by referring to said data items belonging to the assigned unit machining schedule and the number of machined workpieces, a number of unmachined workpieces determining means for determining if the number of workpieces left to be machined as calculated by the calculating means exceeds a predetermined value or not, a full load state occurrence determining means for, upon determining that the number of workpiece to be machined exceeds a predetermined value, analyzing the unit machining schedule and determining an occurrence or non-occurrence of a full load state of the carrier pallet loaded with machined workpieces on the basis of the analysis and a pallet transferring means for, upon determining an occurrence of a full load state of the carrier pallet in the preceding determining step, transferring a replacing carrier pallet good for the machined workpieces from an automatic warehouse to a stand-by station.

With an apparatus according to the invention and defined as above, firstly, the machining schedule assigning means assigns a unit machining schedule fitting a predetermined order out of said unit machining schedules by referring to said machining schedule.

Then, the number of unmachined workpieces calculating means calculates the number of workpieces left to be machined for the unit machining schedule by referring to said data items belonging to the assigned unit machining schedule and the number of machined workpieces and it is also determined if the number of workpieces left to be machined as calculated in the preceding calculating step exceeds a predetermined value or not.

Upon determining that the number of workpiece to be machined exceeds a predetermined value, the full load state occurrence determining means analyzes the unit machining schedule and determines an occurrence or non-occurrence of a full load state of the carrier pallet loaded with machined workpieces on the basis of the analysis.

Finally, if an occurrence of a full load state of the carrier pallet is determined by the full load state occurrence determining means, the pallet transferring means transfers a replacing carrier pallet good for the machined workpieces from an automatic warehouse to a stand-by station.

Thus, an occurrence or non-occurrence of a full load state of a carrier pallet loaded with machined workpieces that is defined as a function of the overall height or the total weight of the workpieces loaded on the carrier pallet is determined by analyzing the corresponding machining schedule when machined workpieces are being loaded on the carrier pallet, provided that the number of workpieces left to be machined exceeds a predetermined value, and, at the same time, a replacing carrier pallet good for the workpiece to be loaded the next time is made to stand-by by referring to the determination so that the time required for procuring a carrier pallet is minimized to consequently reducing the overall period of a machining cycle.

Therefore, if a small number is selected for the predetermined value, the operation of procuring a replacing carrier pallet and having it in a stand-by station is carried out immediately before the machining operation according to the unit machining schedule is over so that, if there is a request for an interrupt of an urgent schedule, the carrier pallet currently being located in the loading station may not have to be moved temporarily back to the automatic warehouse to the cumbersome operation of procuring another carrier pallet after the end of the urgent schedule may be avoided.

Thus, the time required for procuring a carrier pallet is minimized to consequently reduce the overall period of a machining cycle.

According to a still another aspect of the invention, the above objects are achieved by providing an apparatus for controlling a sheet metal machining line provided with a machining schedule to be referred to for producing one or more than one different machined products, said machining schedule being formed by sequentially arranging unit machining schedules including data items for the number of products to be produced by machining, the size of the flat workpieces to be machined and the weight per workpiece of the workpieces, and designed to carry out a sequence of machining operations on said workpieces, characterized in that it comprises a machining schedule assigning means for assigning a unit machining schedule fitting a predetermined order out of said unit machining schedules by referring to said machining schedule, a number of unmachined workpieces calculating means for calculating the number of workpieces left to be machined for the unit machining schedule by referring to said data items belonging to the assigned unit machining schedule and the number of machined workpieces, a number of unmachined workpieces determining means for determining if the number of workpieces left to be machined as calculated by the calculating means exceeds a predetermined value or not, a full load state occurrence determining means for, upon determining that the number of workpiece to be machined exceeds a predetermined value, analyzing the unit machining schedule and determining an occurrence or non-occurrence of a full load state of the carrier pallet loaded with machined workpieces on the basis of the analysis, a pallet selecting means for, upon determining an occurrence of a full load state of the carrier pallet in the preceding determining step, for selecting a replacing carrier pallet good for the machined workpieces, a usability determining means for determining if the carrier pallet selected by the pallet selecting means is usable for loading the machined workpieces and pallet transferring means, if the selected carrier pallet is determined by to usable by the usability determining means, for transferring the replacing carrier pallet good for the machined workpieces from an automatic warehouse to a stand-by station.

With an apparatus according to the invention and defined as above, firstly, the machining schedule assigning means assigns a unit machining schedule fitting a predetermined order out of said unit machining schedules by referring to said machining schedule.

Then, the number of unmachined workpieces calculating means calculates the number of workpieces left to be machined for the unit machining schedule by referring to said data items belonging to the assigned unit machining schedule and the number of machined workpieces and it is also determined if the number of workpieces left to be machined as calculated in the preceding calculating step exceeds a predetermined value or not.

Upon determining that the number of workpiece to be machined exceeds a predetermined value, the full load state occurrence determining means analyzes the unit machining schedule and determines an occurrence or non-occurrence of a full load state of the carrier pallet loaded with machined workpieces on the basis of the analysis.

If an occurrence of a full load state of the carrier pallet is determined by the full load state occurrence determining means, the pallet selecting means selects a replacing carrier pallet good for the machined workpieces and the usability determining means determines if the carrier pallet selected by the pallet selecting means is usable for loading the machined workpieces.

If the selected carrier pallet is determined by to usable by the usability determining means, the pallet transferring means transfers the replacing carrier pallet good for the machined workpieces from an automatic warehouse to a stand-by station.

Thus, an occurrence or non-occurrence of a full load state of a carrier pallet loaded with machined workpieces that is defined as a function of the overall height or the total weight of the workpieces loaded on the carrier pallet is determined by analyzing the corresponding machining schedule when machined workpieces are being loaded on the carrier pallet, provided that the number of workpieces left to be machined exceeds a predetermined value, and, at the same time, a replacing carrier pallet good for the workpiece to be loaded the next time is transferred to a stand-by station if the carrier pallet is usable by referring to the determination so that a usable replacing carrier pallet is transferred to the stand-by station for certain to minimize the time required for procuring a carrier pallet and consequently reduce the overall period of a machining cycle.

Therefore, a situation where an unusable carrier pallet is transferred to the stand-by station and another carrier pallet has to be procured can be effectively avoided and the time required for procuring a carrier pallet is minimized to consequently reduce the overall period of a machining cycle.

According to a still another aspect of the invention, the above objects are achieved by providing an apparatus for controlling a sheet metal machining line provided with a machining schedule to be referred to for producing one or more than one different machined products, said machining schedule being formed by sequentially arranging unit machining schedules including data items for the number of products to be produced by machining, the size of the flat workpieces to be machined and the weight per workpiece of the workpieces, and designed to carry out a sequence of machining operations on said workpieces, characterized in that it comprises a machining schedule assigning means for assigning a unit machining schedule fitting a predetermined order out of said unit machining schedules by referring to said machining schedule, a number of unmachined workpieces calculating means for calculating the number of workpieces left to be machined for the unit machining schedule by referring to said data items belonging to the assigned unit machining schedule and the number of machined workpieces, a number of unmachined workpieces determining means for determining if the number of workpieces left to be machined as calculated by the calculating means exceeds a predetermined value or not, a full load state occurrence determining means for, upon determining that the number of workpiece to be machined exceeds a predetermined value, analyzing the unit machining schedule and determining an occurrence or non-occurrence of a full load state of the carrier pallet loaded with machined workpieces on the basis of the analysis, a pallet selecting means for, upon determining an occurrence of a full load state of the carrier pallet in the preceding determining step, for selecting a replacing carrier pallet good for the machined workpieces, a usability determining means for determining if the carrier pallet selected by the pallet selecting means is usable for loading the machined workpieces, a stand-by station availability determining means for, upon determining that the selected carrier pallet is usable, determining if the carrier pallet stand-by station is available for the carrier pallet or not, and a pallet transferring means for, upon determining that the carrier pallet stand-by station is available, transferring the carrier pallet from an automatic warehouse to a stand-by station.

With an apparatus according to the invention and defined as above, firstly, the machining schedule assigning means assigns a unit machining schedule fitting a predetermined order out of said unit machining schedules by referring to said machining schedule.

Then, the number of unmachined workpieces calculating means calculates the number of workpieces left to be machined for the unit machining schedule by referring to said data items belonging to the assigned unit machining schedule and the number of machined workpieces and it is also determined if the number of workpieces left to be machined as calculated in the preceding calculating step exceeds a predetermined value or not.

Upon determining that the number of workpiece to be machined exceeds a predetermined value, the full load state occurrence determining means analyzes the unit machining schedule and determines an occurrence or non-occurrence of a full load state of the carrier pallet loaded with machined workpieces on the basis of the analysis.

If an occurrence of a full load state of the carrier pallet is determined by the full load state occurrence determining means, the pallet selecting means selects a replacing carrier pallet good for the machined workpieces and the usability determining means determines if the carrier pallet selected by the pallet selecting means is usable for loading the machined workpieces.

If the selected carrier pallet is determined to be usable by the usability determining means, the stand-by station availability determining means determines if the carrier pallet stand-by station is available for the carrier pallet or not.

Finally, if the stand-by station is determined to be available by the usability determining means, the pallet transferring means transfers the replacing carrier pallet good for the machined workpieces from an automatic warehouse to a stand-by station.

Thus, an occurrence or non-occurrence of a full load state of a carrier pallet loaded with machined workpieces that is defined as a function of the overall height or the total weight of the workpieces loaded on the carrier pallet is determined by analyzing the corresponding machining schedule when machined workpieces are being loaded on the carrier pallet, provided that the number of workpieces left to be machined exceeds a predetermined value, and, at the same time, a replacing carrier pallet good for the workpiece to be loaded the next time is transferred to a stand-by station if the carrier pallet is usable and the carrier pallet stand-by station is available by referring to the determination so that a usable replacing carrier pallet is transferred to the stand-by station for certain to minimize the time required for procuring a carrier pallet and consequently reduce the overall period of a machining cycle.

Therefore, a situation where the stand-by station is overcrowded and the procured carrier pallet is reduced to be unusable and another carrier pallet has to be procured can be effectively avoided and the time required for procuring a carrier pallet is minimized to consequently reduce the overall period of a machining cycle.

According to an aspect of the invention, the above objects are achieved by providing a workpiece identifying apparatus comprising a pallet for carrying flat rough workpieces provided at least at a pair of diagonally disposed corners thereof with respective absolute reference points for determining the XY dimensions of the rough workpieces, a flat image pickup means arranged vis-a-vis the surface plane of said workpieces for obtaining a flat image of the workpieces with said pair of absolute reference points and the corners of the workpieces located in proximity to said respective absolute reference points, an absolute reference point determining means for extracting said pair of absolute reference points from said flat image obtained by the flat image pickup means and determining the locations of the absolute reference points for measuring the XY dimensions of the workpieces, a relative reference point determining means for extracting the relative reference points arranged on the workpieces including the corners of the workpieces from said flat image obtained by the flat image pickup means and determining the locations of the relative reference points for measuring the XY dimensions of the workpieces, a relative difference computing means for computing the differential between each of the absolute reference points locationally determined by said absolute reference point determining means and the corresponding one of the relative reference points locationally determined by said relative reference point determining means by way of the X-component and the Y-component of the differential and an XY dimensions computing means for computing the XY dimensions of the workpieces from the result of computation produced by said relative difference computing means and the known XY dimensions of a given square having a pair of diagonally disposed corners located on said pair of absolute reference points of said pallet.

With the above arrangement of the invention, the flat image pickup means takes a flat image of the workpieces with the pair of absolute reference points and the corners of the workpieces located in proximity to the respective absolute reference points. Then, the absolute reference point determining means extracts the pair of absolute reference points from the flat image obtained by the flat image pickup means and determines the locations of the absolute reference points for measuring the XY dimensions of the workpieces. The relative reference point determining means extracts the relative reference points arranged on the workpieces including the corners of the workpieces from the flat image obtained by the flat image pickup means and determines the locations of the relative reference points for measuring the XY dimensions of the workpieces. Thereafter, the relative difference computing means computes the differential between each of the absolute reference points locationally determined by the absolute reference point determining means and the corresponding one of the relative reference points also locationally determined by the relative reference point determining means by way of the X-component and the Y-component of the differential. The XY dimensions computing means computes the XY dimensions of the workpieces from the result of computation produced by the relative difference computing means and the known XY dimensions of a given square having a pair of diagonally disposed corners located on the pair of absolute reference points of the pallet. Thus, with the above apparatus, the XY dimensions of the workpieces can be automatically known to identify the workpieces by arranging absolute reference points on the pallet and relative reference points on the workpieces and computing the XY dimensions of the workpieces from the differential between each of the absolute reference points and the corresponding one of the relative reference points and the XY dimensions of a square formed on the pallet.

According to another aspect of the invention, the objects are achieved by providing a workpiece identifying apparatus comprising a surface image data storage master for storing surface image data on the surface images of a plurality of flat workpieces of different materials obtained under a given lighting arrangement for future use, said data being classified in terms of the materials of the workpieces, a surface image pickup means arranged vis-a-vis the surface plane of a workpiece placed in position for obtaining a flat image of the workpiece, a surface image matching judging means for retrieving the surface image data of a surface image most resembling to the surface image of the workpiece from the surface image data storage master by sequentially referring to the surface image data stored in said surface image data storage master and a material determining means for determining the material of the workpiece from the result of matching judgment produced by the surface image matching judging means.

With the above arrangement of the invention, the surface image pickup means takes a surface image of the workpiece placed in position. Then, the surface image matching judging means retrieves the surface image data of a surface image most resembling to the surface image of the workpiece from the surface image data storage master by sequentially referring to the surface image data stored in said surface image data storage master. The material determining means determines the material of the workpiece from the result of matching judgment produced by the surface image matching judging means. Thus, with the above apparatus, the material of the workpiece placed in position can be automatically known to identify the workpiece by sequentially comparing the surface image data stored in said surface image data storage master and the surface image data obtained from the image taken by the surface image pickup means.

According to still another aspect of the invention, the above objects are achieved by providing a workpiece identifying apparatus comprising a lateral image pickup means for taking a lateral image of a plurality of workpieces placed in position in layers, an inter-workpiece gap extracting means for extracting the gaps of adjacently laid workpieces from the lateral image obtained by the lateral image pickup means and a workpiece thickness computing means for computing the thickness of each of the workpieces by determining the gaps extracted by the inter-workpiece gaps extracting means.

With the above arrangement, the lateral image pickup means takes a lateral image of a plurality of workpieces placed in position in layers. Then, the inter-workpiece gap extracting means extracts the gaps of adjacently laid workpieces from the lateral image obtained by the lateral image pickup means. The workpiece thickness computing means computes the thickness of each of the workpieces by determining the gaps extracted by the inter-workpiece gaps extracting means. Thus, with the above apparatus, the thickness of each of the workpieces placed in position in layers can be automatically known to identify the workpieces by determining the gaps of adjacently laid workpieces.

According to a further aspect of the invention, the above objects are achieved by providing a workpiece identifying apparatus comprising a lateral image pickup means for taking a lateral image of a plurality of workpieces placed in position in layers, a workpiece lowest level extracting means for extracting the lowest level of the workpieces from the lateral image obtained by said lateral image pickup means and obtaining the coordinate values of the extracted lowest level for a predetermined coordinate system, a workpiece highest level extracting means for extracting the highest level of the workpieces from the lateral image obtained by said lateral image pickup means and obtaining the coordinate values of the extracted highest level for the predetermined coordinate system, an accumulated workpiece height computing means for determining the accumulated height of the workpieces between the lowest level and the highest level of the workpieces by determining the difference of the coordinate values along the Y-axis of the coordinate system obtained by said workpiece lowest level extracting means and said workpiece highest level extracting means, an inter-workpiece gap extracting means for extracting the gaps of adjacently laid workpieces from the lateral image obtained by the lateral image pickup means, a workpiece thickness computing means for computing the thickness of each of the workpieces by determining the gaps extracted by the inter-workpiece gaps extracting means and a number of accumulated workpieces computing means for computing the number of accumulated workpieces by dividing the accumulated height of the workpieces determined by said accumulated workpiece height computing means by the thickness of each of the workpieces determined by said workpiece thickness computing means.

With the above arrangement, the lateral image pickup means takes a lateral image of a plurality of workpieces placed in position in layers. Then, the workpiece lowest level extracting means extracts the lowest level of the workpieces from the lateral image obtained by the lateral image pickup means and obtains the coordinate values of the extracted lowest level for a predetermined coordinate system. The workpiece highest level extracting means extracts the highest level of the workpieces from the lateral image obtained by said lateral image pickup means and obtains the coordinate values of the extracted highest level for the predetermined coordinate system. The accumulated workpiece height computing means determines the accumulated height of the workpieces between the lowest level and the highest level of the workpieces by determining the difference of the coordinate values along the Y-axis of the coordinate system obtained by the workpiece lowest level extracting means and the workpiece highest level extracting means. The inter-workpiece gap extracting means extracts the gaps of adjacently laid workpieces from the lateral image obtained by the lateral image pickup means. The workpiece thickness computing means computes the thickness of each of the workpieces by determining the gaps extracted by the inter-workpiece gaps extracting means. Thereafter, the number of accumulated workpieces computing means computes the number of accumulated workpieces by dividing the accumulated height of the workpieces determined by the accumulated workpiece height computing means by the thickness of each of the workpieces determined by said workpiece thickness computing means. Thus, with the above apparatus, the number of the workpieces accumulated in position in layers can be automatically known to identify the workpieces by determining the accumulated height of the workpieces between the lowest level and the highest level of the workpieces, computing the thickness of each of the workpieces by determining the inter-workpiece gaps and dividing the accumulated height of the workpieces by the thickness of each of the workpieces.

The nature, principle and utility of the invention will become more apparent from the following detailed description when read in conjunction with the accompanying drawings.

BRIEF DESCRIPTION OF THE DRAWINGS

In the accompanying drawings:

FIG. 20 is an illustration of skid data;

FIG. 21 is an illustration of pallet data;

FIG. 22 is an illustration of part of the specifications of pallet;

FIG. 23 is an illustration of an inventory master file;

FIG. 24 is an illustration of a workpiece master file;

FIG. 29 is a schematic perspective view of three cameras arranged in a feed/delivery station for the purpose of the invention;

FIG. 36 is a schematic illustration of a rough sheet metal code master; and

FIG. 37 is a schematic illustration of a material code master.

DESCRIPTION OF THE PREFERRED EMBODIMENTS

Now, a method and an apparatus for detecting a full load state of a sheet metal machining line and a method and an apparatus for controlling a sheet metal machining line and workpiece identifying apparatus will be described in greater detail by referring to the accompanying drawings that illustrate a number of preferred embodiments.

To begin with, some principal common components of the embodiments will be described.

Firstly, a sheet metal machining line provided with peripheral equipment and controlled by a method according to the invention will be described by referring to FIG. 3.

Figure 1:
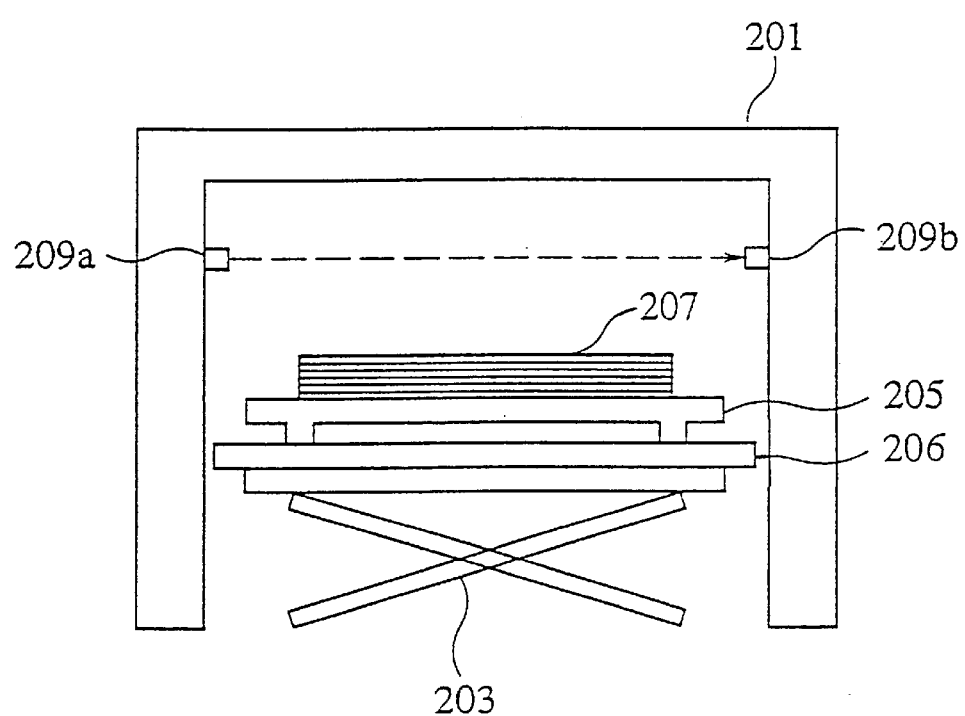
FIG. 1 is a schematic illustration of the prior art.
Figure 2:
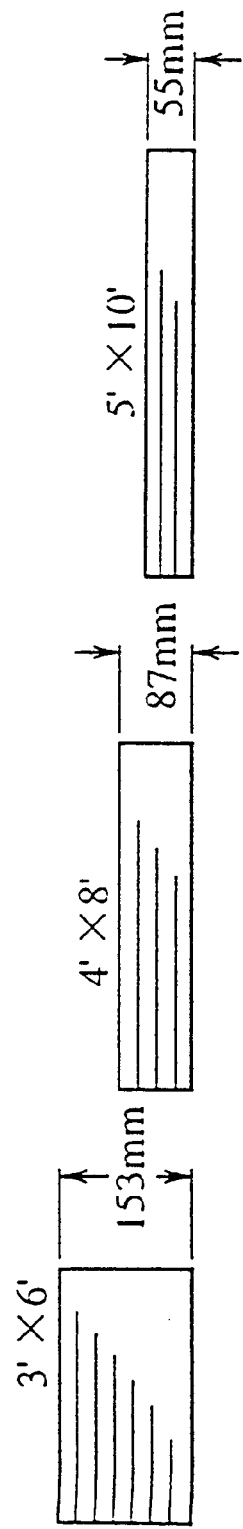
FIG. 2 is an illustration of the relationship between the height and the size of workpieces.
Figure 3:
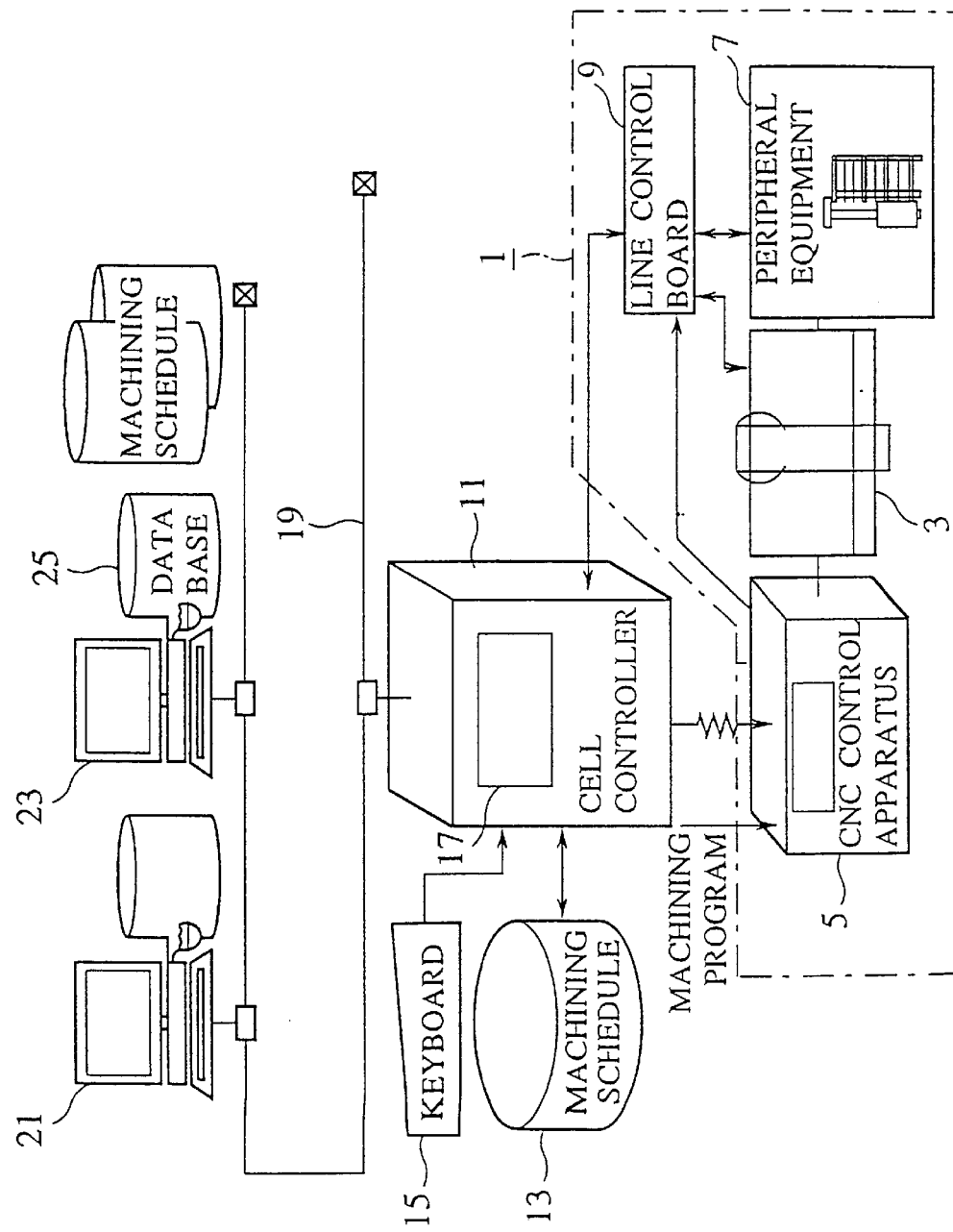
FIG. 3 is a block diagram of a sheet metal machining

As seen from FIG. 3, the sheet metal machining line 1 comprises an NC machining center 3 that typically includes a turret punch press for punching holes through sheet metals by selectively using a plurality of different metal molds, a CNC control apparatus 5 for controlling the operation of the NC machining center 3 according to a machining program, a workpiece holding/releasing unit for holding and releasing workpieces to be machined by the NC machining center 3, an automatic warehouse for storing a number of workpieces in groups according to the materials and the dimensions of the workpieces, peripheral equipment 7 including one or more than one crane vehicles for moving workpieces from the automatic warehouse to the workpiece holding/releasing unit and a line control board 9 connected to the NC machining center 3, the CNC control apparatus 5 and the peripheral equipment 7 for controlling the sequence of operations of the sheet metal machining line 1.

Additionally, the sheet metal machining line 1 is connected to a cell controller 11 for transferring machining programs to the CNC control apparatus 5 and also transferring ladder-sequence programs to the line control board 9 in order to control the entire operation of the sheet metal machining line 1 in a coordinated manner.

The cell controller 11 is provided with a memory device having a predetermined capacity typically for storing machining schedules 13 prepared according to a given production plan and referred to in the course of manufacturing products according to the production plan.

The cell controller 11 is additionally provided with a keyboard 15 for entering character and numerical data and a display unit 17 for displaying a carrier pallet full load state on the display screen whenever such a state occurs.

The cell controller 11 is connected to a local area network (hereinafter referred to as LAN) 19 such as Ethernet.

The LAN 19 is by turn connected to an automatic programming apparatus 21 for automatic preparation of machining programs necessary for manufacturing specific products including CAD data on the sequence of machining operations, the machining conditions and the tools to be used for machining in order to produce the products and a parent server 23 for controlling various data and programs in a coordinated manner including the machining programs prepared by the automatic programming apparatus 21, CAD data on different products and data on machining schedules, said parent server 23 being additionally capable of transferring machining schedules to the cell controller 11.

Then, the parent server 23 is connected to a data base 25 for storing machining programs, CAD data on different products and data on machining schedules according to given data base formats and so configured that, when the machining schedules 13 are, if partly, updated manually or automatically through the cell controller 11 operating as an on-site terminal, the data base 25 is accordingly updated by way of the LAN 19 in order to keep the data base 25 always current.

The peripheral equipment 7 connected to the sheet metal machining line 1 will now be described by referring to FIGS. 10 through 12.

Figure 10:
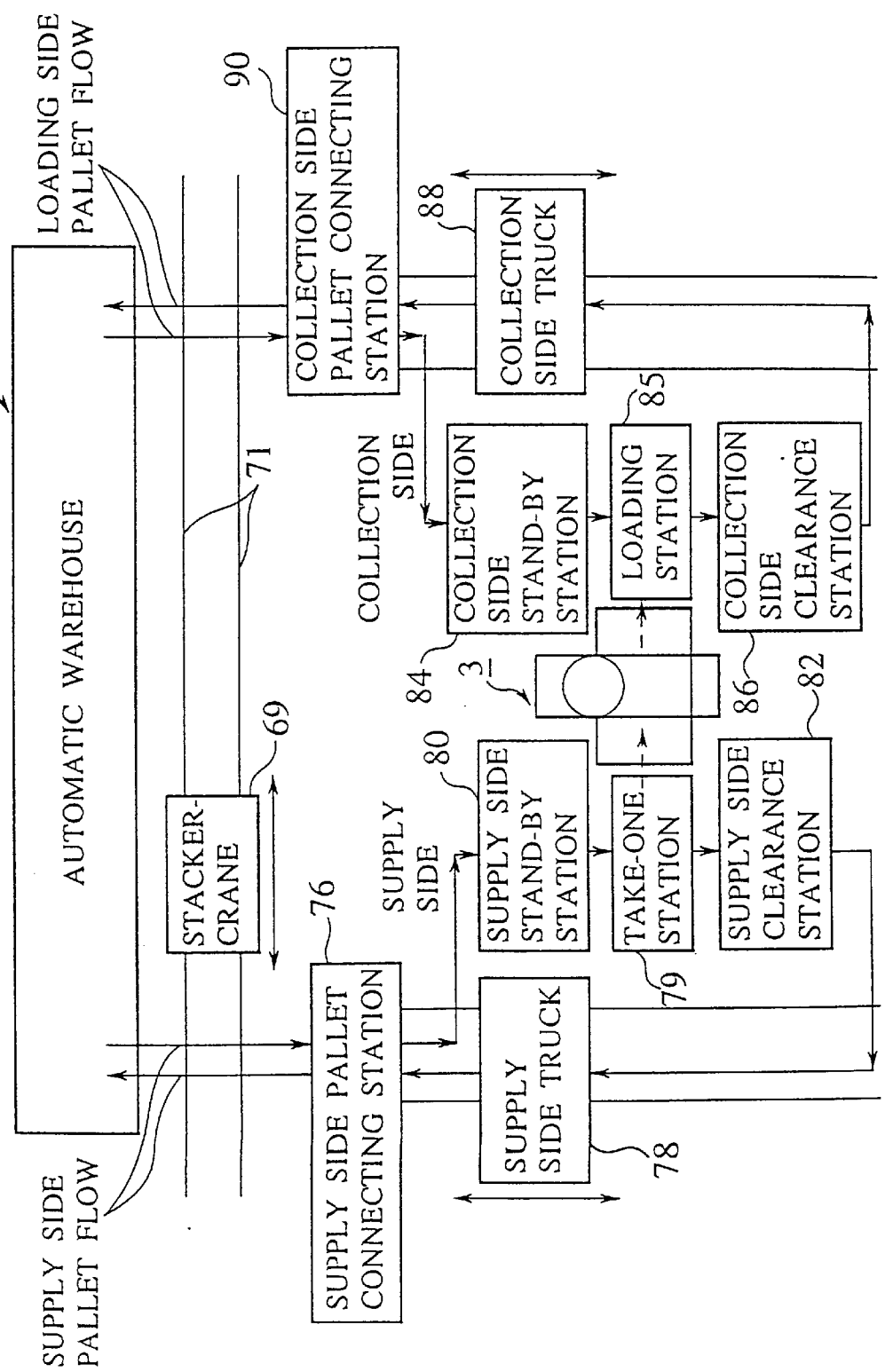
FIG. 10 is a chart of the operation of pallets in a sheet metal machining line to which the present invention is applicable.

As shown in FIG. 10, the sheet metal machining line 1 is provided with an automatic warehouse 61 operating as a buffer in the course of supplying the NC machining center 3 with a required number of rough workpieces of desired materials and dimensions on a just in-time basis.

The automatic warehouse 61 sorts out workpieces brought in by pallets 65 according to their materials and dimensions in such a way that workpieces of a same group to be machined and delivered simultaneously can be stored on a same shelf.

Additionally, the automatic warehouse 61 is provided on a side thereof with a stacker-crane 69 designed to move on a pair of parallel rails 71 laid along the longitudinal direction of the automatic warehouse 61 in a self-controlled manner.

The stacker-crane 69 carries thereon an lift (not shown) and a traverser arranged on the lift for transferring a pallet 65 loaded with workpieces 63 from a shelf of the automatic warehouse 61 to the crane 69 or from the crane 69 to an available vacant shelf in the automatic warehouse 61 so that newly supplied workpieces 63 can be transferred to available vacant shelves in the automatic warehouse 61 for storage and desired workpieces 63 can be moved from the shelves storing them in the automatic warehouse 61 for transfer.

On the side of the rails of the stacker-crane 69 opposite to the automatic warehouse 61, there are provided a supply side connecting station 76, a supply side truck 78, a supply side stand-by station 80, a take-one station 79 and a supply side clearance station 82 in order to send pallets 65 loaded with workpieces and stored in the automatic warehouse 61 to the NC machining center 3 and to return pallets 65 that are fully loaded or to be discharged after a machining cycle to the automatic warehouse 61.

Said supply side connecting station 76 and the supply side stand-by station 80 have a relaying function for pallets 65 loaded with workpieces 63 and being transferred from the automatic warehouse 61 to the NC machining center 3.

When a shipment command is issued by the cell controller 11, the stacker-crane 69 transfers a specified pallet 65 to the supply side connecting station 76 and then the pallet 65 is further transferred to the supply side stand-by station 80 by means of the supply side truck 78.

The pallet 65 transferred to the supply side stand-by station 80 is moved further to the take-one station 79, where the uppermost workpiece 63 is picked up and fed to the NC machining center 3.

A pallet 65 that has come to an end of a machining cycle or that is fully loaded with workpieces 63 is then transferred to the supply side clearance station 82 and then moved to the supply side connecting station 76 by means of the supply side truck 78 and further to a predetermined shelf of the automatic warehouse 61 by means of the stacker-crane 69.

Also on the side of the rails of the stacker-crane 69 opposite to the automatic warehouse 61, there are provided a collection side pallet connecting station 90, a collection side truck 88, a collection side stand-by station 84, a loading station 85 and a collection side clearance station 86.

Said collection side connecting station 90 and the collection side stand-by by station 84 have a relaying function for empty pallets being transferred from the automatic warehouse 61 to the NC machining center 3.

When a shipment command is issued by the cell controller 11, the stacker-crane 69 transfers a specified empty pallet to the collection side connecting station 90 and then the empty pallet is further transferred to the collection side stand-by station 84 by means of the collection side truck 88.

The empty pallet transferred to the collection side stand-by station 84 is moved further to the loading station 85, where workpieces 63 are machined by the NC machining center 3 are loaded on the empty pallet.

If the pallet 65 is fully loaded or has to be replaced by a pallet 65 of a different type, the fully loaded pallet 65 is transferred to the collection side clearance station 90 and then moved to the collection side pallet connecting station 90 by means of the collection side truck 88 and further to a predetermined shelf of the automatic warehouse 61 by means of the stacker-crane 69.

Now, the take-one station 79, the NC machining center 3 and the periphery of the loading station 85 will be described further by referring to FIGS. 11 and 12.

Figure 11:
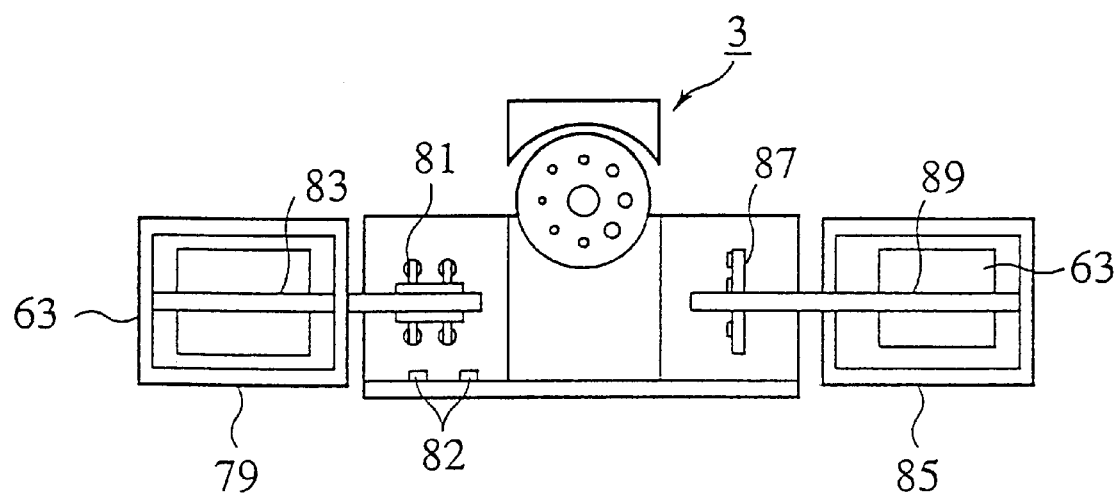
FIG. 11 is a schematic illustration of a sheet metal machining line to which the present invention is applicable.
Figure 12:
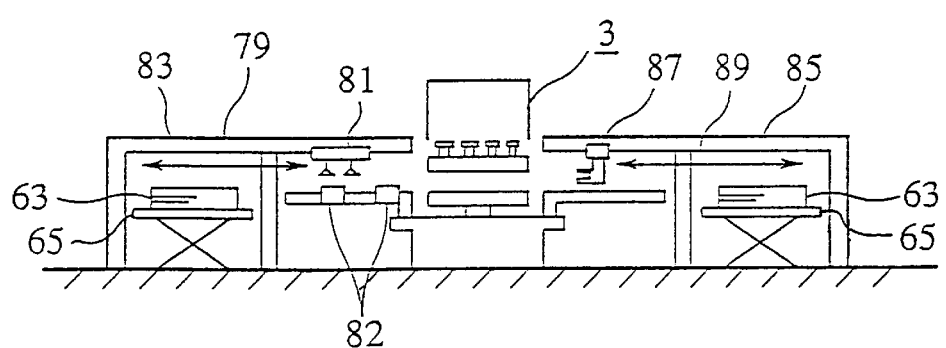
FIG. 12 is another schematic illustration of a sheet metal machining line to which the present invention is applicable.

As shown in FIGS. 11 and 12, the take-one station 79 is provided in an upper area thereof with a take-one station side rail 83 extending toward the NC machining center 3 and a vacuum head 81 movable horizontally and vertically along the rail 83 and designed to pick up the uppermost workpiece 63 on the pallet 65 for delivery.

Thus, the workpieces 63 on the pallet 65 are delivered to the NC machining center 3 on a one-by-one basis by means of a vacuum head 81.

Each workpiece 63 fed to the NC machining center 3 is then held by a workpiece clamp 82 arranged on the NC machining center 3 and placed in position so that the workpiece 63 may be machined according to a program.

The loading station 85 is arranged for collecting machined workpieces 63 from the NC machining center 3 on the side of take-one station 79 opposite to the NC machining center 3.

It is provided in an upper area thereof with a loading station side rail 89 extending from the NC machining center 3 and a clamp unit 87 movable horizontally and vertically along the rail 89 and designed to clamp and move the machined workpiece 63 away from the NC machining center 3.

Thus, each workpiece 63 machined by the NC machining center 3 is then moved to the loading station 85 for temporary storage.

The machining schedule 13 will now be described in greater detail.

Figure 17:
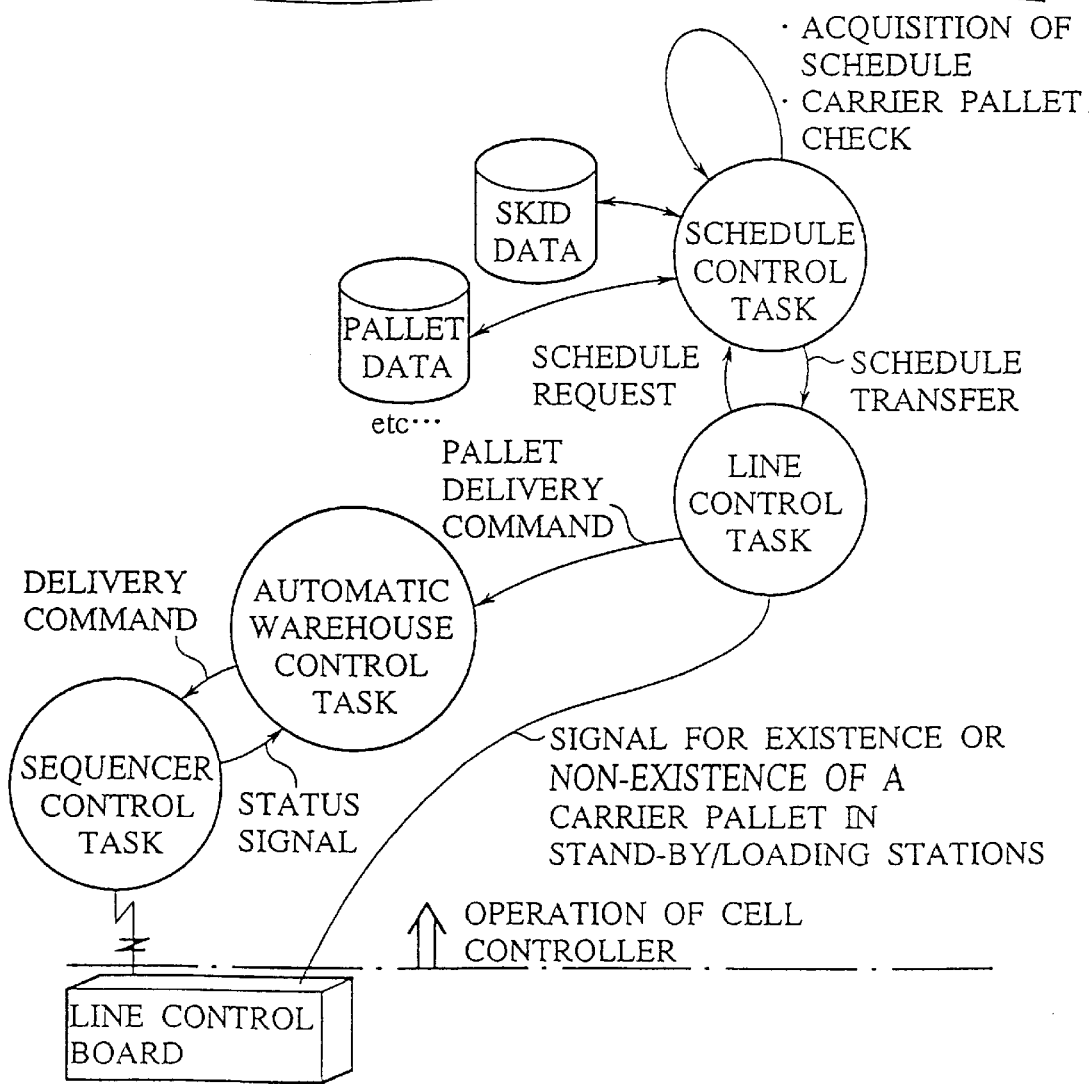
FIG. 17 is chart illustrating the flow of machining information and that of the operation of information processing.

As shown in FIG. 17, the machining schedule 13 is referred to when workpieces are sequentially machined to produce products of different types.

Additionally, it is designed to rearrange a plurality of data items incidentally generated in the course of machining operations in columns as record units for different products, which records units are then arranged in rows according to the machining sequence.

The files in the machining schedule 13 are arranged in data base formats.

For the purpose of the present invention, a unit record will be referred to a unit machining schedule hereinafter.

Data items are differentiated according to different schedules and include address numbers to be assigned on a first-in first-out basis, machining program identification numbers to be assigned in correspondence to address numbers, the number of workpieces to be machined by each machining operation, the presence or absence of a specific operational arrangement and completion codes.

The presence or absence of a specific operational arrangement comes into the scene for replacing metal molds and aligning workpieces.

Data will be described on the presence or absence of a specific operational arrangement for shifting the position of the workpiece clamp unit.

Completion codes will be used for describing data representing the completion or incompletion of the machining operation for a unit machining schedule or a machining operation to be skipped.

A first embodiment of apparatus for detecting a pallet full load state according to the invention firstly assigns a unit machining schedule having a predetermined priority out of a number of unit machining schedules to be processed by referring to the machining schedule 13 and then determines the size of the workpieces 63 to be machined according to the assigned unit machining schedule.

Then, it selectively takes in the detection output of one of a plurality of top level sensors arranged vertically along the inner wall of the loading station 85 and determines if the carrier pallet there is in a full load state or not according to the detection output.

In other words, the first embodiment of apparatus for detecting a pallet full load state according to the invention selects an appropriate upper limit value depending on the size of the workpieces loaded on a pallet so that it can show a constant level of accuracy of detecting a pallet full load state regardless of the size of the workpieces loaded on the carrier pallet.

Figure 6:
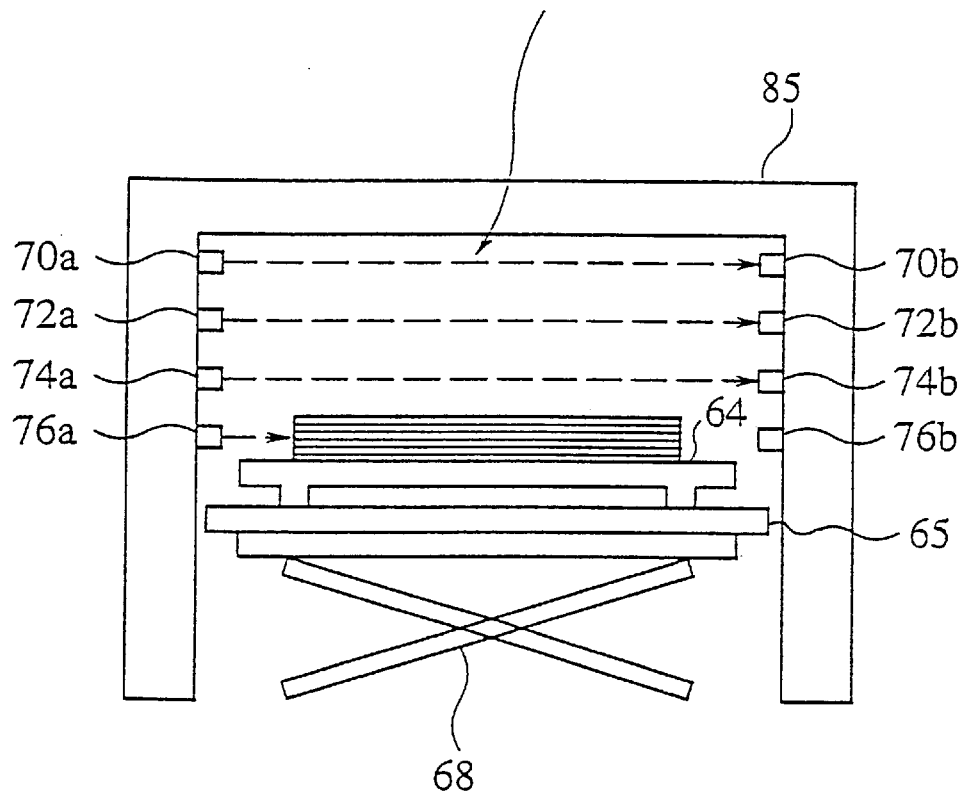
FIG. 6 is an illustration for the first embodiment.

As shown in FIG. 6, a loading station 85 adapted to the first embodiment of the invention comprises a lifter 68 for supporting a pallet 65 carrying thereon workpieces 63 with a skid 64 interposed therebetween.

The lifter 68 is provided with a support mechanism (not shown) such as a hydraulic cylinder and designed to support from under the carrier pallet that carries workpieces 63, slightly and correspondingly moving downward as a function of the total weight of the workpieces 63 loaded on the carrier pallet 65.

On the other hand, the loading station 85 is provided on the inner wall thereof with vertically arranged first through fourth top level sensors 70, 72, 74 and 76 for detecting if the top level of the workpieces 63 gets there, said top level sensors being arranged at different respective levels.

The first top level sensor 70a, 70b may be used for detecting the top level of 3'×6' workpieces and the second top level sensor 72a, 72b may be used for detecting the top level of 4'×8' workpieces, whereas the third top level sensor 74a, 74b may be used for detecting the top level of 5'×10' workpieces and the fourth top level sensor 76a, 76b may be used for detecting the top level of workpieces greater than 5'×10'.

Data on the relationships between the top level sensors and the respective workpiece sizes are stored in a memory device (not shown) of the cell controller 11 and can be read out whenever necessary.

Figure 4:
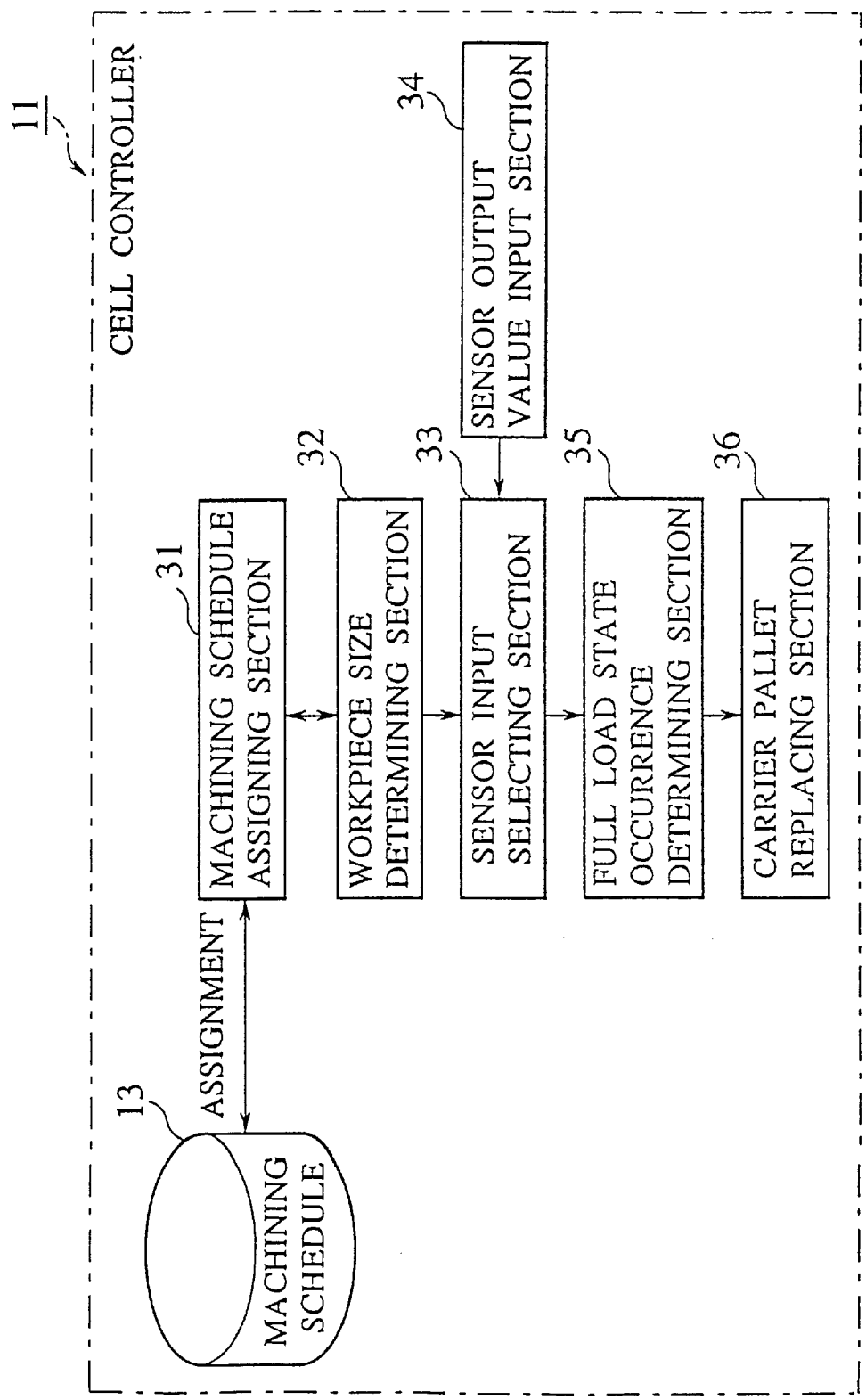
FIG. 4 is a block diagram of a first embodiment of apparatus for detecting a pallet full load state.

The cell controller 11 takes a major role in the operation of the first embodiment of apparatus for detecting a pallet full load state and has a configuration as shown in the block diagram of FIG. 4.

Referring to FIG. 4, the cell controller 11 comprises a machining schedule assigning section 31 for assigning a unit machining schedule having a predetermined priority out of a number of unit machining schedules to be processed by referring to the machining schedule 13, a workpiece size determining section 32 for analyzing the data items of the assigned unit machining schedule and determining the size of the workpieces 63 to be machined on the basis of the analysis, a sensor output value input section 34 for taking in the sensor output values of the top level sensors 70, 72, 74 and 76, a sensor input selecting section 33 for selecting one of the sensor output values good for the workpiece size determined by the workpiece size determining section 32, a full load state occurrence determining section 35 for determining if the carrier pallet being loaded with workpieces 63 is in a full load state or not according to the sensor output value selected by the sensor input selecting section 33 and a carrier pallet replacing section 36 for replacing the carrier pallet currently in the loading station 85 with an empty pallet when the occurrence of a pallet full load state is determined by the full load state occurrence determining section 35.

Figure 5:
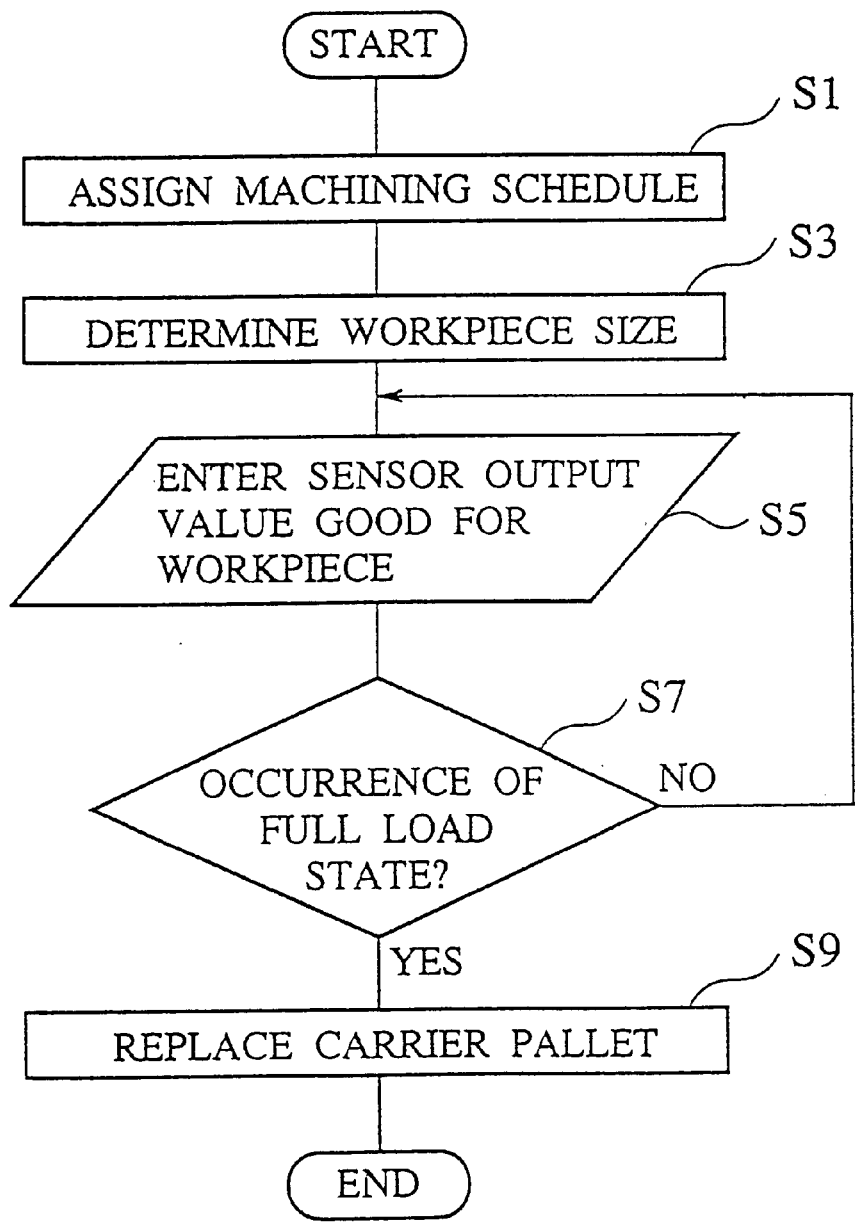
FIG. 5 is a flow chart of the operation of the first embodiment of apparatus for detecting a pallet full load state.

Now the operation of the first embodiment of apparatus for detecting a pallet full load state according to the invention will be described by referring to FIG. 5 showing a flow chart of the operation thereof and also to FIGS. 4, 6 and 10 through 12.

Firstly, the machining schedule assigning section 31 assigns a unit machining schedule having a predetermined priority and the smallest schedule number out of a number of unit machining schedules to be processed by referring to the machining schedule 13 (Step S1) and transmits a machining command for the assigned unit machining schedule to an actual machining section (not shown), where an actual machining operation is carried out sequentially.

The workpiece size determining section 32 analyzes the data items of the assigned unit machining schedule and determines the size of the workpieces 63 to be machined on the basis of the analysis (Step S3).

The sensor input selecting section 33 selects one of the four sensor output values taken in by the sensor output value input section 34 that is good for the workpiece size determined by the workpiece size determining section 32 (Step S5).

This selection is done by referring to the data on the relationships between the top level sensors and the workpiece sizes.

The full load state occurrence determining section 35 determines if the carrier pallet being loaded with workpieces 63 is in a full load state or not according to the sensor output value selected by the sensor input selecting section 33 (Step S7).

If it is determined in Step S7 that the carrier pallet is not in a full load state, the Steps S5 through 7 are repeated until the carrier pallet comes into a full load state or the assigned unit machining schedule is completed.

If, on the other hand, it is determined in Step S7 that the carrier pallet is in a full load state, the carrier pallet replacing section 36 replaces the carrier pallet currently in the loading station 85 with an empty pallet (Step S9).

When the replacing operation is over, the entire processing operation comes to an end.

While the above described first embodiment comprises first through fourth top level sensors arranged on the inner wall of the loading station, the present invention is not limited thereto and any number of top level sensors equal to or greater than two may be appropriately used for the purpose of the present invention.

Thus, since the first embodiment of the invention determines a full load state for a carrier pallet by appropriately selecting an upper limit value depending on the workpiece size, it shows a constant accuracy level for the detection of a pallet full load state regardless of the size of the workpieces loaded on a carrier pallet.

Now, the cell controller 11 that plays a major role in the operation of a second embodiment of apparatus for detecting a pallet full load state according to the invention will be described by referring to FIG. 7.

Figure 7:
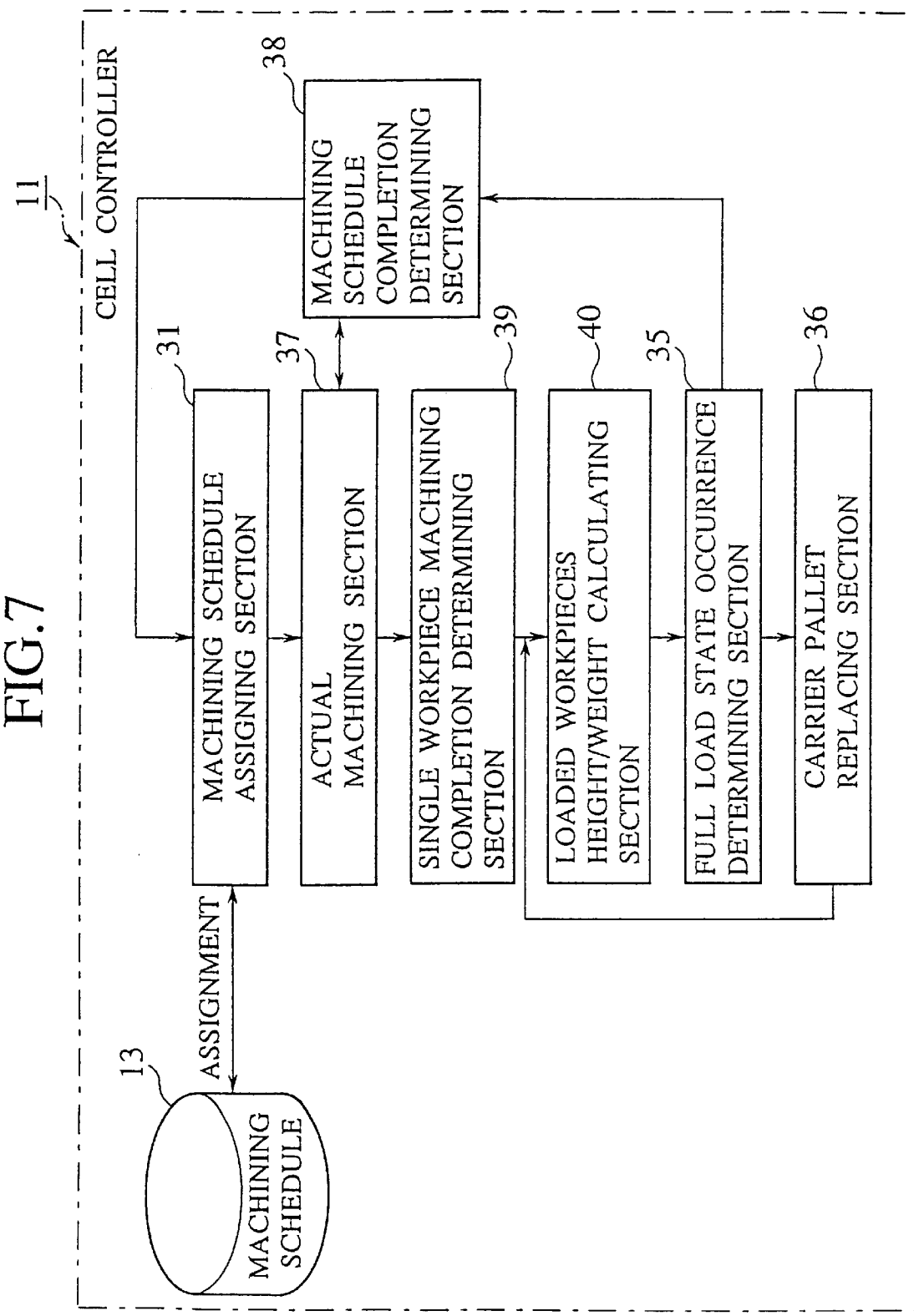
FIG. 7 is a block diagram of a second or third embodiment of apparatus for detecting a pallet full load state.

Referring to FIG. 7, the cell controller 11 comprises a machining schedule assigning section 31 for assigning a unit machining schedule having a predetermined priority out of a number of unit machining schedules to be processed by referring to the machining schedule 13, an actual machining section 37 for actually and sequentially carrying out a predetermined machining operation upon receiving a machining command for the unit machining schedule assigned by the machining schedule assigning section 31, a machining schedule completion determining section 38 for determining the completion of the machining operation according to the unit machining schedule by referring to the number of workpieces to be machined for the unit machining schedule and the number of unmachined workpieces, a single workpiece machining completion determining section 39 for constantly monitoring the operation of the actual machining section 37 and determining the completion of the operation of machining the current workpiece, a loaded workpiece height/weight calculating section 40 for, upon determining that the operation of machining the current workpiece is over, reading out the height and the weight of the workpiece from the unit machining schedule and adding the height and the weight of the workpiece respectively to the overall height H and the total weight W of the workpieces loaded on the carrier pallet, a full load state occurrence determining section 35 for comparing the overall height H and the total weight W of the loaded workpieces calculated by the loaded workpiece height/weight calculating section 40 respectively with predetermined height upper limit value HL and weight upper limit value WL and determining if the carrier pallet carrying the current workpiece 63 is in a full load state or not from the result of the comparison and a carrier pallet replacing section 36 for replacing the carrier pallet currently in the loading station 85 with an empty pallet when the occurrence of a pallet full load state is determined by the full load state occurrence determining section 35.

Figure 8:
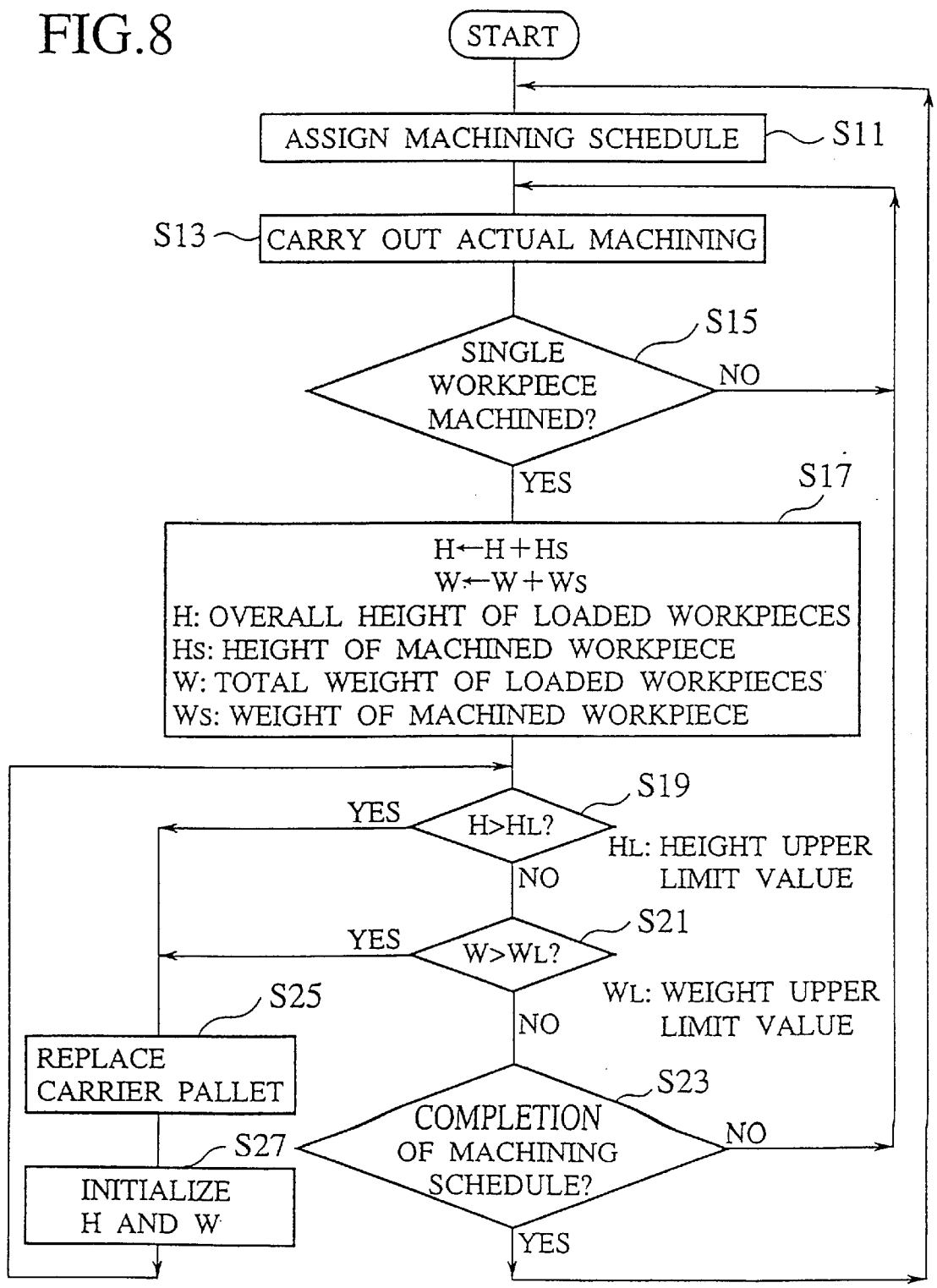
FIG. 8 is a flow chart of the operation of the second embodiment of apparatus for detecting a pallet full load state.

The operation of the second embodiment of apparatus for detecting a pallet full load state according to the invention will be described by referring to FIG. 8 showing a flow chart of the operation thereof and also to FIGS. 7 and 10 through 12.

Firstly, the machining schedule assigning section 31 assigns a unit machining schedule having a predetermined priority and the smallest schedule number out of a number of unit machining schedules to be processed by referring to the machining schedule 13 and transmits a machining command for the assigned unit machining schedule to the actual machining section 37, where an actual machining operation is carried out sequentially (Step S11 through S13).

The single workpiece machining completion determining section 39 constantly monitors the operation of the actual machining section 37 and determines the completion of the operation of machining the current workpiece (Step S15).

If it is determined in Step S15 that the operation of machining the current workpiece is not completed, Steps S13 through S15 are repeated until the operation is completed, whereas, if the completion of the machining operation is determined, the loaded workpiece height/weight calculating section 40 reads out the height and the weight of the workpiece from the unit machining schedule and adds the height and the weight of the workpiece respectively to the overall height H and the total weight W of the workpieces loaded on the carrier pallet to update the overall height H and the total weight of the loaded workpieces, which are then stored there (Step S17).

The full load state occurrence determining section 35 compares the overall height H and the total weight W of the loaded workpieces calculated by the loaded workpiece height/weight calculating section 40 respectively with predetermined height upper limit value HL and weight upper limit value WL and determines if the carrier pallet carrying the current workpiece 63 is in a full load state or not from the result of the comparison (Step S19 through S21).

If it is determined in Steps S19 through 21 that at least either the overall height H or the total weight W of the loaded workpieces exceeds the height upper limit value HL or the weight upper limit value WL and hence the carrier pallet is in a full load state, the carrier pallet replacing section 36 replaces the carrier pallet currently in the loading station 85 with an empty pallet (Step S25) and the loaded workpiece height/weight calculating section 40 initializes the overall height H and the total weight W and returns to Step S19 to repeat the above operational steps.

If, on the other hand, it is determined in Step S19 through S21 that neither the overall height H nor the total weight W of the loaded workpieces exceeds the height upper limit value HL or the weight upper limit value WL, whichever appropriate, and therefore the carrier pallet is not in a full load state, the machining schedule completion determining section 38 determines if the operation of the assigned unit machining schedule is over or not by referring to the number of workpieces of the unit machining schedule and the number of unmachined workpieces (Step S23).

If it is determined in Step S23 that the operation of the machining schedule is not over, the processing operation returns to Step S13 to repeat the following steps.

If, on the other hand, it is determined in Step S23 that the operation of the machining schedule over, the processing operation returns to Step S11 to assign the next unit machining schedule and an entire processing operation is made to proceed.

Thus, with the second embodiment of the invention, each time the operation of machining the current workpiece is over, the height and the weight of the machined workpiece are read out and added respectively to the overall height H and the total weight W of the workpieces loaded on the carrier pallet so that the newly obtained overall height H and the total weight are compared respectively with predetermined height upper limit value HL and weight upper limit value WL to determine if the carrier pallet is in a full load state or not.

Thus, the second embodiment shows a constant accuracy level for the detection of a pallet full load state regardless of the size of the workpieces loaded on a carrier pallet and even if workpieces having different sizes are loaded on the carrier pallet.

A workpiece may be lighter in weight when it is machined than when it is unmachined because it may lose its weight as a result of drilling and/or other machining operations so that the calculation of the weight in Step S17 may be accompanied by a minor error.

A third embodiment as will be described hereinafter is designed to remove the drawback of the above described second embodiment.

The third embodiment of method for detecting a pallet full load state will be described by referring to FIG. 9 and in comparison with the second embodiment.

Figure 9:
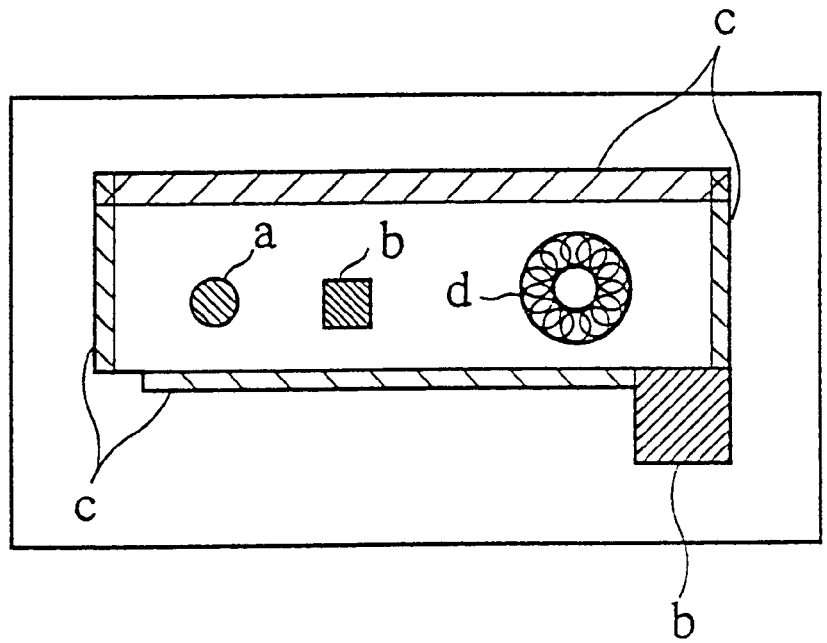
FIG. 9 is an illustration for the third embodiment.

As shown in FIG. 9, the third embodiment of method for detecting a pallet full load state differs from the above described second embodiment in terms of the weight calculating algorithm in Step S17 of FIG. 8.

In the second embodiment, the loaded workpiece height/weight calculating section 40 reads out the height and the weight of the workpiece from the assigned unit machining schedule and adds the height and the weight of the workpiece to the overall height H and the total weight W of the workpieces already loaded on the carrier pallet.

To the contrary, in the third embodiment, the loaded workpiece height/weight calculating section 40 analyzes the G-code data described in the machining program in the assigned unit machining schedule as shown in FIG. 9.

If the workpiece is to be machined for a circular geometric figure denoted by a in FIG. 9, the section 40 extracts the diameter of the circle from the data.

If the workpiece is to be machined for a rectangular geometric figure denoted by b or c in FIG. 9, the section 40 extracts the lengths of two adjacently located sides from the data.

Finally, if the workpiece is to be machined for an annular geometric figure denoted by d in FIG. 9, the section 40 extracts the parameters as shown in FIG. 9 from the data.

They, the section 40 calculates the surface area of the geometric figure in question from the extracted parameter or parameters and, if the workpiece is to be machined for two or more than two geometric figures, adds the areas of the geometric figures. The obtained total surface area is multiplied by the height of the workpiece also read out from the assigned unit machining schedule and then the product of the multiplication is multiplied by the specific gravity of the workpiece also read out from the assigned unit machining schedule. The obtained produce is then subtracted from the weight of the unmachined workpiece, which is also read out from the assigned unit machining schedule to accurately find out the weight of the machined workpiece. The height and weight of the machined workpiece is then added to the overall height H and overall weight W of the workpieces already loaded on the pallet, and then the analysis with respect to the height and weight limits may be performed, as described above.

Thus, the third embodiment shows an improved accuracy level for detecting a pallet full load state if compared with the second embodiment because the weight of each machined workpiece is determined accurately by referring to the G-code data described in the assigned unit machining schedule.

It should be noted here that the present invention is not limited to the above-described embodiments, which may be modified within the scope of the invention, and can be realized in many other forms.

For example, while the third embodiment is described above as an improvement of the second embodiment, it may be realized as an independent embodiment.

If such is the case, the weight of the machined workpiece determined by analyzing the G-code data and the height of the workpieces read out from the assigned unit machining schedule are multiplied independently by the number of workpieces to be machined read out from the unit machining schedule and the overall height and the total weight of the loaded workpieces obtained by the multiplications are compared respectively with the predetermined height upper limit value and the predetermined weight upper limit value to determine the occurrence or non-occurrence of a pallet full load state of a carrier pallet loaded with the workpieces.

Now, a method and an apparatus for controlling a sheet metal machining line according to the invention will be described below. In conventional sheet metal machining lines, a replacing carrier pallet 65 good for the next loading operation is procured only after the current carrier pallet 65 is found to be in a full load state so that the operation or replacing the current carrier pallet is time consuming and provides an obstacle for an efficient use of the sheet metal machining line 1.

With a method and an apparatus for controlling a sheet metal machining line according to the invention, the machining schedule 13 is analyzed for the operation of loading a carrier pallet with machined workpieces to estimate the occurrence or non-occurrence of a pallet full load state as a function of the height or the weight of the workpieces on the carrier pallet and a replacing carrier pallet good for the workpieces to be loaded in the next loading cycle is made to stand-by by referring to the result of the estimate to reduce the time required for procuring the replacing carrier pallet and hence the entire operational cycle and, as a result, remarkably improve the efficiency of the use of the sheet metal machining line.

Figure 13:
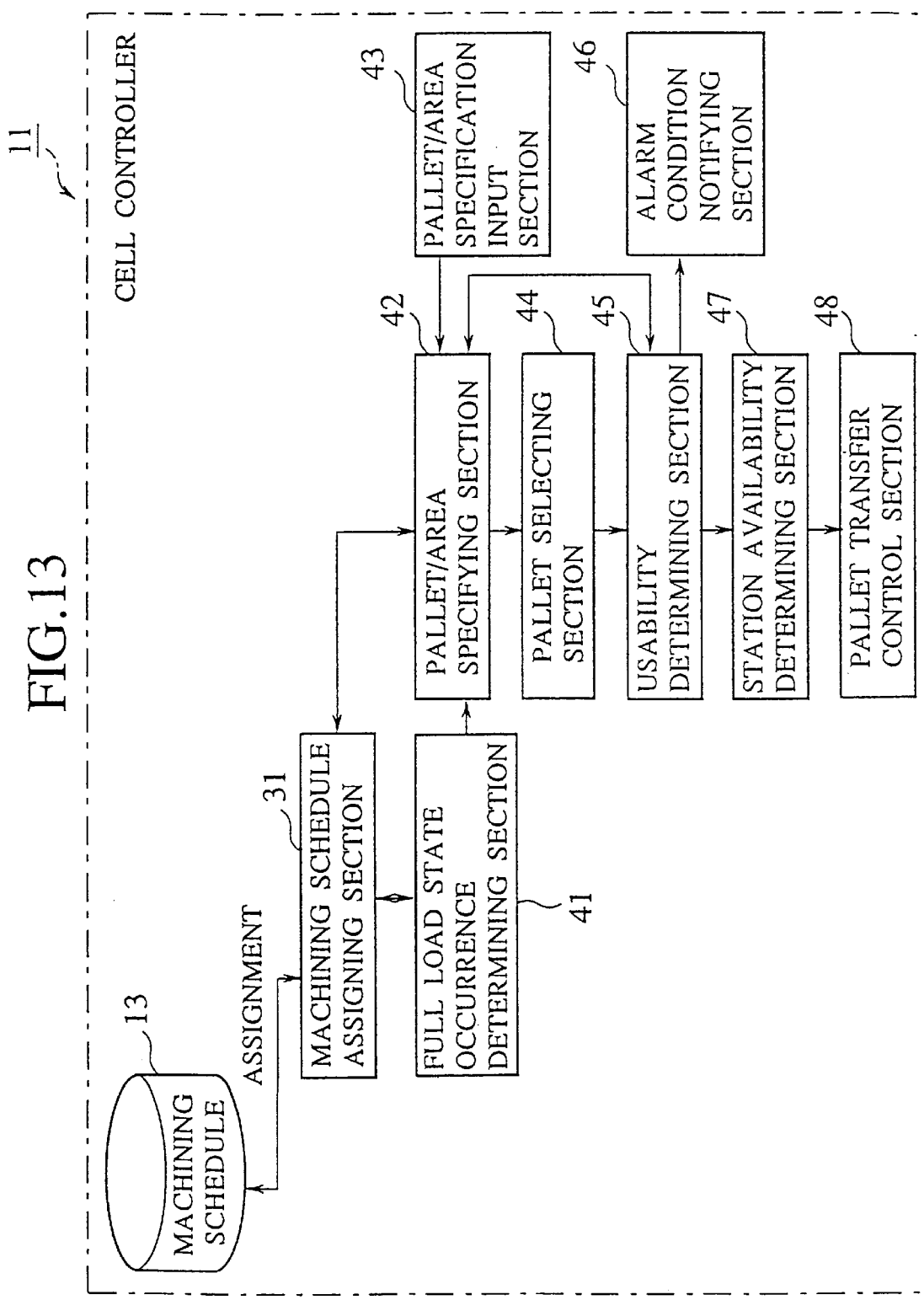
FIG. 13 is a block diagram of an embodiment of apparatus for controlling a sheet metal machining line according to the invention.

FIG. 13 illustrates a block diagram of the cell controller 11 that plays a major role in the operation of an apparatus for controlling a sheet metal machining line.

This will be described in detail below. Referring to FIG. 13, the cell controller 11 comprises a machining schedule assigning section 31 for assigning a unit machining schedule for unmachined workpieces, a full load state occurrence determining section 41 for analyzing the data items belonging to the unit machining schedule by the assigning section 31 and determining an occurrence and the time of occurrence or non-occurrence of a pallet full load state from the result of the analysis, a pallet/area specifying section 43 for specifying a carrier pallet with a given size out of carrier pallets with different sizes or a loading area out of a plurality of predetermined loading areas in the automatic warehouse 61, a pallet/area specification determining section 42 for analyzing the data items belonging to the assigned unit machining schedule and determining an occurrence or non-occurrence of specification of a carrier pallet or a loading area and, if an occurrence is determined, the details of the specification on the basis of the analysis, a pallet selecting section 44 for selecting a specified pallet. if it is determined by the pallet/area specification determining section 42 that a carrier pallet is specified, or a carrier pallet according to a predetermined rule, if it is determined by the pallet/area specification determining section 42 that a carrier pallet is not specified but a loading area is specified, a usability determining section 45 for determining the usability of the selected carrier pallet by carrying out a profile check for detecting a situation where a large size workpiece is loaded on a small size workpiece when workpieces of different sizes are loaded, a size check for detecting if the size of the selected carrier pallet is good for the workpieces to be loaded and transferring them to the loading station 85 and a full load state check for detecting a full load state on the selected carrier pallet by referring to various data contained in the machining schedule 13, an alarm condition notifying section 46 for notifying the operator if the selected carrier pallet is determined to be unusable by the usability determining section 45, a station availability determining section 47 for determining if the loading station 85 has a vacancy for loading operation when the carrier pallet is determined to be usable by the usability determining section 45, and a pallet transfer control section 48 for transferring the selected carrier pallet to the loading side stand-by station 84 if the loading side stand-by station is determined to be available by the station availability determining section 47 and also transferring the selected carrier pallet to the loading station 85 if the loading station is determined to be available.

Figure 14:
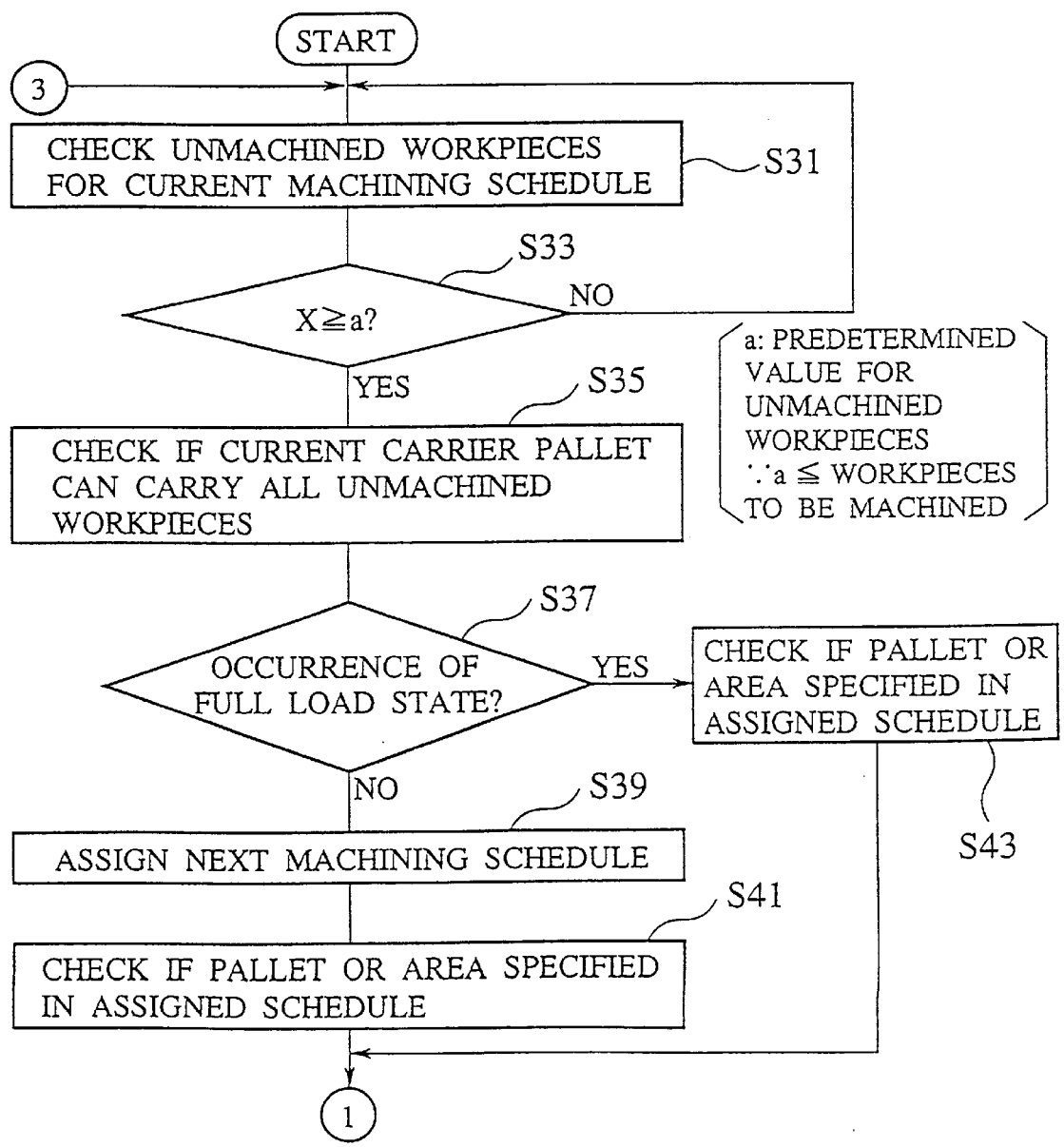
FIG. 14 is a part of a flow chart of the operation of the embodiment of the invention.
Figure 15:
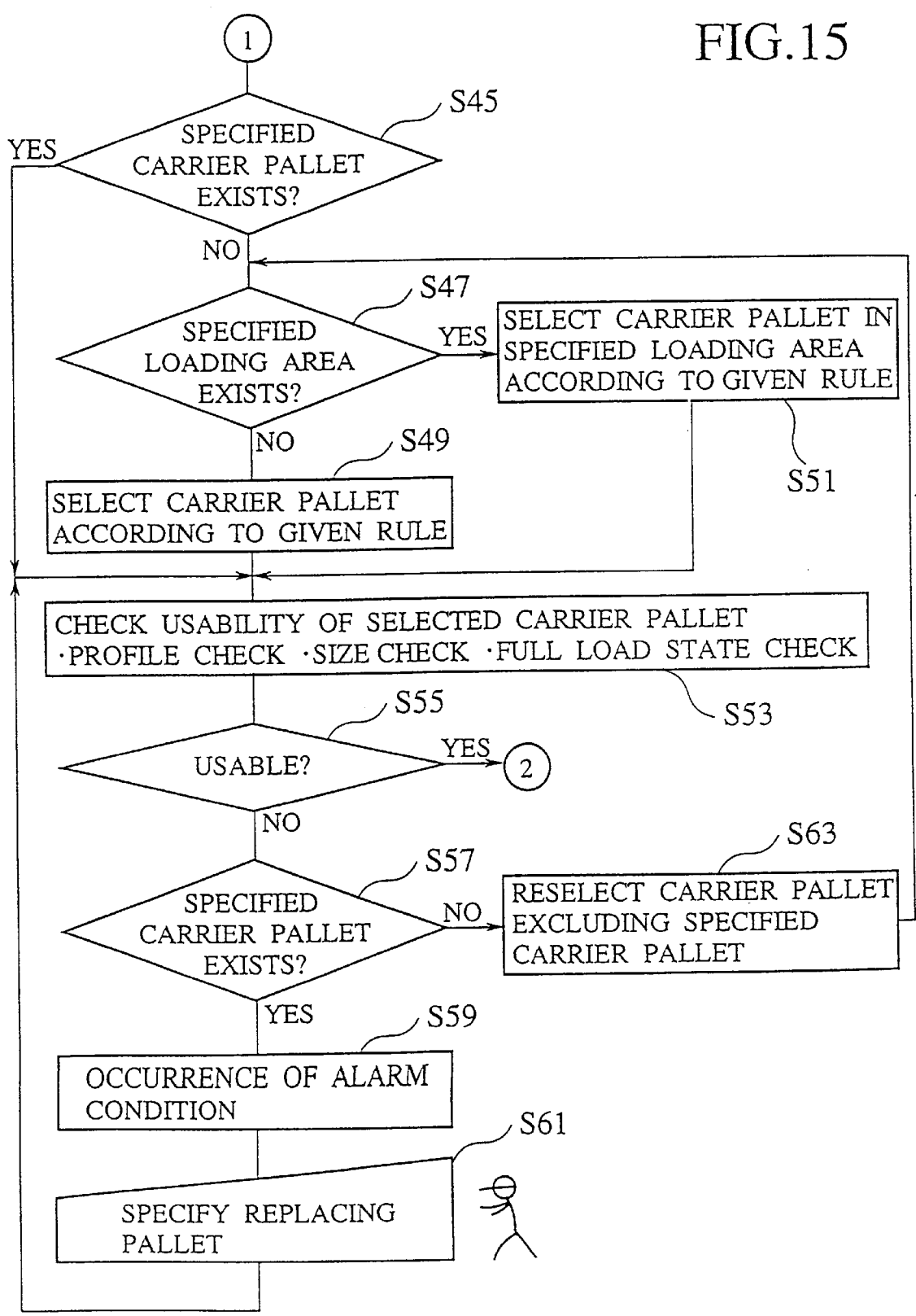
FIG. 15 is another part of the flow chart of the operation of the embodiment of the invention.
Figure 16:
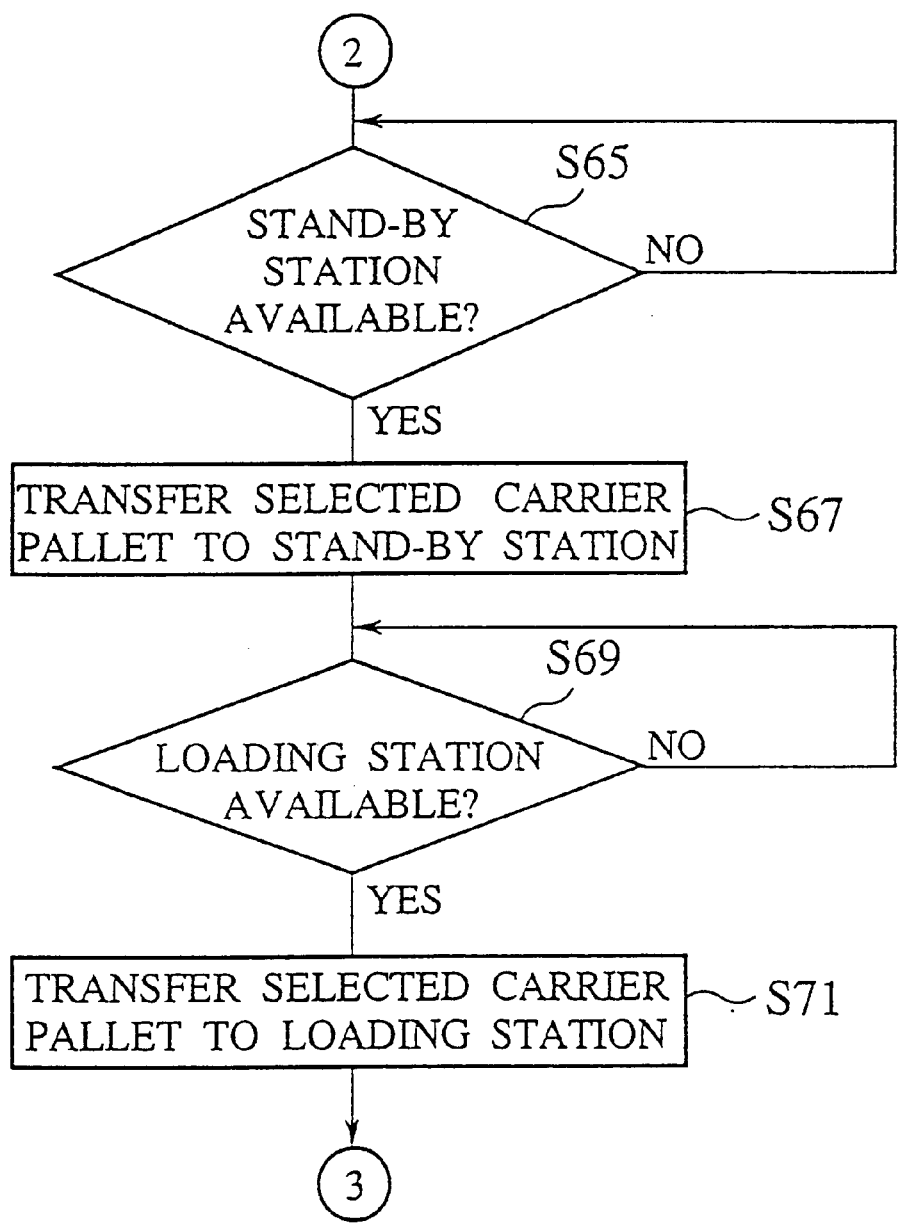
FIG. 16 is still another part of the flow chart of the operation of the embodiment of the invention.

The operation of the above embodiment of apparatus for controlling a sheet metal machining line will be described by referring to the flow chart of FIGS. 14 through 16 and also to FIGS. 13 and 17 through 24. Firstly, the machining schedule assigning section 31 for assigns a unit machining schedule with the smallest number for unmachined workpieces and transmits a machining command for the assigned unit machining schedule to an actual machining section (not shown), where an actual machining operation is carried out sequentially.

The memory device comprised by the cell controller 11 stores machining schedule data as shown in FIG. 17 and data on the skids, pallets, pallet specifications, inventory and unmachined workpieces as well as other data as shown in FIGS. 20 through 24, which are referred to appropriately in the following processing steps.

The machining schedule assigning section 31 also constantly monitors the progress of the machining operation and determines if the number of unmachined workpieces X has reached a predetermined value a by referring to the number of workpieces to be machined according to the current unit machining schedule and the number of unmachined workpieces X (Steps S31 through S33).

The reason for this is that, in this embodiment, the carrier pallet is checked for a full load state as described below provided that the number of unmachined workpieces X has reached the predetermined value a and, if it is determined as a result of this check that there will be no occurrence of a full load state for the current unit machining schedule, the cell controller 11 assigns the next unit machining schedule and procures a carrier pallet good for the workpieces to be machined according to the next unit machining schedule.

However, if the next unit machining schedule is assigned too earlier, the carrier pallet procured for the workpieces to be machined according to the next unit machining schedule is transferred to the stand-by station so that, if there arises a request for an interrupt for a urgent schedule, the procured carrier pallet good for the workpieces to be machined according to the next unit machining schedule has to be temporarily returned to the automatic warehouse 61 and a carrier pallet good for the workpiece to be machined according to the urgent schedule has to be produced.

Such a procedure for changing the carrier pallet is time consuming and, therefore, the next unit machining schedule is preferably assigned immediately before the end of the current unit machining schedule from the viewpoint of an efficient use of the machining line. Thus, if an occurrence of an interrupt of an urgent schedule is not probable, the above Steps S31 through S33 may be omitted.

Additionally, the predetermined value a for the number of unmachined workpieces may be the number of workpieces to be machined for the unit machining schedule. Then, the processing operation will be equivalent to the case where the Steps S31 through S33 are omitted.

If it is determined in Step S33 that the number of unmachined workpieces X has not reached the predetermined value a, the machining schedule assigning section 31 repeats the operation of Steps S31 through 33 until the number of unmachined workpieces X gets to the predetermined value a.

If, on the other hand, the number of unmachined workpieces X gets to the predetermined value a, the full load state occurrence determining section 41 determines if all the unmachined workpieces can be loaded on the current carrier pallet or not or if a full load state occurs for the current carrier pallet or not (Steps S35 through S37).

The principle of the operation of detecting an occurrence of a full load state is as follows.

The full load state occurrence determining section 41 reads out the number of workpieces to be machined, the size of the workpieces and the weight per workpiece of the workpieces from the assigned unit machining schedule and multiplies the number of workpieces to be machined independently by the height of each workpiece and the weight of each workpiece to obtain the overall height and the total weight of the workpieces to be loaded on the carrier pallet, which are then compared respectively with predetermined height and weight upper limit values.

If it is determined in Step S37 that there will be no occurrence of a full load state on the carrier pallet as a result of determining an occurrence of a full load state, the machining schedule assigning section 31 carries out an operation of assigning the next unit machining schedule (Step S39).

The pallet/area specification determining section 42 determines an occurrence or non-occurrence of specification of a carrier pallet or a loading area in the next machining schedule by referring to the next unit machining schedule assigned in Step S39 (Step S31).

If, on the other hand, it is determined in Step S37 that there will be an occurrence of a full load state, the pallet/area specification determining section 42 check for the presence or absence of a pallet or area specified in the current unit machining schedule by referring to it (Step S33).

The reason for specifying a carrier pallet or a loading area is as follows. A carrier pallet is specified if the machined workpieces are exceptional in terms of size or profile and only a particularly designed carrier pallet can carry them.

Figure 18:
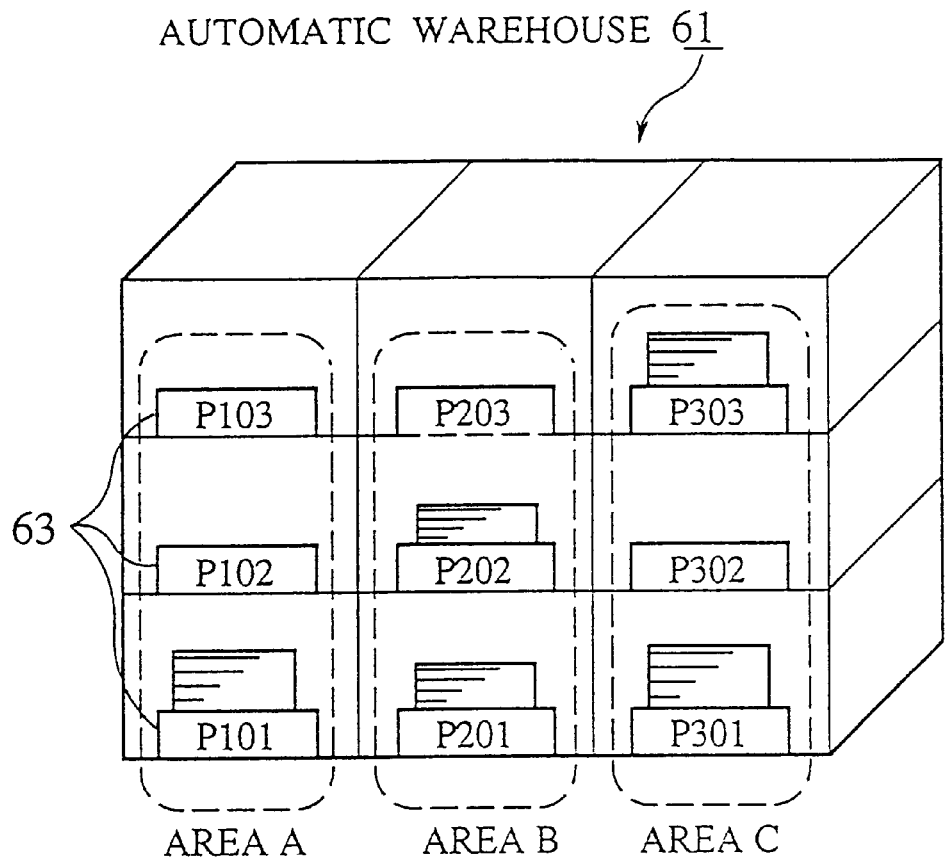
FIG. 18 is an illustration of a loading area.
Figure 19:
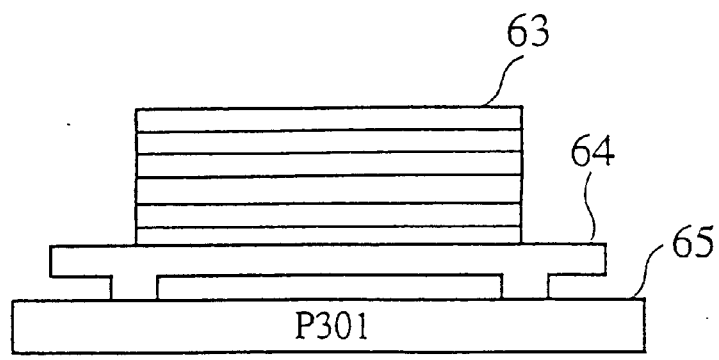
FIG. 19 is an illustration of workpieces loaded on a pallet.
Figure 25:
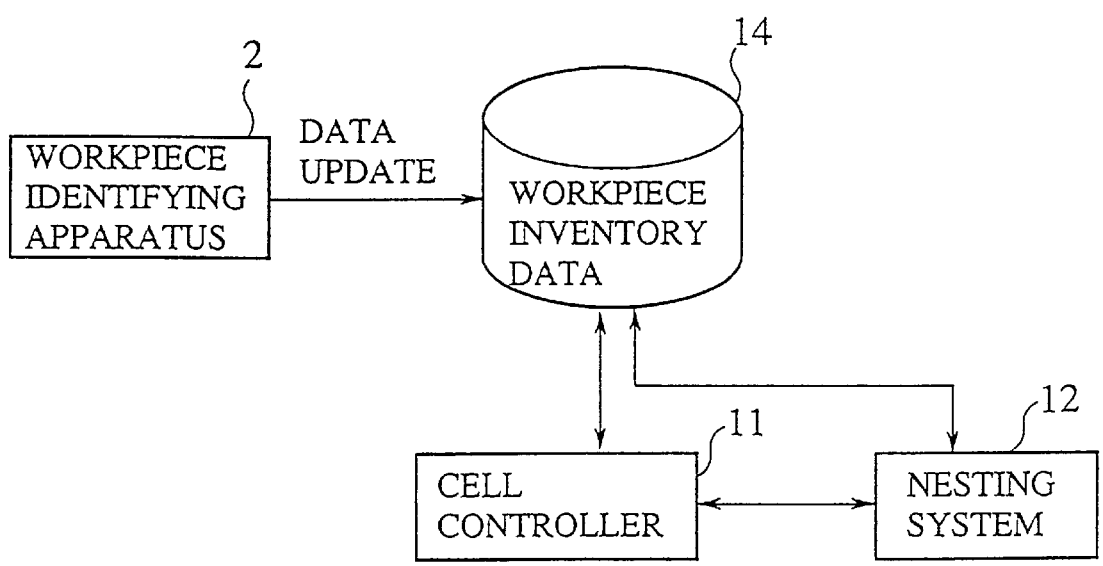
FIG. 25 is a block diagram of a workpiece identifying apparatus and related equipment.

A loading area is specified if the machined workpieces are semiproducts and have to be stored in a loading area in the automatic warehouse 61 assigned for semiproducts that are subjected to similar subsequent machining steps as shown in FIG. 18.

Note that, as described earlier, workpieces 63 are loaded on a carrier pallet 65 with a skid 64 interposed therebetween. After checking for the presence of absence of a pallet/area specification in Step S41 or S43, the pallet/area specification determining section 42 determines the presence or absence of a carrier pallet specification (Step S45) and, if the absence of a carrier pallet specification is determined, it determines the presence or absence of a loading area (Step S47).

If the absence of a loading area specification is determined in Step S47, the pallet selecting section 44 selects a carrier pallet according to a predetermined rule (Step S49). According to the section rule, a pallet is selected by referring to the following priorities.

A carrier pallet carrying at the top a workpiece of the type same as that of the workpiece to be loaded has the highest priority. The next priority goes to an available empty carrier pallet. The third priority is given to a carrier pallet carrying at the top a workpiece having a delivery date same as that of the workpiece to be loaded. The fourth priority is given to a carrier pallet carrying at the top a workpiece whose delivery date is closest to that of the workpiece to be loaded.

If there is not a carrier pallet that does not meet a higher priority requirement, a carrier pallet meeting a lower priority requirement will be detected.

This detecting procedure goes on until a carrier pallet having a possible highest priority is detected. If it is determined in Step S47 that there is a loading area specification, the pallet selecting section 44 selects a carrier pallet from the specified loading area according to the above-described rule for pallet selection (Step S51). If it is determined in Step S45 that there is a specified carrier pallet or a carrier pallet is selected in either Step S49 or S51, the usability determining section 45 determines the usability of the selected carrier pallet by carrying out a profile check for detecting a situation where a large size workpiece is loaded on a small size workpiece when workpieces of different sizes are loaded, a size check for detecting if the size of the selected carrier pallet is good for the workpieces to be loaded and transferring them to the loading station 85 and a full load state check for detecting a full load state on the selected carrier pallet (Steps S53 through S55).

If it is determined in Step S55 that the selected carrier pallet is unusable, the usability determining section 45 determines if the selected carrier pallet is a specified one or not (Step S57) and, if it is determined that the selected carrier pallet is not a specified one, the pallet selecting section 44 omits the selected carrier pallet and repeats the operation of selecting a carrier pallet (Step S63) and returns to Step S47. If, on the other hand, it is determined in Step S57 that the selected carrier pallet is a specified one, the alarm condition notifying section 46 notifies the operator of that the selected carrier pallet is determined to be unusable by displaying a message on a display screen 17 (Step S59) and prompts the operator to specify a replacing pallet.

Upon receiving the message, the operator specifies a replacing pallet by way of a keyboard 15 (Step S61), the message on the specified replacing pallet is transmitted to the pallet/area specification determining section 42 by way of the pallet/area specifying section 43 to repeat the processing steps Step S45 on.

If it is determined as a result of the determination on usability in Step S55 that the selected carrier pallet is usable, the station availability determining section 47 determines if the loading side stand-by station 84 has a vacancy for loading operation by transmitting a status signal for indicating the location of the carrier pallet from the line control board 9 (Step S65) and, if it is determined that the loading side stand-by station 84 is available, the pallet transfer control section 48 transfers the selected carrier pallet to the loading side stand-by station 84 (Step S67).

After the transfer in Step S67, the station availability determining section 47 determines if the loading area 85 has a vacancy for loading by transmitting a status signal from the line control board 9 (Step S69) and, if it is determined that the loading station has a vacancy, the pallet transfer control section 49 transfers the selected carrier pallet to the loading station 85 (Step S69). After the transfer operation, the processing operation from Step S51 on is repeated. Thus, with an apparatus for controlling a sheet metal machining line according to the invention, an occurrence or non-occurrence of a full load state of a carrier pallet loaded with machined workpieces is determined by analyzing the corresponding machining schedule when machined workpieces are loaded on the carrier pallet and a replacing carrier pallet good for the workpiece to be loaded the next time is made to stand-by by referring to the determination so that the time required for procuring a carrier pallet is minimized to consequently reduce the overall period of a machining cycle.

Thus, with an apparatus for controlling a sheet metal machining line according to the invention, an occurrence or non-occurrence of a full load state of a carrier pallet loaded with machined workpieces that is defined as a function of the overall height or the total weight of the workpieces loaded on the carrier pallet is determined by analyzing the corresponding machining schedule when machined workpieces are being loaded on the carrier pallet, provided that the number of workpieces left to be machined exceeds a predetermined value, and, at the same time, a replacing. carrier pallet good for the workpiece to be loaded the next time is made to stand-by by referring to the determination so that the time required for procuring a carrier pallet is minimized to consequently reducing the overall period of a machining cycle.

Therefore, if a small number is selected for the predetermined value, the operation of procuring a replacing carrier pallet and having it in a stand-by station is carried out immediately before the machining operation according to the unit machining schedule is over so that, if there is a request for an interrupt of an urgent schedule, the carrier pallet currently being located in the loading station may not have to be moved temporarily back to the automatic warehouse to the cumbersome operation of procuring another carrier pallet after the end of the urgent schedule may be avoided.

Thus, the time required for procuring a carrier pallet is minimized to consequently reduce the overall period of a machining cycle.

Thus, with an apparatus for controlling a sheet metal machining line according to the invention, an occurrence or non-occurrence of a full load state of a carrier pallet loaded with machined workpieces that is defined as a function of the overall height or the total weight of the workpieces loaded on the carrier pallet is determined by analyzing. the corresponding machining schedule when machined workpieces are being loaded on the carrier pallet, provided that the number of workpieces left to be machined exceeds a predetermined value, and, at the same time, a replacing carrier pallet good for the workpiece to be loaded the next time is transferred to a stand-by station if the carrier pallet is usable by referring to the determination so that a usable replacing carrier pallet is transferred to the stand-by station for certain to minimize the time required for procuring a carrier pallet and consequently reduce the overall period of a machining cycle.

Therefore, a situation where an unusable carrier pallet is transferred to the stand-by station and another carrier pallet has to be procured can be effectively avoided and the time required for procuring a carrier pallet is minimized to consequently reduce the overall period of a machining cycle.

Thus, with an apparatus for controlling a sheet metal machining line according to the invention, an occurrence or non-occurrence of a full load state of a carrier pallet loaded with machined workpieces that is defined as a function of the overall height or the total weight of the workpieces loaded on the carrier pallet is determined by analyzing the corresponding machining schedule when machined workpieces are being loaded on the carrier pallet, provided that the number of workpieces left to be machined exceeds a predetermined value, and, at the same time, a replacing carrier pallet good for the workpiece to be loaded the next time is transferred to a stand-by station if the carrier pallet is usable and the carrier pallet stand-by station is available by referring to the determination so that a usable replacing carrier pallet is transferred to the stand-by station for certain to minimize the time required for procuring a carrier pallet and consequently reduce the overall period of a machining cycle.

Therefore, a situation where the stand-by station is overcrowded and the procured carrier pallet is reduced to be unusable and another carrier pallet has to be procured can be effectively avoided and the time required for procuring a carrier pallet is minimized to consequently reduce the overall period of a machining cycle.

The NC machining center arranged in each of the sheet metal machining lines described by referring to the embodiments of the invention may be a punch press machine, a laser machine, a bending machine or some other appropriate machining apparatus.

While the cell controller and the parent server are provided with respective machining schedules in the above embodiments, the present invention is not limited thereto and any cell controller provided with a machining schedule may be used for the purpose of the present invention.

Now, a workpiece identifying apparatus according to the invention will be described below.

Figure 28:
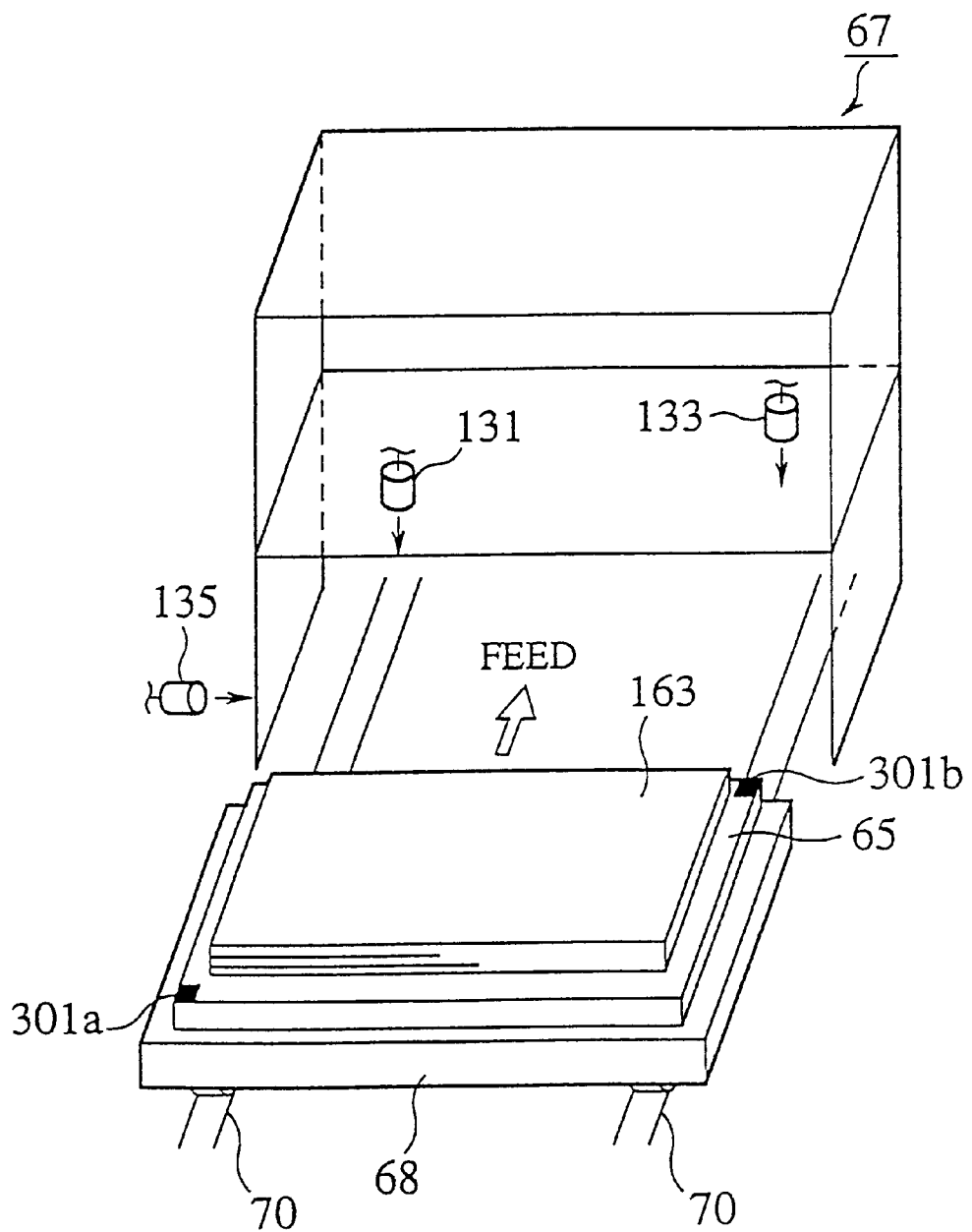
FIG. 28 is a schematic perspective view of a feed/delivery station to be used for the purpose of the invention.

The feed/delivery station 67 for receiving newly supplied workpieces will now be described in greater detail by referring to FIG. 28. The feed/delivery station 67 is provided with a pair or rails 70 leading into the inside thereof. The rails 70 carries thereon a truck 68, which by turn carries a pallet 65 loaded with newly supplied workpieces with a skid 64 disposed therebetween.

Figure 30A:
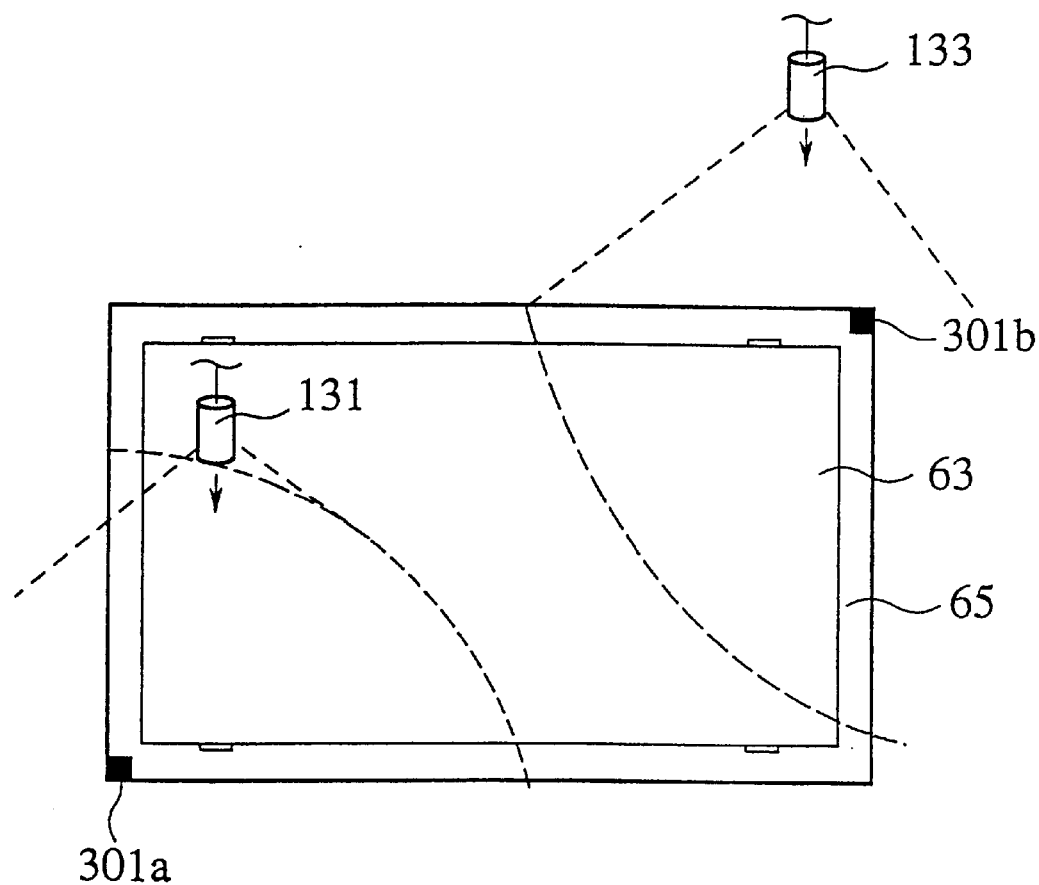
FIG. 30A and FIG. 30B are a schematic top view and a schematic side view respectively of three cameras arranged in a feed/delivery station for the purpose of the invention.
Figure 30B:
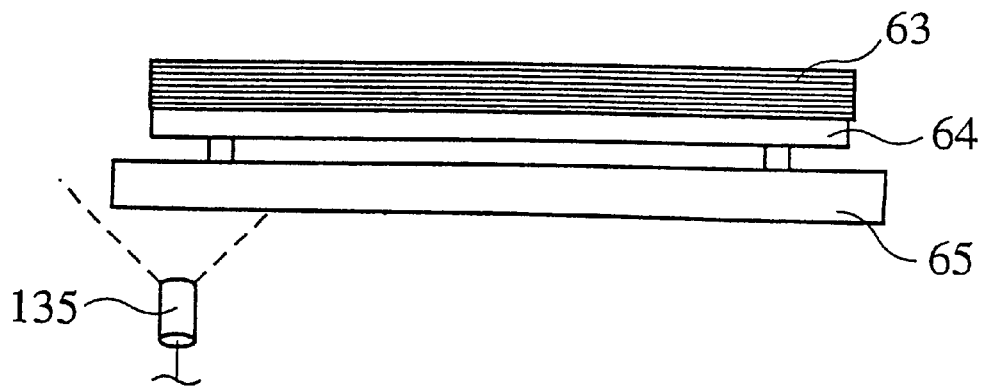

The pallet 65 is provided with square black reference markers 301*a*, 301*b* for observing at least a pair of diagonally located corners, or first and second diagonal corners, which first and second reference markers 301*a* and 301*b* are used for determining the XY dimensions of the workpieces 63 as will be described hereinafter in greater detail. First through third CCD cameras 131, 133 and 135 are arranged at different positions on the inner wall surface of the feed/delivery station 67, the CCD cameras 131, 133 and 135 being so many components of a workpiece identifying apparatus 2, which will be described hereinafter in greater detail. As seen from FIGS. 29 and 30, the first CCD camera 131 is so positioned that it can take an image of the workpieces 63 with the first reference marker 301a located on the optical axis of the camera and the corner of the workpieces 63 located closest to the marker 301a. The second CCD camera 133 is so positioned that it can take an image of the workpieces 63 with the first reference marker 301b located on the optical axis of the camera and the corner of the workpieces 63 located closest to the marker 301b and diagonal relative to the above corner. The first and second CCD cameras 131 and 133 may be replaced by a single CCD camera located at a position where it can take a plan view of the entire workpieces 63. The third CCD camera 135 is located at a position where it can take a lateral view of the workpieces 63.

Now, the configuration of the workpiece identifying apparatus 2 will be described by referring to FIGS. 26 and 27.

Figure 26:
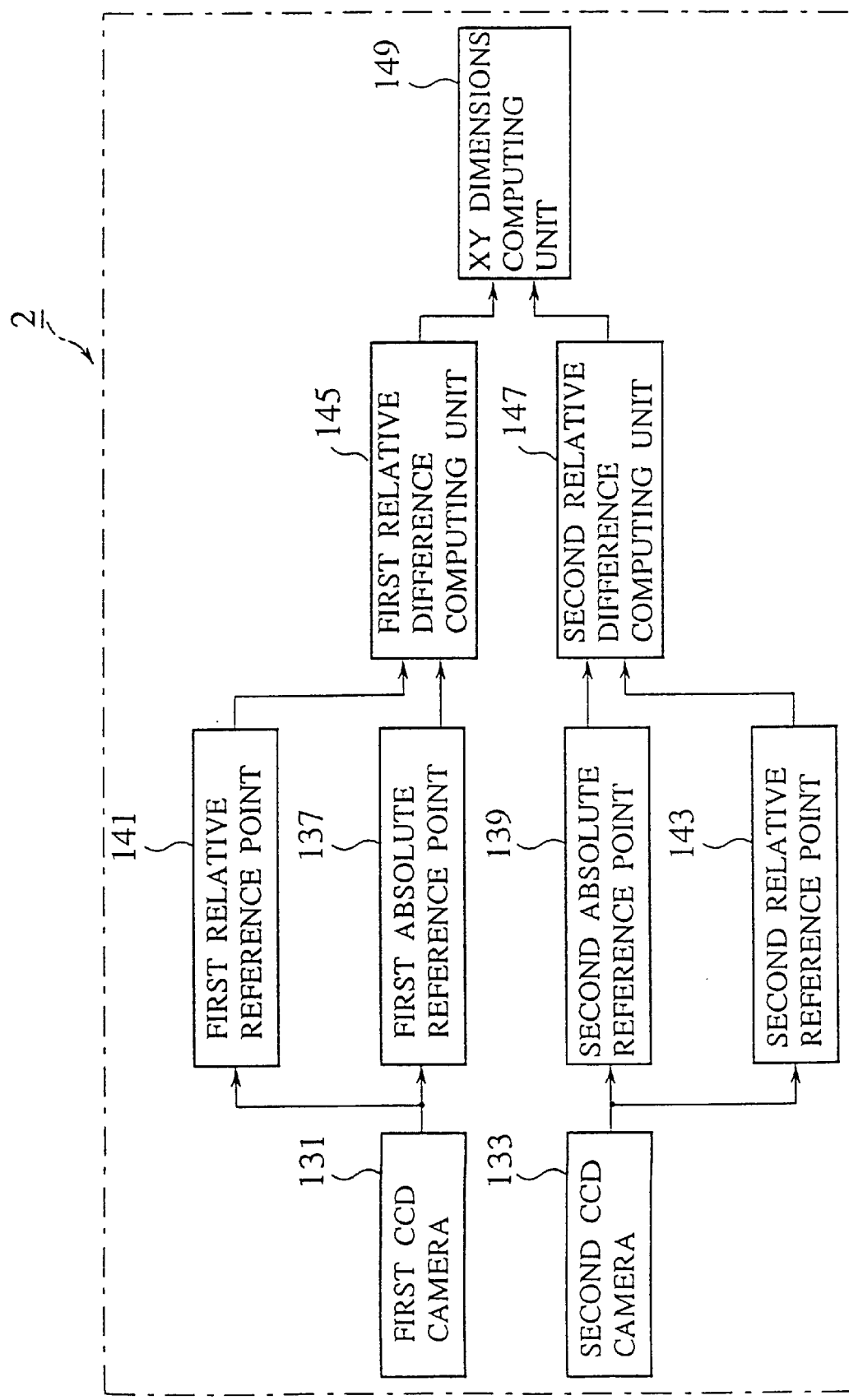
FIG. 26 is a block diagram, showing part of the inside of a workpiece identifying apparatus according to the invention.

Referring to FIG. 26, the workpiece identifying apparatus 2 comprises the first and second CCD cameras 131 and 133, first and second absolute reference point determining sections 137 and 139 connected respectively to the first and second CCD cameras 131 and 133 for extracting the first absolute reference point P1(LD) and the second absolute reference point P1(RU) corresponding respectively to the diagonally located first and second reference markers 301a and 301b from the images obtained by the first and second CCD cameras 131 and 133 and using them as absolute reference points for determining the XY dimensions of the workpieces 63, first and second relative reference point determining sections 141 and 143 for extracting the first relative reference point P2(LD) corresponding to the corner of the workpieces 63 located in proximity to the first reference marker 301a represented by the absolute reference point P1(LD) and the second and third relative reference points P3(LD) and P4(LD) located on the respective side lines extending from the corner and separated by a predetermined distance, e.g., 200 mm, from the corner and the fourth relative reference point P2(RU) corresponding to the corner of the workpieces 63 located in proximity to the second reference marker 301b and represented by the absolute reference point P1(RU) and the fifth and sixth relative reference points P3(RU) and P4(RU) relative reference points located on the respective side lines extending from the corner and separated by a predetermined distance from the corner and using them as relative reference points for determining the XY dimensions of the workpieces 63, a first relative difference computing unit 145 for computing the differentials of the relative positions of the first absolute reference point P1 (LD) and the first through third relative reference points P2(LD), P3(LD) and P4(LD) by way of the X- and Y-components of the differentials, a second relative difference computing unit 147 for computing the differentials of the relative positions of the second first absolute reference point P1(RU) and the fourth through sixth relative reference points P2(RU), P3(RU) and P4(RU) by way of the X- and Y-components of the differentials and an XY dimensions computing unit 149 for computing the XY dimensions of the workpieces 63 from the results of computation produced by the first and second relative difference computing units 145 and 147 and the known XY dimensions of a given square having a pair of diagonally disposed corners located on the first and second absolute reference points P1(LD) and P1(RU) of the pallet 65.

Figure 33A:
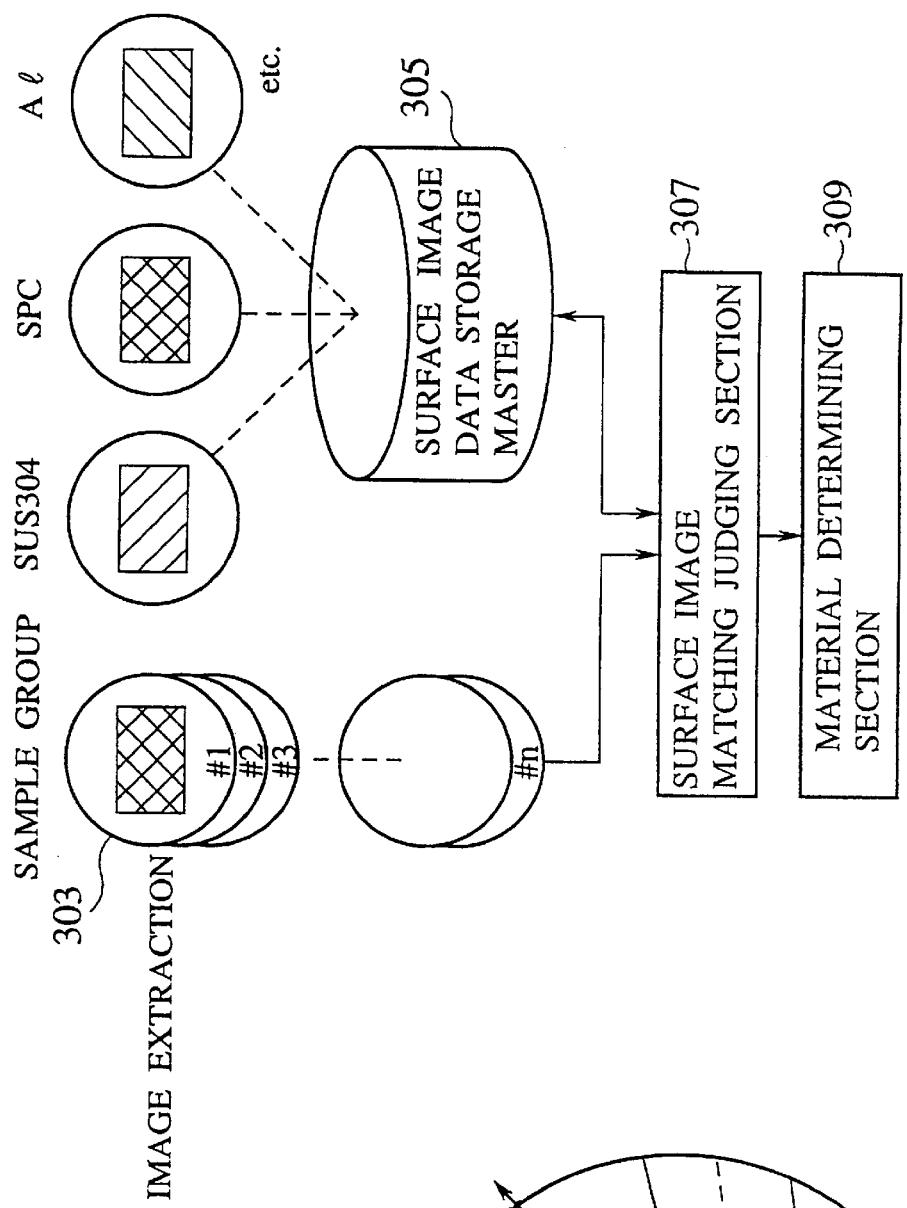
FIG. 33A and FIG. 33B are a schematic illustration and an enlarged view respectively of an arrangement for recognizing the material of a workpiece for the purpose of the invention.
Figure 33B:
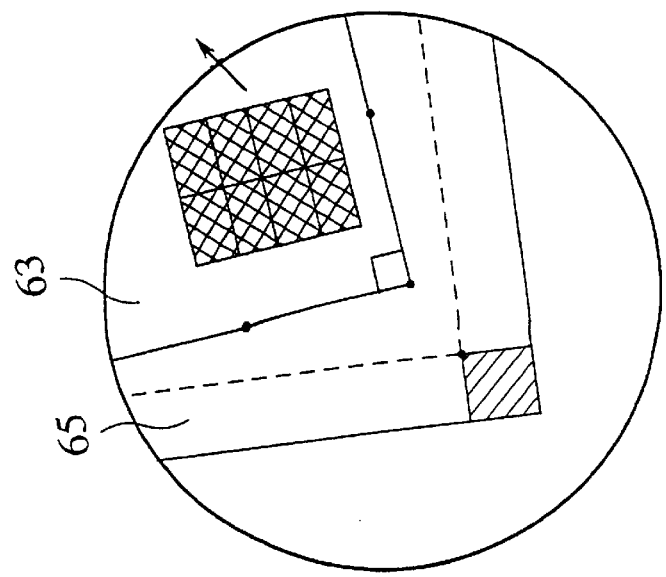

Referring to FIG. 33, in order to determine the material of the workpieces 63, the workpiece identifying apparatus 2 additionally comprises a surface image data storage master 305 for storing surface image data on the surface images of a plurality of workpieces 63 of different materials such as SUS 304 and SPC taken in advance by a CCD camera under a given lighting arrangement for irradiating the workpieces with beams of light having a given brightness level and a given wavelength range for future use, said data being classified in terms of the materials of the workpieces, surface image matching judging section 307 for retrieving a predetermined group of sample images 303 having a given number of images, e.g., 8 images, from the images taken by the first and second CCD cameras 131 and 133 and comparing the retrieved sample image group 303 sequentially with the surface image data stored in the surface image data storage master 305 to detect a set of surface image data having the closest relationship with the sample images and a material determining section 309 for determining the material of the workpieces 63 from the result of matching judgment produced by the surface image matching judging section 307.

Figure 27:
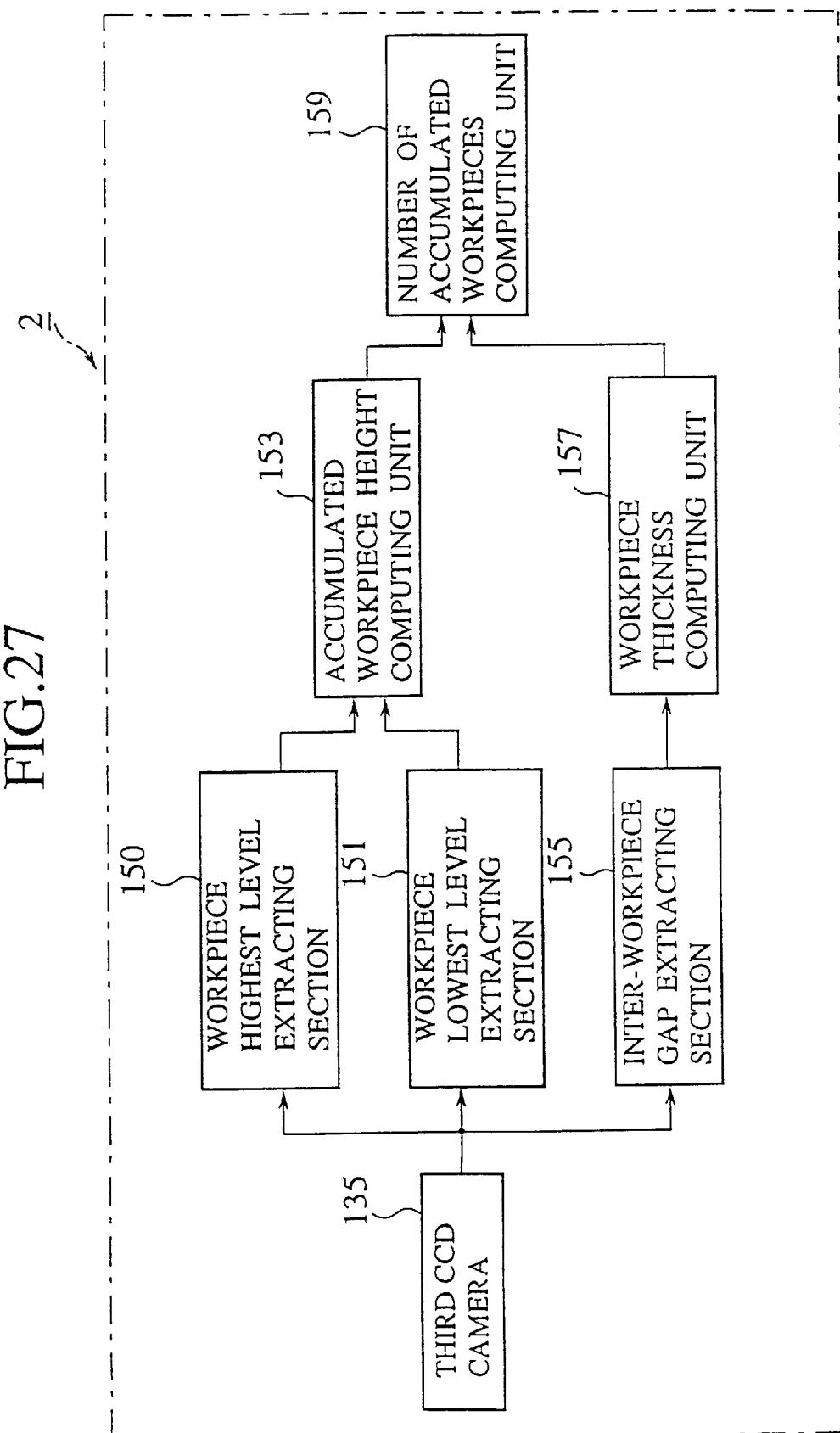
FIG. 27 is another block diagram, showing the remaining part of the inside of the workpiece identifying apparatus of FIG. 26.

Referring to FIG. 27, in order to determine the thickness and the number of workpieces 63, the workpiece identifying apparatus 2 further comprises a third CCD camera 135, a workpiece lowest level extracting section 151 connected to the third CCD camera 135 for extracting the lowest level of the workpieces 63 from the lateral image taken by the camera and obtaining the coordinate values of the extracted lowest level for a predetermined coordinate system, a workpiece highest level extracting section 150 connected to the CCD camera 135 for extracting the highest level of the workpieces 63 from the lateral image taken by the camera and obtaining the coordinate values of the extracted highest level for the predetermined coordinate system, an accumulated workpiece height computing unit 153 for determining the accumulated height of the workpieces 63 between the lowest level and the highest level of the workpieces by determining the difference of the coordinate values along the Y-axis of the coordinate system obtained by the workpiece lowest level extracting section 151 and the workpiece highest level extracting section 150, an inter-workpiece gap extracting section 155 connected to the CCD camera 135 for extracting a plurality of gaps of adjacently laid workpieces from the lateral image taken by the camera, a workpiece thickness computing unit 157 for computing the thickness of each of the workpieces by determining the average of the gaps extracted by the inter-workpiece gaps extracting section 155 and a number of accumulated workpieces computing unit 159 for computing the number of accumulated workpieces 63 by dividing the accumulated height of the workpieces 63 determined by the accumulated workpiece height computing unit 153 by the thickness of each of the workpieces determined by the workpiece thickness computing unit 157.

A workpiece identifying apparatus according to the invention and having a configuration as described above operates in a manner as detailedly described below by referring to FIGS. 25, 36 and 31 through 37.

Figure 31:
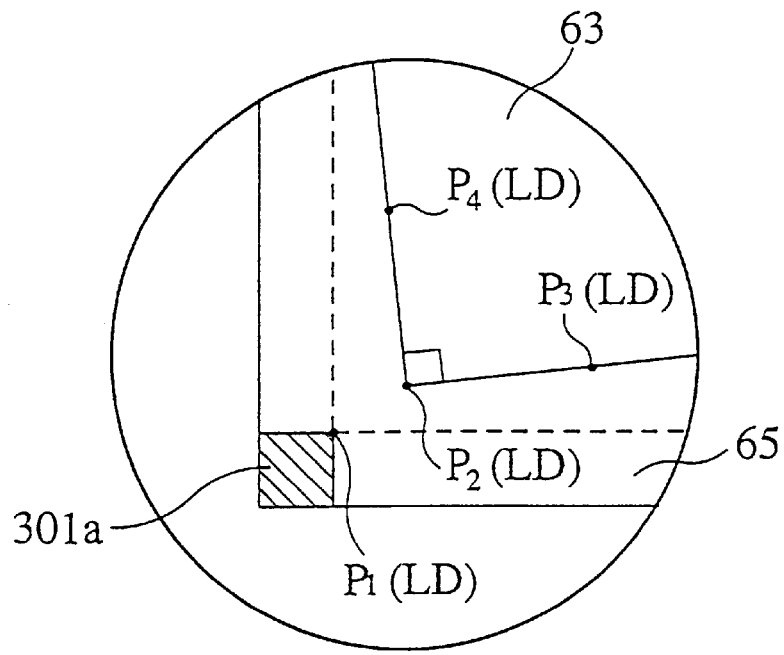
FIG. 31 is a schematic illustration showing reference points for identifying a workpiece for the purpose of the invention.
Figure 32:
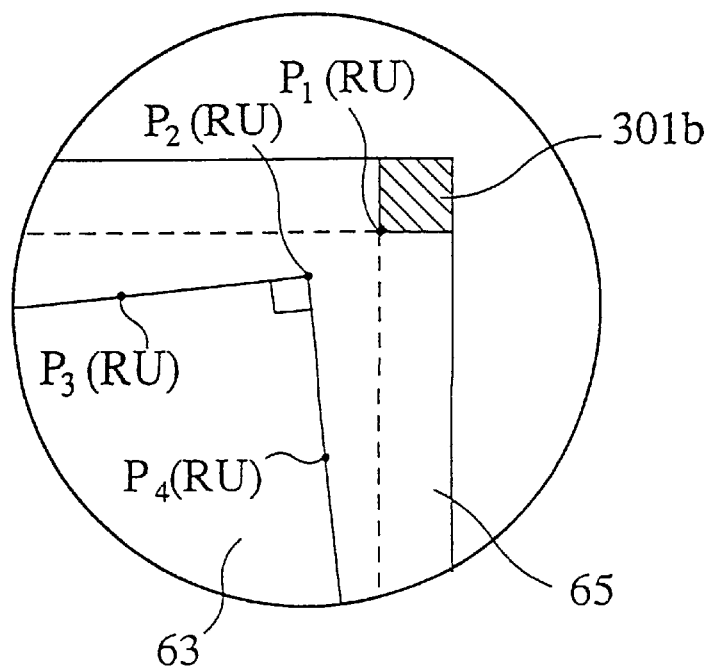
FIG. 32 is another schematic illustration showing reference points for identifying a workpiece for the purpose of the invention.

Firstly, the first and second CCD cameras 131 and 133 of the workpiece identifying apparatus 2 takes respective images as typically illustrated in FIGS. 31 and 32 for the operation of determining the XY dimensions of the workpieces 63, which images are stored in the workpiece identifying apparatus 2. Then, the first and second absolute reference point determining sections 137 and 139 respectively extract the first absolute reference point P1(LD) and the second absolute reference point P1(RU) representing the diagonally located first and second reference markers 301a and 301b and select them as absolute reference points for determining the XY dimensions of the workpieces 63.

On the other hand, the first and second relative reference point determining sections 141 and 143 respectively extract from the stored images taken by the first and second CCD cameras 131 and 133 the first relative reference point P2(LD) corresponding to the corner of the workpieces 63 located in proximity to the first reference marker 301a represented by the absolute reference point P1(LD) and the second and third relative reference points P3(LD) and P4(LD) located on the respective side lines extending from the corner and separated by a predetermined distance from the corner and the fourth relative reference point P2(RU) corresponding to the corner of the workpieces 63 located in proximity to the second reference marker 301b and represented by the absolute reference point P1(RU) and the fifth and sixth relative reference points P3(RU) and P4(RU) relative reference points located on the respective side lines extending from the corner and separated by a predetermined distance from the corner and select them as relative reference points for determining the XY dimensions of the workpieces 63.

The first relative difference computing unit 145 computes the differentials of the relative positions of the first absolute reference point P1(LD) and the first through third relative reference points P2(LD), P3(LD) and P4(LD) by way of the X- and Y-components of the differentials, while the second relative difference computing unit 147 computes the differentials of the relative positions of the second first absolute reference point P1(RU) and the fourth through sixth relative reference points P2(RU), P3(RU) and P4(RU) by way of the X- and Y-components of the differentials.

Then, the XY dimensions computing unit 149 computes the XY dimensions of the workpieces 63 from the results of computation produced by the first and second relative difference computing units 145 and 147 and the known XY dimensions of a given square having a pair of diagonally disposed corners located on the first and second absolute reference points P1(LD) and P1(RU) of the pallet 65. The relationship between the first absolute reference point P1(LD) and the first relative reference point P2(LD) and between the second absolute reference point P1(RU) and the fourth relative reference point P2(RU) will be described by way of examples. Assume that the X- and Y-components of the differential of the first absolute reference points P1(LD) and the first relative reference point P2(LD) taken along the X- and Y-axes are respectively (LD) $\Delta X$ and (LD) $\Delta Y$ and the X- and Y-components of the differential of the second absolute reference point P1 (RU) and the fourth relative reference point P2(LD) taken along the X- and Y-axes are respectively (RU) $\Delta X$ and PI(RU) $\Delta Y$, whereas the known XY dimensions of the rectangle drawn on the pallet 65 and having a pair of diagonally disposed corners located on the first and second absolute reference points P1(LD) and P1(RU) are respectively XST and YST and the XY dimensions of the workpieces 63 are respectively XW and YW. Then, XW and YW are respectively expressed by equations (1) and (2) below.

$$XW=XST-(LD)\Delta X-(RU)\Delta X \quad (1)$$

$$YW=YST-(LD)\Delta Y-(RU)\Delta Y \quad (2)$$

Then, similar arithmetic operations will be conducted on the combination of P1(LD), P3(LD) and P4(LD) and P1(RU), P3(RU) and P4(RU) and the averages of the values for XW and YW will be calculated for the workpieces 63 to determine the XY dimensions of the workpieces 63.

Referring to FIG. 33, in order to determine the material of the workpieces 63, the surface image matching judging section 307 retrieves a predetermined group of sample images having a given number of images, e.g., 8 images, from the images taken by the first and second CCD cameras 131 and 133 and compares the retrieved sample image group sequentially with the surface image data stored in the surface image data storage master 305 to detect a set of surface image data having the closest relationship with the sample images and the material determining section 309 determines the material of the workpieces 63 from the result of matching- judgment produced by the surface image matching judging section 307. Since the color and luminance of the surface of each of the workpieces 63 varies depending upon the material type of the workpiece (e.g., the color of SUS is similar to that of a miller and the color of Al is white), the surface image matching judging section 307 may analyze the color (wavelength), luminance (luminous flux)) and pattern of the surface of the material from the surface images obtained by the CCD cameras and collate or compare this data with the data stored in the surface image data storage master 305.

Figure 34A:
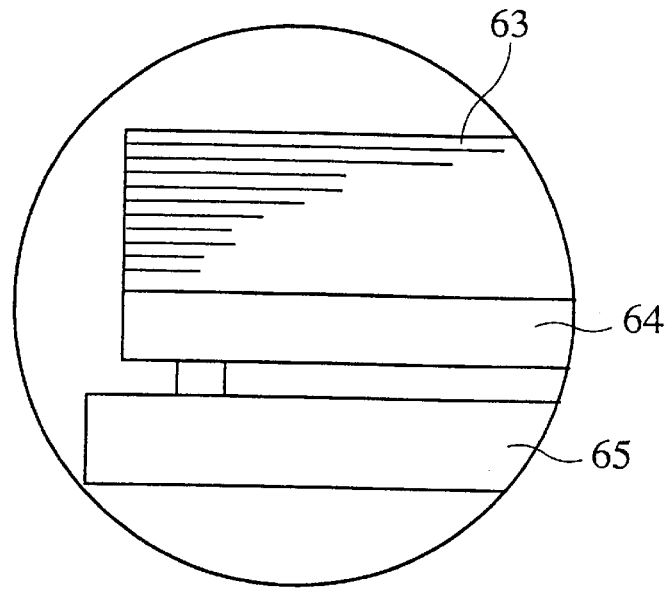
FIG. 34A and 34B are a schematic illustration and an enlarged view respectively of an arrangement for recognizing the thickness and the number of accumulated workpieces for the purpose of the invention.
Figure 34B:
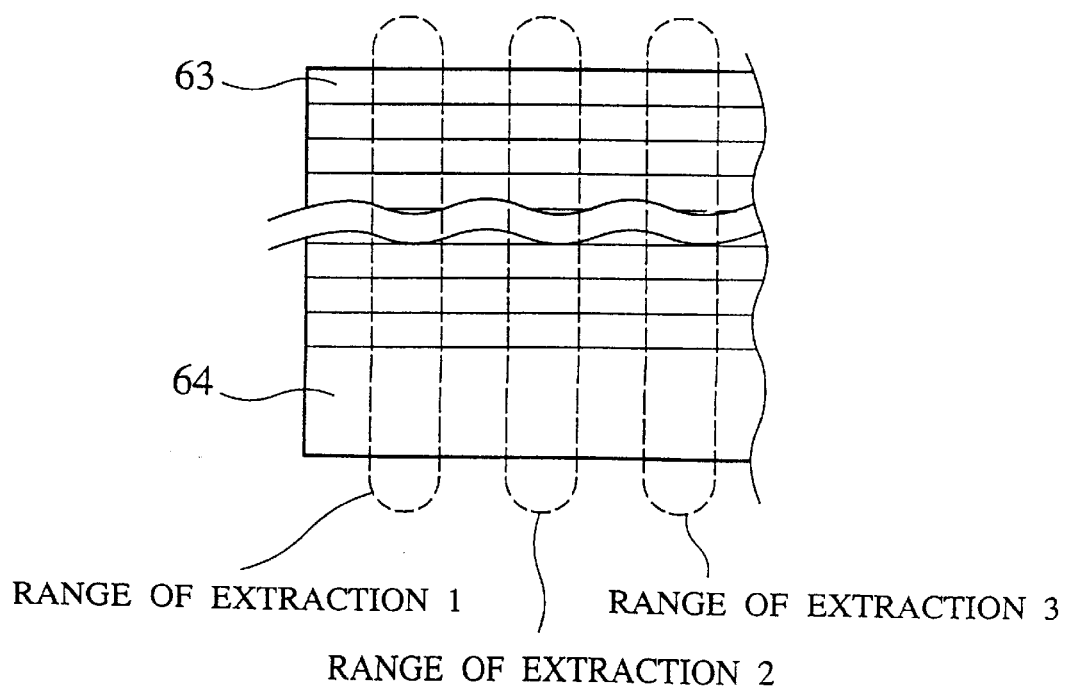

Referring to FIG. 34, in order to determine the thickness and the number of workpieces 63, the third CCD camera 135 of the workpiece identifying apparatus 2 takes lateral images of the workpieces 63 and, for example, three of them are selected and subjected to the following operations described below. The ranges of extraction 1, 2 and 3 illustrated in FIG. 34 may be previously determined by an operator and inputted as parameters. Specifically, both edges and a center portion of the workpiece may be selected. To obtain the lateral images from these selected areas, the scanning range of a lateral CCD camera may be placed on each of the ranges of extraction 1, 2 and 3 in sequence or order.

Figure 35:
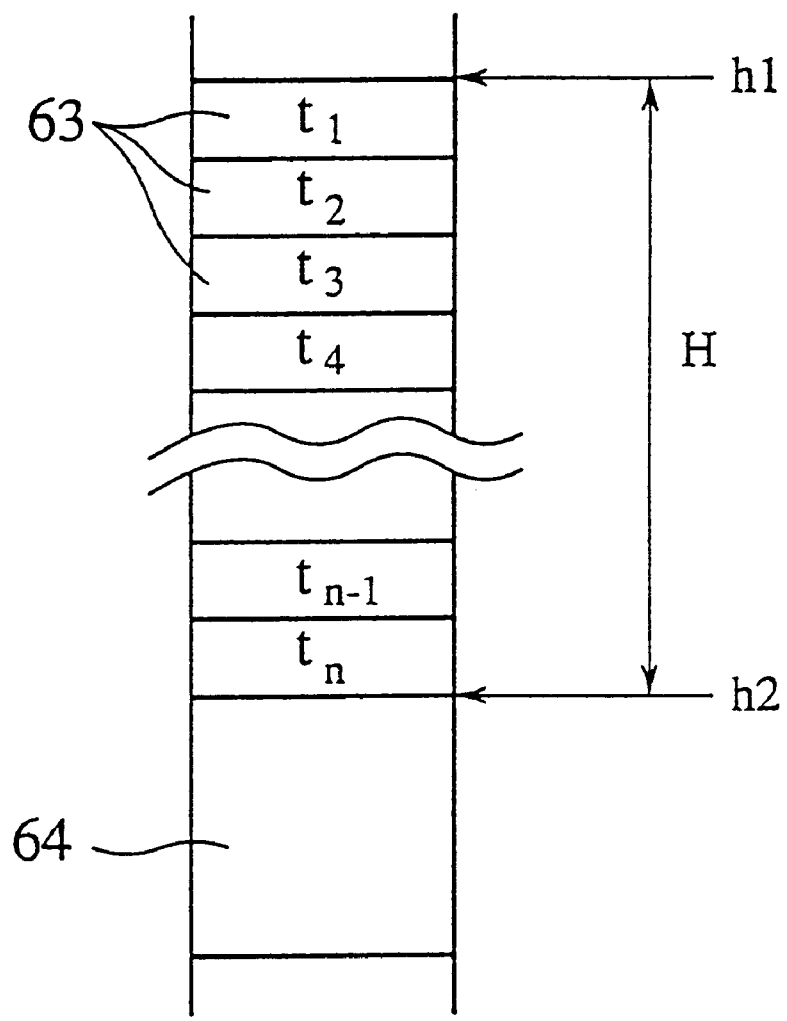
FIG. 35 is another schematic illustration of an arrangement for recognizing the thickness and the number of accumulated workpieces for the purpose of the invention.

Referring to FIG. 35, the workpiece lowest level extracting section 151 first extracts the lowest level h2 of the workpieces 63 from the lateral images taken by the camera and obtains the coordinate values of the extracted lowest level for the predetermined coordinate system. The workpiece highest level extracting section 150 extracts the highest level h1 of the workpieces 63 from the lateral images taken by the camera and obtains the coordinate values of the extracted highest level for the predetermined coordinate system. Then, the accumulated workpiece height computing unit 153 determines the accumulated height H of the workpieces 63 between the lowest level and the highest level of the workpieces by determining the difference of the coordinate values along the Y-axis of the coordinate system obtained by the workpiece lowest level extracting section 151 and the workpiece highest level extracting section 150.

On the other hand, the inter-workpiece gap extracting section 155 extracts a plurality of gaps of adjacently laid workpieces 63 from the lateral images taken by the camera as shown in FIG. 35. For extracting gaps, strip-shaped gaps of adjacently laid workpieces found in the images (each strip-shaped gap is dark) as shown in FIG. 34 are utilized. The intervals or distance between the strip-shaped gaps correspond to gaps t1, t2, t3, . . . tn. Since the difference of variable density between the side surface of a workpiece and a strip-shaped gap between workpieces is distinct (each gap is dark in the image), the strip-shaped gaps may be detected from the image data obtained by the CCD camera. Then, the workpiece thickness computing unit 157 calculates the average of an appropriate number of extracted gaps t1, t2, t3, . . ., tn and computes the thickness t of each of the workpieces from the average of the gaps. It is not necessary to use all of the extracted gaps in order to calculate the thickness t, and a predetermined number of gaps (e.g., four gaps) may be sufficient to calculate the thickness. Finally, the number of accumulated workpieces computing unit 159 computes the number of accumulated workpieces 63 by dividing the accumulated height H of the workpieces 63 determined by the accumulated workpiece height computing unit 153 by the thickness t of each of the workpieces determined by the workpiece thickness computing unit 157.

Now, the dimensions of the workpieces 63 including the XY dimensions and the thickness are determined along with the number of workpieces 63 accumulated on the pallet from the above operations. Then, the workpiece identifying apparatus 2 determines the rough sheet metal code and the weight of the workpieces 63 by referring to a rough sheet metal code master and a material code master as illustrated in FIGS. 36 and 37 respectively. The rough sheet metal code master stores material specifications for the dimensions and the materials of a plurality of different rough sheet metals registered in advance for future use, whereas the material code master stores data on a number of different materials including the specific gravities of the materials also registered in advance for future use. For determining the rough sheet metal code to be assigned to a workpiece, the workpiece identifying apparatus 2 firstly refers to the material code master for the material of the workpiece 63 that is already known to find out the specific gravity of the material. Now, the weight per rough sheet metal can be obtained by equation (3) below and, therefore, the workpiece identifying apparatus 2 can calculate the weight of the workpiece 63 by substituting the terms of equation (3) with real numerical values.

$$\text{weight per workpiece} = (\text{thickness} \times X \text{ dimension} \times Y \text{ dimension}) \times \text{specific gravity} \qquad (3)$$

The total weight of a pallet 65 carrying a number of workpieces 63 can be calculated by means of equation (4) below.

$$\text{total weight of pallet} = \text{weight per workpiece} \times \text{number of workpieces} + (\text{weight of skid} + \text{weight of pallet}) \qquad (4)$$

Thus, the XY dimensions and the thickness of each of the workpieces 63, the number of workpieces carried by the pallet, the rough sheet metal code, the weight per workpiece and the total weight of the pallet carrying the workpieces are automatically calculated without human aid. Then, the obtained data are transferred to a workpiece inventory data storage 14 for storing inventory data 63 for the workpieces 63 in the automatic warehouse 61 to update the existing inventory data. The updated workpiece inventory data in the storage 14 are referred to when workpieces to be machined by the sheet metal machining line are selected and the pallet 65 carrying the workpieces is delivered from the automatic warehouse 61. The workpiece inventory data in the storage 14 are also referred to by the cell controller 11 and a nesting system 12 whenever appropriate. More specifically, the cell controller 11 refers to the workpiece inventory data in the storage 14 for selecting workpieces to be machined in scheduled machining operation, whereas the nesting system 12 refers to the workpiece inventory data in the storage 14 for selecting workpieces to be machined typically for preparing nesting programs for machining workpieces on one or more than one punch presses on a take-multiple basis.

As described above in detail, according to the invention, there is provided a workpiece identifying apparatus adapted to automatically identifying workpieces loaded on a pallet for machining in terms of the XY dimensions, material, thickness and weight of each workpiece, the number of workpieces on the pallet and the total weight of the pallet without human aid.

The present invention is not limited to the above described embodiment, which may be modified in various different ways without departing from the scope of the invention.

For example, the NC machining center to be used in a sheet metal machining line provided with a workpiece identifying apparatus according to the invention may be a turret punch press, a laser machining center, a bending machine or any other sheet metal machining center.

While machining schedules are stored in both the cell controller and the parent server in the above embodiment, the present invention is not limited thereto and many other form of schedule storage may be used for the purpose of the invention so long as the cell controller stores necessary machining schedules.

As described above, in the first embodiment of method and apparatus for detecting a pallet full load state according to the invention, an occurrence or non-occurrence of a pallet full load state is detected by selecting an appropriate upper limit values for the loaded workpieces so that a constant accuracy level is assured regardless of the size of the workpieces loaded on the carrier pallet.

With the second embodiment of apparatus for detecting a pallet full load state according to the invention, each time the operation of machining a workpiece, the height and the weight of the workpiece are read out and added respectively to those of the workpieces already loaded on the carrier pallet so that the summed height and the summed weight may respectively be compared with a predetermined limit height and a predetermined limit weight and therefore an occurrence or non-occurrence of a full load state of the carrier pallet may be determined from result of the comparison.

Therefore, a full load state of a carrier pallet can be detected with a constant level of accuracy regardless of the size of the workpieces loaded on the carrier pallet and even if workpieces with different sizes are loaded on the carrier pallet.

With the third embodiment of apparatus for detecting a pallet full load state according to the invention, the weight of each machined workpiece is determined accurately by referring to the G-code data described in the machining schedule to realize a remarkably improved accuracy level for detecting a pallet full load state.

Thus, with a method and an apparatus for controlling a sheet metal machining line according to the invention, with an apparatus for controlling a sheet metal machining line according to the invention, an occurrence or non-occurrence of a full load state of a carrier pallet loaded with machined workpieces is determined by analyzing the corresponding machining schedule when machined workpieces are loaded on the carrier pallet and a replacing carrier pallet good for the workpiece to be loaded the next time is made to stand-by by referring to the determination so that the time required for procuring a carrier pallet is minimized to consequently reduce the overall period of a machining cycle. Thus, an occurrence or non-occurrence of a full load state of a carrier pallet loaded with machined workpieces that is defined as a function of the overall height or the total weight of the workpieces loaded on the carrier pallet is determined by analyzing the corresponding machining schedule when machined workpieces are being loaded on the carrier pallet, provided that the number of workpieces left to be machined exceeds a predetermined value, and, at the same time, a replacing carrier pallet good for the workpiece to be loaded the next time is made to stand-by by referring to the determination so that the time required for procuring a carrier pallet is minimized to consequently reducing the overall period of a machining cycle.

Therefore, if a small number is selected for the predetermined value, the operation of procuring a replacing carrier pallet and having it in a stand-by station is carried out immediately before the machining operation according to the unit machining schedule is over so that, if there is a request for an interrupt of an urgent schedule, the carrier pallet currently being located in the loading station may not have to be moved temporarily back to the automatic warehouse to the cumbersome operation of procuring another carrier pallet after the end of the urgent schedule may be avoided. Thus, the time required for procuring a carrier pallet is minimized to consequently reduce the overall period of a machining cycle. Thus, an occurrence or non-occurrence of a full load state of a carrier pallet loaded with machined workpieces that is defined as a function of the overall height or the total weight of the workpieces loaded on the carrier pallet is determined by analyzing the corresponding machining schedule when machined workpieces are being loaded on the carrier pallet, provided that the number of workpieces left to be machined exceeds a predetermined value, and, at the same time, a replacing carrier pallet good for the workpiece to be loaded the next time is transferred to a stand-by station if the carrier pallet is usable by referring to the determination so that a usable replacing carrier pallet is transferred to the stand-by station for certain to minimize the time required for procuring a carrier pallet and consequently reduce the overall period of a machining cycle.

Therefore, a situation where an unusable carrier pallet is transferred to the stand-by station and another carrier pallet has to be procured can be effectively avoided and the time required for procuring a carrier pallet is minimized to consequently reduce the overall period of a machining cycle.

Thus, an occurrence or non-occurrence of a full load state of a carrier pallet loaded with machined workpieces that is defined as a function of the overall height or the total weight of the workpieces loaded on the carrier pallet is determined by analyzing the corresponding machining schedule when machined workpieces are being loaded on the carrier pallet, provided that the number of workpieces left to be machined exceeds a predetermined value, and, at the same time, a replacing carrier pallet good for the workpiece to be loaded the next time is transferred to a stand-by station if the carrier pallet is usable and the carrier pallet stand-by station is available by referring to the determination so that a usable replacing carrier pallet is transferred to the stand-by station for certain to minimize the time required for procuring a carrier pallet and consequently reduce the overall period of a machining cycle.

Therefore, a situation where the stand-by station is overcrowded and the procured carrier pallet is reduced to be unusable and another carrier pallet has to be procured can be effectively avoided and the time required for procuring a carrier pallet is minimized to consequently reduce the overall period of a machining cycle.

Moreover, in the above embodiment of a workpiece identifying apparatus according to the invention, wherein absolute reference points are arranged on the pallet whereas relative reference points are positioned on the workpieces, the XY dimensions of the workpieces carried by the pallet are determined by using the differentials between the absolute reference points and the corresponding relative reference points and the XY dimensions of a square arranged on the pallet so that the XY dimensions of the workpieces on the pallet can be obtained automatically without requiring human aid.

Additionally, with the above embodiment of the invention, the material of the workpieces on the pallet is determined by comparing the surface images of the workpieces taken by cameras and the surface image data stored in a surface image data storage master so that the material of the workpieces can be identified automatically without requiring human aid.

Still additionally, with the above embodiment of the invention, the thickness of each of the workpieces on the pallet is calculated by determining the gaps between adjacently laid workpieces so that the thickness can be known automatically without requiring human aid.

Finally, with the above embodiment of the invention, the number of workpieces carried by the pallet is calculated by determining the accumulated height of the workpieces from the lowest and highest levels of the workpieces and dividing the accumulated height of the workpieces by the thickness of each of the workpieces on the pallet obtained by determining the gaps between adjacently laid workpieces so that the number of workpieces loaded on a pallet can be known automatically without requiring human aid. Thus, a workpiece identifying apparatus according to the invention provides a number of remarkable advantages over the prior art.

What is claimed is:

1. A workpiece identifying apparatus comprising:

a pallet for carrying flat rough workpieces provided at least at a pair of diagonally disposed corners thereof with respective absolute reference points for determining the XY dimensions of the rough workpieces;

a flat image pickup means arranged vis-a-vis the surface plane of said workpieces for obtaining a flat image of the workpieces with said pair of absolute reference points and the corners of the workpieces located in proximity to said respective absolute reference points;

an absolute reference point determining means for extracting said pair of absolute reference points from said flat image obtained by the flat image pickup means and determining the locations of the absolute reference points for measuring the XY dimensions of the workpieces;

a relative reference point determining means for extracting the relative reference points arranged on the workpieces including the corners of the workpieces from said flat image obtained by the flat image pickup means and determining the locations of the relative reference points for measuring the XY dimensions of the workpieces;

a relative difference computing means for computing the differential between each of the absolute reference points locationally determined by said absolute reference point determining means and the corresponding one of the relative reference points locationally determined by said relative reference point determining means by way of the X-component and the Y-component of the differential; and an XY dimensions computing means for computing the XY dimensions of the workpieces from the result of computation produced by said relative difference computing means and the known XY dimensions of a given square having a pair of diagonally disposed corners located on said pair of absolute reference points of said pallet.

2. A workpiece identifying apparatus comprising:

a surface image data storage master for storing surface image data on the surface images of a plurality of flat workpieces of different materials obtained under a given lighting arrangement for future use, said data being classified in terms of the materials of the workpieces;

a surface image pickup means arranged vis-a-vis the surface plane of a workpiece placed in position for obtaining a flat image of the workpiece;

a surface image matching judging means for retrieving the surface image data of a surface image most resembling to the surface image of the workpiece from the surface image data storage master by sequentially referring to the surface image data stored in said surface image data storage master; and a material determining means for determining the material of the workpiece from the result of matching judgment produced by the surface image matching judging means.

3. A workpiece identifying apparatus comprising:

a lateral image pickup means for taking a lateral image of a plurality of workpieces placed in position in layers;

an inter-workpiece gap extracting means for extracting the gaps of adjacently laid workpieces from the lateral image obtained by the lateral image pickup means; and a workpiece thickness computing means for computing the thickness of each of the workpieces by determining the gaps extracted by the inter-workpiece gaps extracting means.

4. A workpiece identifying apparatus comprising:

a lateral image pickup means for taking a lateral image of a plurality of workpieces placed in position in layers;

a workpiece lowest level extracting means for extracting the lowest level of the workpieces from the lateral image obtained by said lateral image pickup means and obtaining the coordinate values of the extracted lowest level for a predetermined coordinate system;

a workpiece highest level extracting means for extracting the highest level of the workpieces from the lateral image obtained by said lateral image pickup means and obtaining the coordinate values of the extracted highest level for the predetermined coordinate system;

an accumulated workpiece height computing means for determining the accumulated height of the workpieces between the lowest level and the highest level of the workpieces by determining the difference of the coordinate values along the Y-axis of the coordinate system obtained by said workpiece lowest level extracting means and said workpiece highest level extracting means;

an inter-workpiece gap extracting means for extracting the gaps of adjacently laid workpieces from the lateral image obtained by the lateral image pickup means;

a workpiece thickness computing means for computing the thickness of each of the workpieces by determining the gaps extracted by the inter-workpiece gaps extracting means; and a number of accumulated workpieces computing means for computing the number of accumulated workpieces by dividing the accumulated height of the workpieces determined by said accumulated workpiece height computing means by the thickness of each of the workpieces determined by said workpiece thickness computing means.

* * * * *